United States Patent
Momma et al.

(10) Patent No.: US 12,392,555 B2
(45) Date of Patent: Aug. 19, 2025

(54) METHOD OF FORMING POSITIVE ELECTRODE ACTIVE MATERIAL, KILN, AND HEATING FURNACE

(71) Applicant: SEMICONDUCTOR ENERGY LABORATORY CO., LTD., Atsugi (JP)

(72) Inventors: Yohei Momma, Kanagawa (JP); Jo Saito, Kanagawa (JP); Teruaki Ochiai, Kanagawa (JP); Mayumi Mikami, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 379 days.

(21) Appl. No.: 17/782,835

(22) PCT Filed: Dec. 1, 2020

(86) PCT No.: PCT/IB2020/061298
§ 371 (c)(1),
(2) Date: Jun. 6, 2022

(87) PCT Pub. No.: WO2021/116819
PCT Pub. Date: Jun. 17, 2021

(65) Prior Publication Data
US 2023/0014507 A1     Jan. 19, 2023

(30) Foreign Application Priority Data
Dec. 10, 2019   (JP) ................... 2019-223081

(51) Int. Cl.
*F27B 9/18*   (2006.01)
*C01G 53/66*  (2025.01)
(Continued)

(52) U.S. Cl.
CPC ............. *F27B 7/18* (2013.01); *C01G 53/66* (2013.01); *F27B 7/36* (2013.01); *F27B 7/42* (2013.01);
(Continued)

(58) Field of Classification Search
CPC .... F27B 7/20; F27B 9/30; F27B 7/161; F27B 3/225; F27B 7/14; F27B 9/3005;
(Continued)

(56) References Cited

U.S. PATENT DOCUMENTS 5,294,094 A * 3/1994 Crafton ................ B22D 31/002
                                                    164/5
6,672,865 B2 * 1/2004 Hansen ................. F27B 7/2033
                                                    432/106
(Continued)

FOREIGN PATENT DOCUMENTS

CN    102779976 A    11/2012
CN    102812583 A    12/2012
(Continued)

OTHER PUBLICATIONS

International Search Report (Application No. PCT/IB2020/061298) Dated Mar. 2, 2021.
(Continued)

*Primary Examiner* — Gregory A Wilson
(74) *Attorney, Agent, or Firm* — Fish & Richardson P.C.

(57) ABSTRACT

To provide a method of forming a positive electrode active material with high productivity. To provide a manufacturing apparatus capable of forming a positive electrode active material with high productivity. Provided is a method of forming a positive electrode active material including lithium, a transition metal, oxygen, and fluorine. An adhesion preventing step is performed during heating of an object. Examples of the adhesion preventing step include
(Continued)

stirring by rotating a furnace during the heating, stirring by vibrating a container containing an object during the heating, and crushing performed between the plurality of heating steps. By these manufacturing methods, a positive electrode active material having favorable distribution of an additive at the surface portion can be formed.

2 Claims, 42 Drawing Sheets

(51) Int. Cl.
F27B 7/18 (2006.01)
F27B 7/36 (2006.01)
F27B 7/42 (2006.01)
F27D 5/00 (2006.01)
H01M 4/04 (2006.01)
F27B 7/02 (2006.01)
H01M 4/02 (2006.01)
H01M 4/505 (2010.01)
H01M 4/525 (2010.01)

(52) U.S. Cl.
CPC ........ F27D 5/0068 (2013.01); H01M 4/0471 (2013.01); C01P 2002/50 (2013.01); C01P 2002/72 (2013.01); C01P 2002/77 (2013.01); C01P 2004/80 (2013.01); C01P 2006/40 (2013.01); F27B 2007/025 (2013.01); F27D 2005/0087 (2013.01); H01M 2004/028 (2013.01); H01M 4/505 (2013.01); H01M 4/525 (2013.01)

(58) Field of Classification Search
CPC .. F27B 9/18; F27B 9/16; F27B 9/2407; F27B 7/36; F27B 5/16; F27B 7/162; F26B 1/005; F27D 2003/0065; F27D 25/001; C21B 13/105; C21B 9/0037
See application file for complete search history.

(56) References Cited

U.S. PATENT DOCUMENTS

| 8,137,654 | B2 | 3/2012 | Takahashi et al. | |
|---|---|---|---|---|
| 9,221,693 | B2 | 12/2015 | Kawahashi et al. | |
| 9,327,996 | B2 | 5/2016 | Kawahashi et al. | |
| 9,618,267 | B2 * | 4/2017 | Matsuda | F27B 9/36 |
| 10,294,535 | B2 * | 5/2019 | Yaso | F27B 3/06 |
| 2002/0110736 | A1 | 8/2002 | Kweon et al. | |
| 2003/0104279 | A1 | 6/2003 | Miyazaki et al. | |
| 2004/0142241 | A1 | 7/2004 | Nagayama | |
| 2006/0172246 | A1 * | 8/2006 | Miller | F27B 7/161 432/103 |
| 2006/0263690 | A1 | 11/2006 | Suhara et al. | |
| 2007/0117014 | A1 | 5/2007 | Saito et al. | |
| 2008/0241693 | A1 | 10/2008 | Fukuchi et al. | |
| 2009/0087362 | A1 | 4/2009 | Sun et al. | |
| 2009/0104532 | A1 | 4/2009 | Hosoya | |
| 2009/0126531 | A1 | 5/2009 | Takahashi et al. | |
| 2010/0086854 | A1 | 4/2010 | Kumar et al. | |
| 2010/0127418 | A1 * | 5/2010 | Davidson | F27B 9/3011 425/445 |
| 2010/0247986 | A1 | 9/2010 | Toyama. et al. | |
| 2012/0319037 | A1 | 12/2012 | Kawahashi et al. | |
| 2013/0043428 | A1 | 2/2013 | Kawahashi et al. | |
| 2013/0052534 | A1 | 2/2013 | Fujiki et al. | |
| 2013/0146809 | A1 | 6/2013 | Takemoto et al. | |
| 2013/0323596 | A1 | 12/2013 | Morita et al. | |
| 2016/0013478 | A1 | 1/2016 | Satow et al. | |
| 2016/0276659 | A1 | 9/2016 | Choi et al. | |
| 2018/0013130 | A1 | 1/2018 | Ochiai et al. | |
| 2018/0102536 | A1 | 4/2018 | Kawakami et al. | |
| 2018/0145317 | A1 | 5/2018 | Momma et al. | |
| 2018/0145368 | A1 | 5/2018 | Ochiai et al. | |
| 2018/0316004 | A1 * | 11/2018 | Tokoro | H01M 4/525 |
| 2020/0176770 | A1 | 6/2020 | Takahashi et al. | |
| 2020/0313228 | A1 | 10/2020 | Ochiai et al. | |
| 2020/0350554 | A1 | 11/2020 | Choi et al. | |
| 2021/0083281 | A1 | 3/2021 | Mikami et al. | |
| 2023/0014507 | A1 * | 1/2023 | Momma | F27B 5/06 |

FOREIGN PATENT DOCUMENTS

| CN | 103098269 A | 5/2013 | |
|---|---|---|---|
| CN | 104505500 A | 4/2015 | |
| CN | 105655554 A | 6/2016 | |
| CN | 106025212 A | 10/2016 | |
| CN | 108800921 A * | 11/2018 | ............... F27B 9/12 |
| CN | 110093189 A * | 8/2019 | |
| CN | 110423026 A * | 11/2019 | |
| CN | 110650923 A | 1/2020 | |
| DE | 766502 A * | 1/1955 | |
| EP | 2623460 A | 8/2013 | |
| EP | 2704237 A | 3/2014 | |
| EP | 2783764 A1 * | 10/2014 | ............... B09C 1/06 |
| EP | 3611132 A | 2/2020 | |
| JP | 10-087332 A | 4/1998 | |
| JP | 11-307098 A | 11/1999 | |
| JP | 2000-203842 A | 7/2000 | |
| JP | 2002-216760 A | 8/2002 | |
| JP | 2005-273926 A | 10/2005 | |
| JP | 2010-080407 A | 4/2010 | |
| JP | 4587333 | 11/2010 | |
| JP | 2012-048968 A | 3/2012 | |
| JP | 2013-167423 A | 8/2013 | |
| JP | 2014-210710 A | 11/2014 | |
| JP | 2015-099722 A | 5/2015 | |
| JP | 2015-228381 A | 12/2015 | |
| JP | 2016-038116 A | 3/2016 | |
| KR | 2012-0132464 A | 12/2012 | |
| KR | 2013-0106380 A | 9/2013 | |
| KR | 2019-0060705 A | 6/2019 | |
| WO | WO-2008043982 A2 * | 4/2008 | ............. B01J 19/30 |
| WO | WO-2012/026539 | 3/2012 | |
| WO | WO-2012/098724 | 7/2012 | |
| WO | WO-2012/132071 | 10/2012 | |
| WO | WO-2014201508 A1 * | 12/2014 | ........ B01F 29/40221 |
| WO | WO-2019/103522 | 5/2019 | |

OTHER PUBLICATIONS

Written Opinion (Application No. PCT/IB2020/061298) Dated Mar. 2, 2021.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

Motohashi.T et al., "Electronic phase diagram of the layered cobalt oxide system $LixCoO2$ ($0.0 \leq x \leq 1.0$)", Phys. Rev. B (Physical Review. B), Oct. 9, 2009, vol. 80, No. 16, pp. 165114-1-165114-9.

Chen.Z et al., "Staging Phase Transitions in $LixCoO2$", J. Electrochem. Soc. (Journal of the Electrochemical Society), 2002, vol. 149, No. 12, pp. A1604-A1609.

Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.

Counts.W et al., "Fluoride Model Systems: II, The Binary Systems $CaF2-BeF2$, $MgF2-BeF2$, and $LiF-MgF2$", J. Am. Ceram. Soc. (Journal of the American Ceramic Society), 1953, vol. 36, No. 1, pp. 12-17.

* cited by examiner

METHOD OF FORMING POSITIVE ELECTRODE ACTIVE MATERIAL, KILN, AND HEATING FURNACE

CROSS REFERENCE TO RELATED APPLICATIONS

This application is a U.S. National Phase Application under 35 U.S.C. § 371 of International Application PCT/IB2020/061298, filed on Dec. 1, 2020, which is incorporated by reference and claims the benefit of a foreign priority application filed in Japan on Dec. 10, 2019, as Application No. 2019-223081.

TECHNICAL FIELD

One embodiment of the present invention relates to an object, a method, or a manufacturing method. Alternatively, the present invention relates to a process, a machine, manufacture, or a composition (composition of matter). One embodiment of the present invention relates to a semiconductor device, a display device, a light-emitting device, a power storage device, a lighting device, an electronic device, or a manufacturing method thereof.

Note that electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, air batteries, and all-solid-state batteries have been actively developed. In particular, demand for lithium-ion secondary batteries with high output and high capacity has rapidly grown with the development of the semiconductor industry, and the lithium-ion secondary batteries are essential as rechargeable energy supply sources for today's information society.

As the demand has grown, the productivity of lithium-ion batteries and their materials are required to be improved. As part of the improvement, an effective method of forming a positive electrode active material, which is a material of a lithium ion battery, has been developed. For example, Patent Document 1 discloses a method of forming a positive electrode active material with use of a rotary kiln capable of successive processing.

In addition, crystal structures of positive electrode active materials have been studied (Non-Patent Document 1 to Non-Patent Document 3).

X-ray diffraction (XRD) is one of methods used for analysis of a crystal structure of a positive electrode active material. With the use of the ICSD (Inorganic Crystal Structure Database) described in Non-Patent Document 4, XRD data can be analyzed.

REFERENCE

Patent Document

[Patent Document 1] PCT International Publication No. WO2012/098724

Non-Patent Document

[Non-Patent Document 1] Toyoki Okumura et al., "Correlation of lithium ion distribution and X-ray absorption near-edge structure in O3- and O2-lithium cobalt oxides from first-principle calculation", *Journal of Materials Chemistry*, 2012, 22, pp. 17340-17348.

[Non-Patent Document 2] Motohashi, T. et al., "Electronic phase diagram of the layered cobalt oxide system $Li_xCoO_2$ (0.0≤x≤1.0)", *Physical Review B*, 80 (16), 2009, 165114.

[Non-Patent Document 3] Zhaohui Chen et al., "Staging Phase Transitions in $Li_xCoO_2$", *Journal of The Electrochemical Society*, 149 (12), 2002, A1604-A1609.

[Non-Patent Document 4] Belsky, A. et al., "New developments in the Inorganic Crystal Structure Database (ICSD): accessibility in support of materials research and design", *Acta Cryst.*, 2002, B58, 364-369.

SUMMARY OF THE INVENTION

Problems to be Solved by the Invention

A positive electrode active material is a high-cost material among lithium-ion secondary batteries, and improvement in its productivity is highly effective. At the same time, the demand for improvement in performance (e.g., increase in capacity, cycle performance, reliability, or safety) is also high.

In view of above, an object of one embodiment of the present invention is to provide a method of forming a positive electrode active material with high productivity. Another object is to provide a manufacturing apparatus capable of forming a positive electrode active material with high productivity. Another object is to provide a method of forming a positive electrode active material whose crystal structure is not easily broken even when charge and discharge are repeated. Another object is to provide a method of forming a positive electrode active material with excellent charge and discharge cycle performance. Another object is to provide a method of forming a positive electrode active material with high charge and discharge capacity. Another object is to provide a secondary battery with high safety or reliability.

Another object of one embodiment of the present invention is to provide a positive electrode active material, a power storage device, or a manufacturing method thereof.

Note that the description of these objects does not preclude the existence of other objects. One embodiment of the present invention does not have to achieve all these objects. Other objects can be derived from the description of the specification, the drawings, and the claims.

Means for Solving the Problems

One embodiment of the present invention is a method of forming a positive electrode active material including lithium, a transition metal, oxygen, and fluorine. An adhesion preventing step is performed during heating of an object.

In the above, the adhesion preventing step is preferably stirring by rotating a furnace during the heating. Alternatively, the adhesion preventing step is preferably stirring by vibrating a container containing an object during the heating.

Another embodiment of the present invention is a method of forming a positive electrode active material including lithium, a transition metal, oxygen, and fluorine. An adhesion preventing step is performed between a plurality of heating steps.

In the above, the adhesion preventing step is preferably at least one of stirring by vibrating a container containing an object during heating and crushing performed between the plurality of heating steps.

In the above, a ceramic ball is preferably put together with the object in the furnace.

Another embodiment of the present invention is a rotary kiln successively processing an object put thereto. The rotary kiln includes a kiln main body, a mill, a first heating unit, a second heating unit, a first source material supply unit, a second source material supply unit, and an atmosphere control unit. The kiln main body has a substantially cylindrical shape and has a function of stirring the object by rotating. The kiln main body includes an upstream portion and a downstream portion, and has a function of retaining the object in the upstream portion for an hour or longer and 100 hours or shorter and a function of retaining the object in the downstream portion for an hour or longer and 100 hours or shorter. The mill has a function of inhibiting adhesion of the object. The first heating unit has a function of heating the upstream portion of the kiln main body to a temperature higher than or equal to 800° C. and lower than or equal to 1100° C. The second heating unit has a function of heating the downstream portion of the kiln main body to a temperature higher than or equal to 500° C. and lower than or equal to 1130° C. The first source material supply unit has a function of supplying the object to the upstream portion of the kiln main body. The second source material supply unit has a function of supplying an additional source material to the downstream portion of the kiln main body. The atmosphere control unit is an oxygen-containing gas introduction line which introduces an oxygen-containing gas to the inside of the kiln main body.

Another embodiment of the present invention is a kiln successively processing an object put thereto. The kiln includes a kiln main body, a first mill, a second mill, a first heating unit, a second heating unit, and a source material supply unit. The kiln main body has a substantially cylindrical shape and includes a scraping blade inside. The scraping blade has a function of stirring the object. The kiln main body includes an upstream portion and a downstream portion, and has a function of retaining the object in the upstream portion for an hour or longer and 100 hours or shorter and a function of retaining the object in the downstream portion for an hour or longer and 100 hours or shorter. The first mill and the second mill are provided between the upstream portion and the downstream portion and have a function of inhibiting adhesion of the object. The first heating unit has a function of heating the upstream portion of the kiln main body to a temperature higher than or equal to 800° C. and lower than or equal to 1100° C. The second heating unit has a function of heating the downstream portion of the kiln main body to a temperature higher than or equal to 500° C. and lower than or equal to 1130° C. The source material supply unit has a function of supplying the object to the upstream portion of the kiln main body.

Another embodiment of the present invention is a roller hearth kiln successively processing an object contained in a container. The roller hearth kiln includes a tunnel-like kiln main body, a plurality of rollers, a first heating unit, a second heating unit, an atmosphere control unit, and an adhesion preventing unit. The plurality of rollers have a function of transferring the container. The kiln main body includes an upstream portion and a downstream portion along a transfer direction of the plurality of rollers. The first heating unit has a function of heating the upstream portion to a temperature higher than or equal to 800° C. and lower than or equal to 1100° C. The second heating unit has a function of heating the downstream portion to a temperature higher than or equal to 500° C. and lower than or equal to 1130° C. The atmosphere control unit is an oxygen-containing gas introduction line which introduces an oxygen-containing gas to the inside of the kiln main body. The adhesion preventing unit has a function of vibrating the container.

Another embodiment of the present invention is a heating furnace performing batch processing of an object contained in a container. The heating furnace includes a heating unit, a space in the heating furnace, an atmosphere control unit, and an adhesion preventing unit. The heating unit has a function of heating the space in the heating furnace to a temperature higher than or equal to 800° C. and lower than or equal to 1100° C. The atmosphere control unit is an oxygen-containing gas introduction line which introduces an oxygen-containing gas to the space in the heating furnace. The adhesion preventing unit has a function of vibrating the container.

Effect of the Invention

According to one embodiment of the present invention, a method of forming a positive electrode active material with high productivity can be provided. A manufacturing apparatus capable of forming a positive electrode active material with high productivity can be provided. A method of forming a positive electrode active material whose crystal structure is not easily broken even when charge and discharge are repeated can be provided. A method of forming a positive electrode active material with excellent charge and discharge cycle performance can be provided. A method of forming a positive electrode active material with high charge and discharge capacity can be provided. A secondary battery with high safety or reliability can be provided.

One embodiment of the present invention can provide a positive electrode active material, a power storage device, or a manufacturing method thereof.

Note that the description of these effects does not preclude the existence of other effects. One embodiment of the present invention does not have to have all of these effects. Other effects will be apparent from the descriptions of the specification, the drawings, the claims, and the like, and other effects can be derived from the descriptions of the specification, the drawings, the claims, and the like.

MODE FOR CARRYING OUT THE INVENTION

Figure 1:
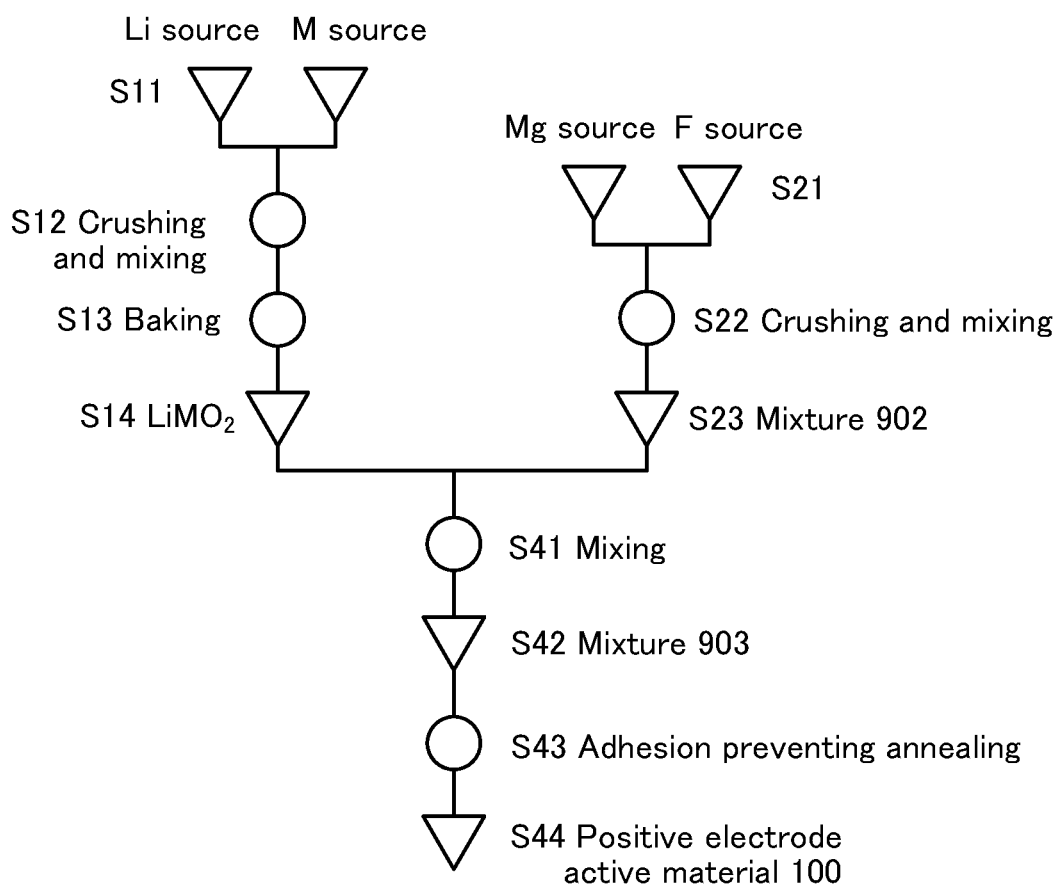
FIG. 1 is a diagram illustrating an example of a method of forming a positive electrode active material.

Embodiments of the present invention will be described in detail below with reference to the drawings. Note that the present invention is not limited to the following description, and it is readily understood by those skilled in the art that modes and details of the present invention can be modified in various ways. In addition, the present invention should not be construed as being limited to the description of the embodiments below.

The Miller index is used for the expression of crystal planes and orientations in this specification and the like. An individual plane representing a crystal plane is denoted by "( )". In the crystallography, a bar is placed over a number in the expression of crystal planes, orientations, and space groups; however, in this specification and the like, because of application format limitations, crystal planes, orientations, and space groups are sometimes expressed by placing a minus sign (−) before a number instead of placing a bar over the number.

In this specification and the like, a layered rock-salt crystal structure of a composite oxide containing lithium and a transition metal refers to a crystal structure in which a rock-salt ion arrangement where cations and anions are alternately arranged is included and the transition metal and lithium are regularly arranged to form a two-dimensional plane, so that lithium can be two-dimensionally diffused. Note that a defect such as a cation or anion vacancy may exist. Moreover, in the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In addition, in this specification and the like, theoretical capacity of a positive electrode active material refers to the amount of electricity obtained when all lithium that can be inserted and extracted and is contained in the positive electrode active material is extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In addition, in this specification and the like, charge depth obtained when all lithium that can be inserted and extracted is inserted is 0, and charge depth obtained when all lithium that can be inserted and extracted and is contained in a positive electrode active material is extracted is 1.

In this specification and the like, an example in which a lithium metal is used for a counter electrode in a secondary battery including a positive electrode and a positive electrode active material of one embodiment of the present invention is described in some cases; however, the secondary battery of one embodiment of the present invention is not limited to this example. A different material such as graphite or lithium titanate may be used for a negative electrode, for example. The properties of the positive electrode and the positive electrode active material of one embodiment of the present invention, such as a crystal structure unlikely to be broken by repeated charging and discharging and excellent cycle performance, are not affected by the material of the negative electrode. For example, the secondary battery of one embodiment of the present invention using a lithium counter electrode is charged and discharged at a relatively high charging voltage of 4.6 V in some cases; however, charging and discharging may be performed at a lower voltage. Charging and discharging at a lower voltage will result in cycle performance better than that described in this specification and the like.

In this specification and the like, the term "adhere" refers to a state where particles aggregate and fix through heating. The bonding of the particles is presumed to be caused by ionic bonding or the Van der Waals force; however, a state where particles aggregate and fix is called "adhesion" regardless of the heating temperature, the crystal state, the element distribution state, and the like.

In this specification and the like, the term "kiln" refers to an apparatus for heating an object. Instead of the kiln, the term "furnace", "stove", or "heating apparatus" may be used, for example.

Embodiment 1

In this embodiment, an example of a method of forming a positive electrode active material of one embodiment of the present invention will be described with reference to FIG. 1 to FIG. 4. The manufacturing method described in this embodiment is highly effective particularly in the case where the amount of a positive electrode active material to be formed is large, for example, the case where the amount is 10 g or more.

<Step S11>

First, in Step S11 in FIG. 1, a lithium source and a transition metal M source are prepared as materials of a composite oxide ($LiMO_2$) containing lithium, a transition metal M, and oxygen.

As the lithium source, for example, lithium carbonate, lithium fluoride, or lithium hydroxide, or the like can be used.

As the transition metal M, a metal which together with lithium can form a layered rock-salt composite oxide that belongs to the space group R-3m is preferably used. For example, at least one of manganese, cobalt, and nickel can be used. That is, as the transition metal M source, only cobalt may be used; only nickel may be used; two types of metals of cobalt and manganese or cobalt and nickel may be used; or three types of metals of cobalt, manganese, and nickel may be used.

When metals that can form a layered rock-salt composite oxide are used, cobalt, manganese, and nickel are preferably mixed at the ratio at which the composite oxide can have a layered rock-salt crystal structure. In addition, aluminum may be added to the transition metal as long as the composite oxide can have the layered rock-salt crystal structure.

As the transition metal M source, oxide or hydroxide of the metal described as an example of the transition metal M, or the like can be used. As a cobalt source, for example, cobalt oxide, cobalt hydroxide, or the like can be used. As a manganese source, manganese oxide, manganese hydroxide, or the like can be used. As a nickel source, nickel oxide, nickel hydroxide, or the like can be used. As an aluminum source, aluminum oxide, aluminum hydroxide, or the like can be used.

<Step S12>

Next, in Step S12, the lithium source and the transition metal M source are crushed and mixed. The mixing can be performed by a dry process or a wet process. For example, a ball mill, a bead mill, or the like can be used for the mixing. When the ball mill is used, a zirconia ball is preferably used as media, for example.

<Step S13>

Next, in Step S13, the materials mixed in the above manner are heated. This step is sometimes referred to as baking or first heating to distinguish this step from a heating step performed later. The heating is preferably performed at a temperature higher than or equal to 800° C. and lower than 1100° C., further preferably at a temperature higher than or equal to 900° C. and lower than or equal to 1000° C., and still further preferably at approximately 950° C. An excessively low temperature might lead to insufficient decomposition and melting of the lithium source and the transition metal M source. An excessively high temperature, on the other hand, might cause a defect due to excessive reduction of the transition metal M taking part in an oxidation-reduction reaction, evaporation of lithium, or the like. The use of cobalt as the transition metal M, for example, may lead to a defect in which cobalt has divalence.

The heating time can be longer than or equal to an hour and shorter than or equal to 100 hours, for example, and is preferably longer than or equal to 2 hours and shorter than or equal to 20 hours. A shorter heating time is preferable, in which case the productivity increases. An excessively long heating time might lead to insufficient decomposition and melting of the lithium source and the transition metal M source. Baking is preferably performed in an atmosphere with few moisture, such as dry air (e.g., a dew point is lower than or equal to −50° C., further preferably lower than or equal to −100° C.). For example, it is preferable that the heating be performed at 1000° C. for 10 hours, the temperature rise be 200° C./h, and the flow rate of a dry atmosphere be 10 L/min. After that, the heated materials can be cooled to room temperature. The temperature decreasing time from the specified temperature to room temperature is preferably longer than or equal to 10 hours and shorter than or equal to 50 hours, for example.

Note that the cooling to room temperature in Step S13 is not essential. As long as later steps of Step S41 to Step S44 are performed without problems, the cooling may be performed to a temperature higher than room temperature.

<Step S14>

Next, in Step S14, the materials baked in the above manner are collected, whereby the composite oxide ($LiMO_2$) containing lithium, the transition metal M, and oxygen is obtained. Specifically, lithium cobalt oxide, lithium manganese oxide, lithium nickel oxide, lithium cobalt oxide in which manganese is substituted for part of cobalt, lithium cobalt oxide in which nickel is substituted for part of cobalt, lithium nickel-manganese-cobalt oxide, or the like is obtained.

Alternatively, a composite oxide containing lithium, the transition metal M, and oxygen that is synthesized in advance may be used in Step S14. In that case, Step S11 to Step S13 can be omitted.

For example, as a composite oxide synthesized in advance, a lithium cobalt oxide (product name: CELLSEED C-10N) manufactured by NIPPON CHEMICAL INDUSTRIAL CO., LTD. can be used. This is lithium cobalt oxide in which the median diameter (D50) is approximately 12 μm, and in the impurity analysis by a glow discharge mass spectroscopy method (GD-MS), the magnesium concentration and the fluorine concentration are less than or equal to 50 ppm wt, the calcium concentration, the aluminum concentration, and the silicon concentration are less than or equal to 100 ppm wt, the nickel concentration is less than or equal to 150 ppm wt, the sulfur concentration is less than or equal to 500 ppm wt, the arsenic concentration is less than or equal to 1100 ppm wt, and the concentrations of elements other than lithium, cobalt, and oxygen are less than or equal to 150 ppm wt.

Alternatively, a lithium cobalt oxide (product name: CELLSEED C-5H) manufactured by NIPPON CHEMICAL INDUSTRIAL CO., LTD. can be used. This is lithium cobalt oxide in which the median diameter (D50) is approximately 6.5 μm, and the concentrations of elements other than lithium, cobalt, and oxygen are approximately equal to or less than those of C-TON in the impurity analysis by GD-MS.

In this embodiment, cobalt is used as the metal M, and lithium cobalt oxide synthesized in advance (CELLSEED C-TON manufactured by NIPPON CHEMICAL INDUSTRIAL CO., LTD.) is used.

<Step S21>

Next, in Step S21, a fluorine source and a magnesium source are prepared as materials of a mixture 902. In addition, a lithium source is preferably prepared as well.

As the fluorine source, for example, lithium fluoride (LiF), magnesium fluoride ($MgF_2$), aluminum fluoride ($AlF_3$), titanium fluoride ($TiF_4$), cobalt fluoride ($CoF_2$ and $CoF_3$), nickel fluoride ($NiF_2$), zirconium fluoride ($ZrF_4$), vanadium fluoride (VFs), manganese fluoride, iron fluoride, chromium fluoride, niobium fluoride, zinc fluoride ($ZnF_2$), calcium fluoride ($CaF_2$), sodium fluoride (NaF), potassium fluoride (KF), barium fluoride ($BaF_2$), cerium fluoride ($CeF_2$), lanthanum fluoride ($LaF_3$), sodium aluminum hexafluoride ($Na_3AlF_6$), or the like can be used. The fluorine source is not limited to a solid, and for example, fluorine ($F_2$), carbon fluoride, sulfur fluoride, oxygen fluoride (e.g., $OF_2$, $O_2F_2$, $O_3F_2$, $O_4F_2$, and $O_2F$), or the like may be used and mixed in the atmosphere in a heating step described later. A plurality of fluorine sources may be mixed to be used. Among them, lithium fluoride, which has a relatively low melting point of 848° C., is preferable because it is easily melted in an annealing process described later.

As the chlorine source, for example, lithium chloride, magnesium chloride, or the like can be used.

As the magnesium source, for example, magnesium fluoride, magnesium oxide, magnesium hydroxide, magnesium carbonate, or the like can be used.

As the lithium source, for example, lithium fluoride, lithium carbonate, lithium hydroxide, or the like can be used. That is, lithium fluoride can be used as both the lithium source and the fluorine source. In addition, magnesium fluoride can be used as both the fluorine source and the magnesium source.

In this embodiment, lithium fluoride LiF is prepared as the fluorine source, and magnesium fluoride $MgF_2$ is prepared as the fluorine source and the magnesium source. When lithium fluoride LiF and magnesium fluoride $MgF_2$ are mixed at a molar ratio of approximately LiF:$MgF_2$=65:35, the effect of reducing the melting point becomes the highest. On the other hand, when the amount of lithium fluoride increases, cycle performance might deteriorate because of a too large amount of lithium. Therefore, the molar ratio of lithium fluoride LiF to magnesium fluoride $MgF_2$ is preferably LiF:$MgF_2$=x:1 ($0 \le x \le 1.9$), further preferably LiF:$MgF_2$=x:1 ($0.1 \le x \le 0.5$), still further preferably LiF:$MgF_2$=x:1 (x=the vicinity of 0.33). Note that in this specification and the like, the vicinity means a value greater than 0.9 times and smaller than 1.1 times a certain value.

In addition, in the case where the following mixing and grinding steps are performed by a wet process, a solvent is prepared. As the solvent, ketone such as acetone; alcohol such as ethanol or isopropanol; ether; dioxane; acetonitrile; N-methyl-2-pyrrolidone (NMP); or the like can be used. An aprotic solvent that hardly reacts with lithium is further preferably used. In this embodiment, acetone is used.

<Step S22>

Next, in Step S22, the materials of the mixture 902 are mixed and ground. Although the mixing can be performed by a dry process or a wet process, the wet process is preferable because the materials can be ground to the smaller size. For example, a ball mill, a bead mill, or the like can be used for the mixing. When the ball mill is used, a zirconia ball is preferably used as media, for example. The mixing step and the grinding step are preferably performed sufficiently to pulverize the mixture 902.

<Step S23>

Next, in Step S23, the materials mixed and ground in the above manner are collected, whereby the mixture 902 is obtained.

For example, the mixture 902 preferably has a D50 (median diameter) of greater than or equal to 600 nm and less than or equal to 20 μm, further preferably greater than or equal to 1 μm and less than or equal to 10 μm. When mixed with a composite oxide containing lithium, the transition metal M, and oxygen in the later step, the mixture 902 pulverized to such a small size is easily attached to surfaces of composite oxides uniformly. The mixture 902 is preferably attached to the surfaces of the composite oxide uniformly because both fluorine and magnesium are easily distributed to the vicinity of surfaces of the composite oxides after heating. When there is a region containing neither fluorine nor magnesium in the vicinity of surfaces, the positive electrode active material might be less likely to have an O3' type crystal structure, which is described later, in the charged state.

<Step S41>

Next, in Step S41, $LiMO_2$ obtained in Step S14 and the mixture 902 are mixed. The atomic ratio of the transition metal M in the composite oxide $LiMO_2$ containing lithium, the transition metal, and oxygen to magnesium Mg in the mixture 902 (M:Mg) is preferably 100:y ($0.1 \le y \le 6$), further preferably 100:y ($0.3 \le y \le 3$).

The condition of the mixing in Step S41 is preferably milder than that of the mixing in Step S12 in order not to damage the particles of the composite oxide $LiMO_2$. For example, a condition with a lower rotation frequency or shorter time than the mixing in Step S12 is preferable. In addition, it can be said that the dry process has a generally milder condition than the wet process. For example, a ball mill, a bead mill, or the like can be used for the mixing. When the ball mill is used, a zirconia ball is preferably used as media, for example.

<Step S42>

Next, in Step S42, the materials mixed in the above manner are collected, whereby the mixture 903 is obtained.

Note that this embodiment describes a method for adding the mixture of lithium fluoride and magnesium fluoride to lithium cobalt oxide with few impurities; however, one embodiment of the present invention is not limited thereto. A mixture obtained through baking after addition of a magnesium source, a fluorine source, and the like to the starting material of lithium cobalt oxide may be used instead of the mixture 903 in Step S42. In that case, there is no need to separate steps Step S11 to Step S14 and steps Step S21 to Step S23, which is simple and productive.

Alternatively, lithium cobalt oxide to which magnesium and fluorine are added in advance may be used. When lithium cobalt oxide to which magnesium and fluorine are added is used, the process can be simpler because Step S11 to Step S14 can be omitted.

In addition, a magnesium source and a fluorine source may be further added to the lithium cobalt oxide to which magnesium and fluorine are added in advance.

<Step S43>

Next, in Step S43, the mixture 903 is heated in an atmosphere containing oxygen. The heating preferably has the adhesion preventing effect to prevent particles of the mixture 903 from adhering to one another. This step is sometimes referred to as annealing, adhesion preventing annealing, or second heating to distinguish this step from the heating step performed before.

Note that this step is preferably performed in an atmosphere containing water in some cases, not in a dry air atmosphere. When an atmosphere contains an adequate amount of water, hydrolysis of fluoride such as magnesium fluoride can be promoted in some cases. For this reason, the air may be used as the atmosphere in this step, for example. The use of the air is preferable because the productivity is increased. Furthermore, a mixture of the air and an oxygen gas may be used as the atmosphere in this step. The use of the mixture of the air and an oxygen gas is preferable because a partial pressure of oxygen can be increased while the productivity is increased.

When particles of the mixture 903 adhere to one another during heating, additives to be described later which are preferably distributed in the vicinity of a surface might be distributed in an undesired manner. A surface of the positive electrode active material, which is preferably even, might become uneven due to adhered particles and have more defects such as a split or a crack. This is probably because the adhesion of the particles of the mixture 903 reduces the contact area with oxygen in the atmosphere and blocks a path through which the additives diffuse.

Accordingly, heating having the adhesion preventing effect enables formation of the positive electrode active material with preferable performance. The heating may be performed with a sequential heating apparatus or a batch-type heating apparatus.

Examples of the heating having the adhesion preventing effect are heating while the mixture 903 is being stirred and heating while a container containing the mixture 903 is being vibrated.

Heating with a rotary kiln is preferable as adhesion preventing annealing because heating can be performed while stirring is performed in either case of a sequential rotary kiln or a batch-type rotary kiln. A sequential rotary kiln is preferable because of its high productivity. A batch-type rotary kiln is preferable because atmosphere control is easy.

In the case where a roller hearth kiln is used for heating, it is preferable that the container containing the mixture 903 be vibrated during the heating. The roller hearth kiln is preferable because it is a sequential rotary kiln and has high productivity.

A stirring ball or the like is preferably put together with the mixture 903 into the rotary kiln or the container containing the mixture 903. As a material of the stirring ball, a material that hardly causes a chemical reaction with the mixture 903 or a material that does not bring an adverse effect even when the chemical reaction occurs is preferable, and aluminum oxide, zirconium oxide, magnesium oxide, titanium oxide, or the like is preferable. When the mixture 903 and the stirring ball are stirred together, the adhesion preventing effect can be further improved. It is preferable that the stirring ball be adequately larger than a particle of the positive electrode active material 100, in which case the stirring ball is easy to remove in a later step. However, when the stirring ball is too large, stirring is not sufficiently performed and the particle size of the positive electrode active material increases in some cases. Therefore, the diameter of the stirring ball is preferably, for example, ten or more times and a hundred or less times the median diameter D50 of the positive electrode active material 100.

The heating temperature in Step S43 needs to be higher than or equal to the temperature at which a reaction between $LiMO_2$ and the mixture 902 proceeds. Here, the temperature at which the reaction proceeds is a temperature at which interdiffusion between elements included in $LiMO_2$ and the mixture 902 occurs. Thus, the heating temperature may be lower than the melting temperatures of these materials. For example, in an oxide, solid-phase diffusion occurs at a temperature that is 0.757 times (Tamman temperature $T_d$) the melting temperature $T_m$. Accordingly, the heating temperature is higher than or equal to 500° C., for example.

A temperature higher than or equal to the temperature at which at least part of the mixture 903 is melted is preferable because the reaction proceeds more easily. Accordingly, the annealing temperature is preferably higher than or equal to the eutectic point of the mixture 902. In the case where the mixture 902 includes LiF and $MgF_2$, the eutectic point of LiF and $MgF_2$ is around 742° C., and the temperature in Step S43 is preferably higher than or equal to 742° C.

The mixture 903 obtained by mixing such that $LiCoO_2$:LiF:$MgF_2$=100:0.33:1 (molar ratio) exhibits an endothermic peak at around 830° C. in differential scanning calorimetry measurement (DSC measurement). Thus, in the case where $LiMO_2$ is lithium cobalt oxide, the temperature in Step S43 is further preferably higher than or equal to 830° C.

A higher annealing temperature is preferable because it facilitates the reaction, shortens the annealing time, and enables high productivity.

Note that the annealing temperature needs to be lower than or equal to a decomposition temperature of $LiMO_2$ (1130° C. in the case of $LiCoO_2$). At around the decomposition temperature, a slight amount of $LiMO_2$ might be decomposed. Thus, the annealing temperature is preferably lower than or equal to 1130° C., further preferably lower than or equal to 1000° C., further preferably lower than or equal to 950° C., and further preferably lower than or equal to 900° C.

In view of the above, the annealing temperature is preferably higher than or equal to 500° C. and lower than or equal to 1130° C., further preferably higher than or equal to 500° C. and lower than or equal to 1000° C., still further preferably higher than or equal to 500° C. and lower than or equal to 950° C., yet still further preferably higher than or equal to 500° C. and lower than or equal to 900° C. Furthermore, the annealing temperature is preferably higher than or equal to 742° C. and lower than or equal to 1130° C., further preferably higher than or equal to 742° C. and lower than or equal to 1000° C., still further preferably higher than or equal to 742° C. and lower than or equal to 950° C., yet still further preferably higher than or equal to 742° C. and lower than or equal to 900° C. Furthermore, the annealing temperature is preferably higher than or equal to 830° C. and lower than or equal to 1130° C., further preferably higher than or equal to 830° C. and lower than or equal to 1000° C., still further preferably higher than or equal to 830° C. and lower than or equal to 950° C., yet still further preferably higher than or equal to 830° C. and lower than or equal to 900° C.

In addition, at the time of heating the mixture 903, the partial pressure of fluorine or a fluoride in the atmosphere is preferably controlled to be within an appropriate range.

In the formation method described in this embodiment, some of the materials, e.g., lithium fluoride as the fluorine source, function as a flux in some cases. Owing to this function, the annealing temperature can be lower than or equal to the decomposition temperature of $LiMO_2$, e.g., a temperature higher than or equal to 742° C. and lower than or equal to 950° C., which allows uniform distribution of the additive such as magnesium in the vicinity of the surface and formation of the positive electrode active material having favorable performance.

Since a lithium fluoride gas is lighter in weight than oxygen, when lithium fluoride vaporizes by heating, lithium fluoride in the mixture 903 decreases. As a result, the function of a flux deteriorates. Therefore, heating needs to be performed while volatilization of lithium fluoride is inhibited. Note that even when lithium fluoride is not used as the fluorine source or the like, there is a possibility in that lithium and fluorine at a surface of $LiMO_2$ react with each other to generate lithium fluoride and vaporize. Therefore, such inhibition of volatilization is necessary also when a fluoride having a higher melting point than lithium fluoride is used.

In view of this, the mixture 903 is preferably heated in an atmosphere containing lithium fluoride, i.e., the mixture 903 is preferably heated in a state where the partial pressure of lithium fluoride in a heating furnace is high. Such heating can inhibit volatilization of lithium fluoride in the mixture 903.

In the case of using a rotary kiln for the heating, the flow rate of an oxygen-containing atmosphere in the kiln is preferably controlled while the mixture 903 is heated. For example, the flow rate of an oxygen-containing atmosphere is preferably set low, or no flowing of an atmosphere is preferably performed after an atmosphere is purged first and an oxygen atmosphere is introduced into the kiln.

In the case of using a roller hearth kiln for the heating, the mixture 903 can be heated in an atmosphere containing lithium fluoride with the container containing the mixture 903 covered with a lid, for example.

The annealing is preferably performed for an appropriate time. The appropriate annealing time is changed depending on conditions, such as the annealing temperature, and the size and composition of $LiMO_2$ in Step S14. In the case where the particle size is small, the annealing is preferably performed at a lower temperature or for a shorter time than the case where the particle size is large, in some cases.

When the median diameter (D50) of the particles in Step S14 is approximately 12 μm, for example, the annealing temperature is preferably higher than or equal to 600° C. and lower than or equal to 950° C., for example. The annealing time is preferably longer than or equal to 3 hours, further preferably longer than or equal to 10 hours, still further preferably longer than or equal to 60 hours, for example.

On the other hand, when the median diameter (D50) of the particles in Step S24 is approximately 5 μm, the annealing temperature is preferably higher than or equal to 600° C. and lower than or equal to 950° C., for example. The annealing time is preferably longer than or equal to 1 hour and shorter than or equal to 10 hours, further preferably approximately 2 hours, for example.

The annealing time is preferably shorter as long as the battery performance is not degraded, because high productivity can be obtained.

The temperature decreasing time after the annealing is, for example, preferably longer than or equal to 10 hours and shorter than or equal to 50 hours.

<Step S44>

Then, in Step S44, materials subjected to the above-described adhesion preventing annealing are collected, whereby the positive electrode active material 100 can be formed. Here, the collected positive electrode active material 100 is preferably sifted.

Although FIG. 1 shows the formation method in which adhesion preventing annealing is performed in Step S43, one embodiment of the present invention is not limited to this. The method shown by Step S53 to Step S55 in FIG. 2 and FIG. 4 can also prevent adhesion of an object. Many portions are common to FIG. 1; hence, different portions will be mainly described. The description of FIG. 1 can be referred to for the common portions.

<Step S53>

Figure 2:
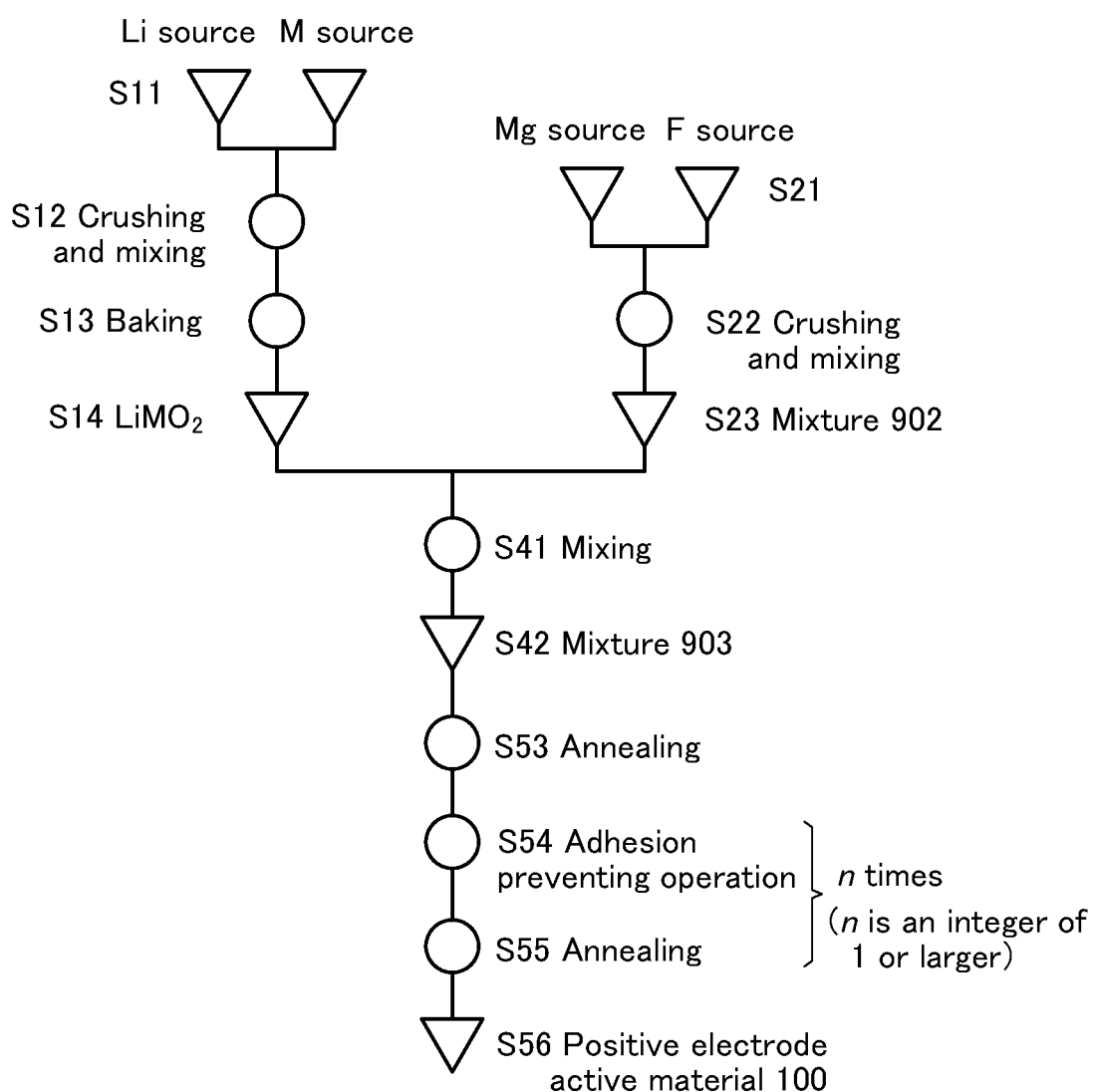
FIG. 2 is a diagram illustrating an example of a method of forming a positive electrode active material.
Figure 4:
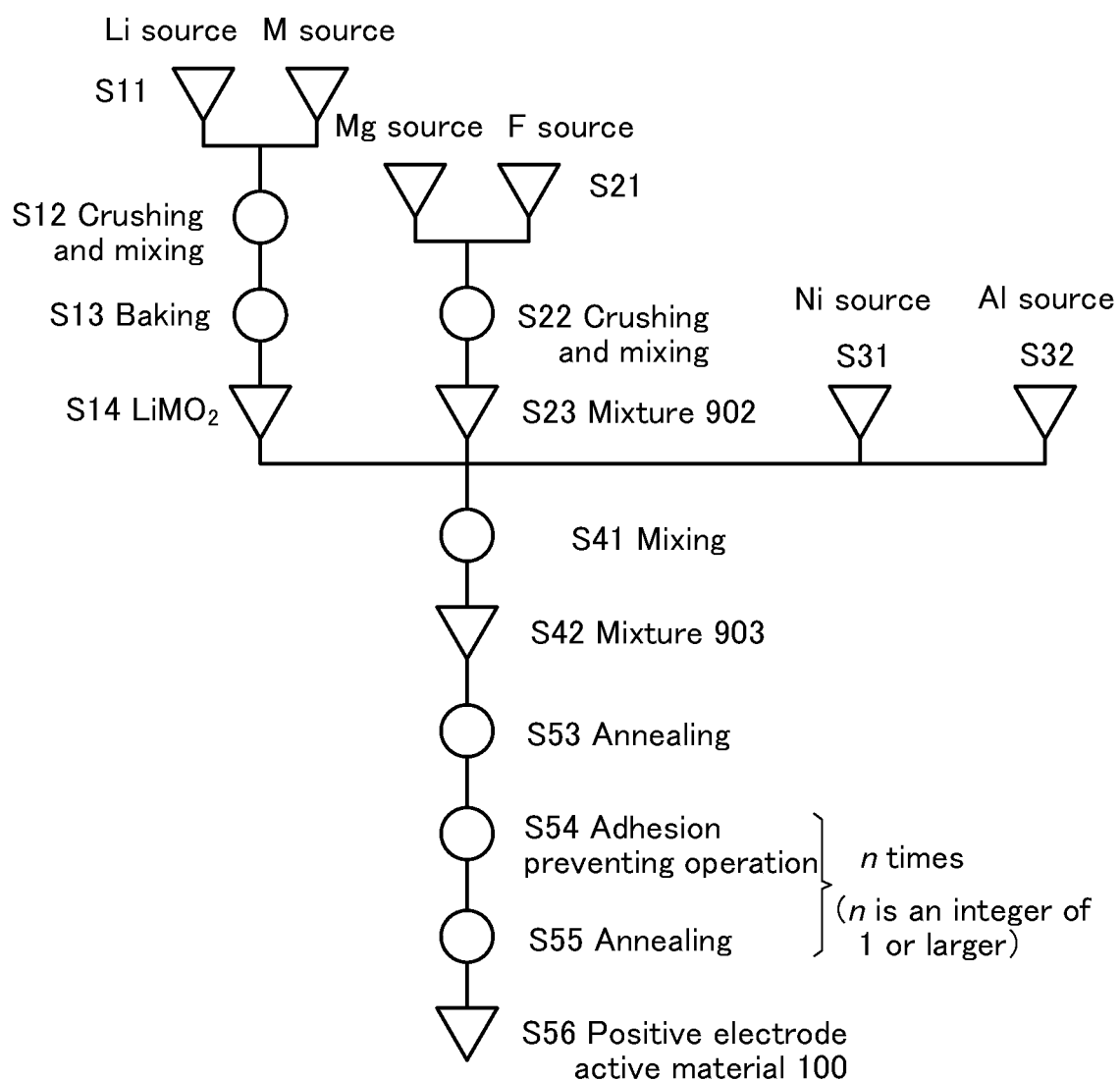
FIG. 4 is a diagram illustrating an example of a method of forming a positive electrode active material.

In Step S53 in FIG. 2 and FIG. 4, the mixture 903 is heated in an atmosphere containing oxygen. At this time, stirring is not necessarily performed. For the other conditions, the description of Step S43 can be referred to. The mixture 903 that has been heated one or more times is referred to as a composite oxide.

<Step S54>

Next, in Step S54, adhesion preventing operation is performed on the above composite oxide. Examples of the adhesion preventing operation of the composite oxide include crushing with a pestle, mixing with a ball mill, mixing with a planetary centrifugal mixer, sifting, and vibrating a container containing the composite oxide. This step is also preferably performed in an atmosphere containing water in some cases, not in a dry air atmosphere. When an atmosphere contains an adequate amount of water, hydrolysis of fluoride such as magnesium fluoride can be promoted in some cases. For this reason, the air may be used as the atmosphere in this step, for example. The use of the air is preferable because the productivity is increased. Furthermore, a mixture of the air and an oxygen gas may be used as the atmosphere in this step. The use of the mixture of the air and an oxygen gas is preferable because a partial pressure of oxygen can be increased while the productivity is increased.

<Step S55>

Next, in Step S55, the composite oxide that has been subjected to the adhesion preventing operation is heated in an atmosphere containing oxygen. The description of Step S53 can be referred to for the heating conditions.

Step S54 and Step S55 can be conducted n times (n is an integer larger than or equal to 1). A too large n is not preferable because it might decrease the productivity and degrade the performance of the positive electrode active material. For this reason, n is preferably larger than or equal to 1 and smaller than or equal to 3, more preferably 2.

Adhesion of the composite oxide can be prevented by performing the adhesion preventing operation between a plurality of heating steps as in Step S53 to Step S55. Since this method does not need stirring and the like during heating, even a batch-type irrotational furnace can also prevent adhesion.

Although FIG. 1 shows the manufacturing method in which $LiMO_2$ obtained in Step S14 and the mixture 902 are mixed in Step S41, one embodiment of the present invention is not limited to this. As in Step S31, Step S32, and Step S41 in FIG. 3 and FIG. 4, another additive may be further mixed.

Figure 3:
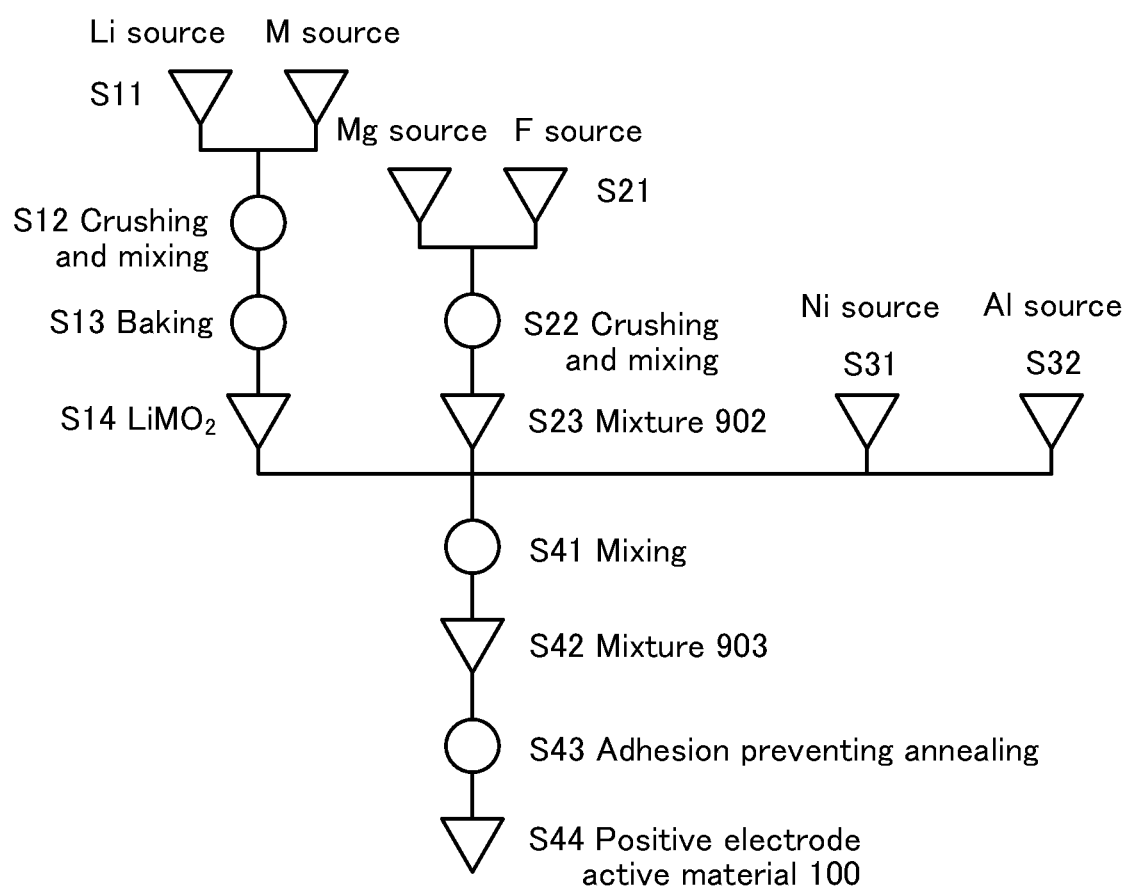
FIG. 3 is a diagram illustrating an example of a method of forming a positive electrode active material.

As the additive, one or more selected from nickel, aluminum, manganese, titanium, zirconium, vanadium, iron, chromium, niobium, cobalt, arsenic, zinc, silicon, sulfur, phosphorus, and boron can be used, for example. FIG. 3 and FIG. 4 show an example in which two kinds of additives, i.e., a nickel source in Step S31 and an aluminum source in Step S32, are used.

These additives are preferably obtained by pulverizing oxide, hydroxide, fluoride, or the like of the elements. The pulverization can be performed by wet process, for example.

When the step of introducing the transition metal M and the step of introducing the additive are separately performed in such a manner, the profiles in the depth direction of the elements can be made different from each other in some cases. For example, the concentration of an additive can be made higher in the vicinity of the surface than in the inner portion of the positive electrode active material 100. Furthermore, with the number of atoms of the transition metal M as a reference, the ratio of the number of atoms of the additive element with respect to the reference can be higher in the vicinity of the surface than in the inner portion.

This embodiment can be implemented in combination with the other embodiments.

Embodiment 2

In this embodiment, a positive electrode active material of one embodiment of the present invention will be described with reference to FIG. 5 to FIG. 10.

Figure 5A:
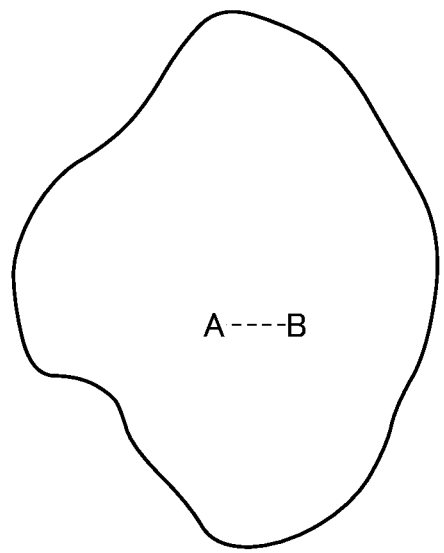
FIG. 5A is a top view of a positive electrode active material.
Figure 5B:
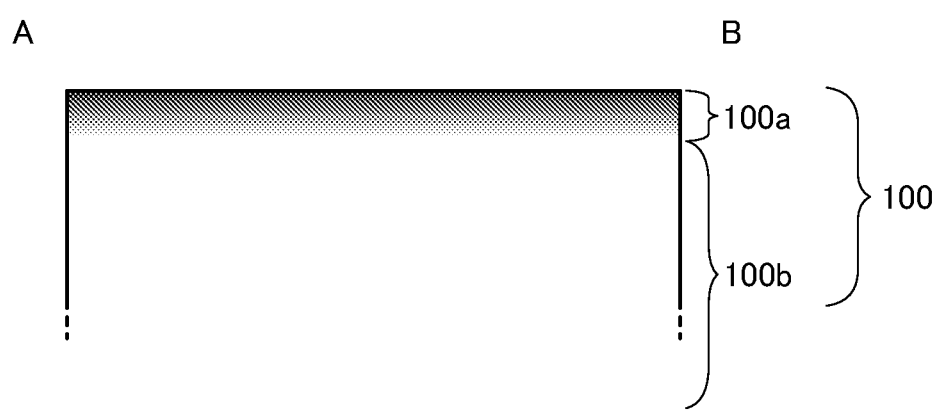
FIG. 5B is a cross-sectional diagram of the positive electrode active material.

FIG. 5A is a top view of the positive electrode active material 100 of one embodiment of the present invention. FIG. 5B is a cross-sectional diagram taken along A-B in FIG. 5A.

<Contained Element and Distribution>

The positive electrode active material 100 contains lithium, a transition metal M, oxygen, and an additive. The positive electrode active material 100 can be regarded as a composite oxide represented by $LiMO_2$ to which an additive is added.

As the transition metal M contained in the positive electrode active material 100, a metal which together with lithium can form a layered rock-salt composite oxide that belongs to the space group R-3m is preferably used. For example, at least one of manganese, cobalt, and nickel can be used. That is, as the transition metal contained in the positive electrode active material 100, only cobalt may be used; only nickel may be used; two types of metals of cobalt and manganese or cobalt and nickel may be used; or three types of metals of cobalt, manganese, and nickel may be used. In other words, the positive electrode active material 100 can include a composite oxide containing lithium and the transition metal M, such as lithium cobalt oxide, lithium nickel oxide, lithium cobalt oxide in which manganese is substituted for part of cobalt, lithium cobalt oxide in which nickel is substituted for part of cobalt, or lithium nickel-manganese-cobalt oxide. Nickel is preferably contained as the transition metal M in addition to cobalt, in which case a crystal structure may be more stable in a high-voltage charged state.

As the additive contained in the positive electrode active material 100, at least one of magnesium, fluorine, aluminum, titanium, vanadium, iron, chromium, niobium, cobalt, arsenic, zinc, silicon, sulfur, phosphorus, and boron is preferably used. Such elements further stabilize a crystal structure included in the positive electrode active material 100 in some cases, as described later. The positive electrode active material 100 can contain lithium cobalt oxide to which magnesium and fluorine are added, lithium cobalt oxide to which magnesium, fluorine, and titanium are added, lithium nickel-cobalt oxide to which magnesium and fluorine are added, lithium cobalt-aluminum oxide to which magnesium and fluorine are added, lithium nickel-cobalt-aluminum oxide, lithium nickel-cobalt-aluminum oxide to which magnesium and fluorine are added, lithium nickel-manganese-cobalt oxide to which magnesium and fluorine are added, or the like. Note that in this specification and the like, the additive may be rephrased as a mixture, a constituent of a material, an impurity, or the like.

As illustrated in FIG. 5B, the positive electrode active material 100 includes a surface portion 100a and an inner portion 100b. The surface portion 100a preferably has a higher concentration of an additive than the inner portion 100b. The concentration of the additive preferably has a gradient as shown in FIG. 5B by gradation, in which the concentration increases from the inner portion toward the surface. In this specification and the like, the surface portion 100a refers to a region from the surface of the positive electrode active material 100 to a depth of 10 nm or less. A plane generated by a split or a crack may also be referred to as a surface. A region whose position is deeper than the surface portion 100a of the positive electrode active material 100 is referred to as the inner portion 100b.

In order to prevent the breakage of a layered structure formed of octahedrons of cobalt and oxygen even when lithium is extracted from the positive electrode active material 100 of one embodiment of the present invention by charging, the surface portion 100a having a high concentration of the additive, i.e., the outer portion of an particle, is reinforced.

The gradient of the concentration of the additive is preferably similar throughout the surface portion 100a of the positive electrode active material 100. In other words, it is preferable that reinforcement derived from a high impurity concentration uniformly exist in the surface portion 100a. A situation where only part of the surface portion 100a has reinforcement is not preferable because stress might be concentrated on parts that do not have reinforcement. The concentration of stress on part of a particle might cause defects such as cracks from that part, leading to cracking of the positive electrode active material and a decrease in charge and discharge capacity.

Magnesium is divalent and is more stable in lithium sites than in transition metal sites in a layered rock-salt crystal structure; thus, magnesium is likely to enter the lithium sites. An appropriate concentration of magnesium in the lithium sites of the surface portion 100a facilitates maintenance of the layered rock-salt crystal structure. An appropriate magnesium concentration is preferable because an adverse effect on insertion and extraction of lithium in charging and discharging can be prevented. However, excess magnesium might adversely affect insertion and extraction of lithium. As will be described later, the concentration of the transition metal M is preferably higher than that of magnesium in the surface portion 100a, for example.

Aluminum is trivalent and has a high bonding strength with oxygen. Thus, when aluminum is contained as an additive and exists in the lithium sites, a change in the crystal structure can be inhibited. Hence, the positive electrode active material 100 can have the crystal structure that is unlikely to be broken by repeated charging and discharging.

A titanium oxide is known to have superhydrophilicity. Accordingly, the positive electrode active material 100 including a titanium oxide at the surface portion 100a presumably has good wettability with respect to a high-polarity solvent. Such the positive electrode active material 100 and a high-polarity electrolyte solution can have favorable contact at the interface therebetween and presumably inhibit a resistance increase when a secondary battery is formed using the positive electrode active material 100.

The voltage of a positive electrode generally increases with increasing charging voltage of a secondary battery. The positive electrode active material of one embodiment of the present invention has a stable crystal structure even at a high voltage. The stable crystal structure of the positive electrode active material in a charged state can suppress a capacity decrease due to repeated charging and discharging.

A short circuit of a secondary battery might cause not only a malfunction in charge operation and discharge operation of the secondary battery but also heat generation and firing. In order to obtain a safe secondary battery, a short-circuit current is preferably inhibited even at a high charge voltage. With use of the positive electrode active material 100 of one embodiment of the present invention, a short-circuit current is inhibited even at a high charge voltage. Thus, a secondary battery with high capacity and safety can be obtained.

It is preferable that a secondary battery using the positive electrode active material 100 of one embodiment of the present invention have high capacity, excellent charge and discharge cycle performance, and safety simultaneously.

The gradient of the concentration of the additive can be evaluated using energy dispersive X-ray spectroscopy (EDX). In the EDX measurement, the measurement in which a region is measured while scanning the region and evaluated two-dimensionally is referred to as EDX surface analysis. The measurement of a region by line scan, which is performed to evaluate the atomic concentration distribution in a positive electrode active material particle, is referred to as linear analysis. Furthermore, extracting data of a linear region from EDX surface analysis is referred to as linear analysis in some cases. The measurement of a region without scanning is referred to as point analysis.

By EDX surface analysis (e.g., element mapping), the concentrations of the additive in the surface portion 100a, the inner portion 100b, the vicinity of the crystal grain boundary, and the like of the positive electrode active material 100 can be quantitatively analyzed. By EDX linear analysis, the concentration distribution and the like of the additive can be analyzed.

When the positive electrode active material 100 is analyzed with the EDX linear analysis, a peak of the magnesium concentration in the surface portion 100a preferably exists in a region from the surface of the positive electrode active material 100 to a depth of 3 nm toward the center, further preferably to a depth of 1 nm, still further preferably to a depth of 0.5 nm.

Note that in this specification and the like, the average value of the detection amount of an element in the inside portion 100b which exists in the whole of the positive electrode active material 100, such as cobalt or oxygen, is obtained, and a measurement point where the measurement value is closest to a value of 50% of the average value is assumed to be the surface of the positive electrode active material 100 in the EDX analysis. Subtraction of the background is preferably performed before obtaining the average value. Cobalt is suitable for the assumption of the position of the surface because cobalt is less likely to be contained in the background and thus its average value in the inside portion 100b is easy to obtain. Since the positive electrode active material 100 is a composite oxide, the detection amount of oxygen is also suitable for the assumption of the surface.

In addition, the distribution of fluorine contained in the positive electrode active material 100 preferably overlaps with the distribution of magnesium. Thus, when the EDX line analysis is performed, a peak of the fluorine concentration in the surface portion 100a preferably exists in a region from the surface of the positive electrode active material 100 to a depth of 3 nm toward the center, further preferably to a depth of 1 nm, still further preferably to a depth of 0.5 nm.

Note that the concentration distribution may differ between additives. For example, in the case where the positive electrode active material 100 contains aluminum, magnesium, and fluorine as the additives, the distribution of aluminum is preferably slightly different from that of magnesium and that of fluorine. For example, in the EDX linear analysis, the peak of the magnesium concentration is preferably closer to the surface than the peak of the aluminum concentration is in the surface portion 100a. For example, the peak of the aluminum concentration is preferably present in a region from the surface of the positive electrode active material 100 to a depth of 0.5 nm or more and 20 nm or less toward the center, further preferably to a depth of 1 nm or more and 5 nm or less.

When the positive electrode active material 100 is subjected to linear analysis or surface analysis, the atomic ratio of an impurity I to the transition metal M (I/M) in the surface portion 100a is preferably greater than or equal to 0.05 and less than or equal to 1.00. When the impurity is titanium, the atomic ratio of titanium to the transition metal M(Ti/M) is preferably greater than or equal to 0.05 and less than or equal to 0.4, further preferably greater than or equal to 0.1 and less than or equal to 0.3. When the impurity is magnesium, the atomic ratio of magnesium to the transition metal M (Mg/A) is preferably greater than or equal to 0.4 and less than or equal to 1.5, further preferably greater than or equal to 0.45 and less than or equal to 1.00. When the impurity is fluorine, the atomic ratio of fluorine to the transition metal M (F/M) is preferably greater than or equal to 0.05 and less than or equal to 1.5, further preferably greater than or equal to 0.3 and less than or equal to 1.00.

When the line analysis or the surface analysis is performed on the positive electrode active material 100, the atomic ratio (I/M) between an additive I and the transition metal Min the vicinity of the crystal grain boundary is preferably greater than or equal to 0.020 and less than or equal to 0.50. It is further preferably greater than or equal to 0.025 and less than or equal to 0.30. It is still further preferably greater than or equal to 0.030 and less than or equal to 0.20. For example, when the additive is magnesium and the transition metal is cobalt, the atomic ratio (Mg/Co) between magnesium and cobalt is preferably greater than or equal to 0.020 and less than or equal to 0.50. It is further preferably greater than or equal to 0.025 and less than or equal to 0.30. It is still further preferably greater than or equal to 0.030 and less than or equal to 0.20.

As described above, excess additives in the positive electrode active material 100 might adversely affect insertion and extraction of lithium. The use of such a positive electrode active material 100 for a secondary battery might cause a resistance increase, a capacity decrease, and the like. Meanwhile, when the amount of impurities is insufficient, the impurities are not distributed over the surface portion 100a, which might reduce the effect of maintaining a crystal structure. The additives are required to be contained in the positive electrode active material 100 at appropriate concentrations; however, the adjustment of the concentrations is not easy.

For this reason, the positive electrode active material 100 may include a region where additives are unevenly distributed, for example. With such a region, excess additives are removed from the inner portion 100b, and the additive concentration in the inner portion 100b can be appropriate. An appropriate concentration of the additive in the inner portion 100b can inhibit a resistance increase, a capacity decrease, and the like when the positive electrode active material 100 is used for a secondary battery. A feature of suppressing an increase in resistance of a secondary battery is extremely preferable especially in charging and discharging at a high rate.

In the positive electrode active material 100 including the region where additives are unevenly distributed, addition of excess additives to some extent in the formation process is acceptable. This is preferable because the margin of production can be increased.

Note that in this specification and the like, uneven distribution means that the concentration of an element in a certain region differs from another region. It may be expressed by the terms segregation, deposition, unevenness, biased distribution, high concentration, low concentration, or the like.

<Crystal Structure>

A material with a layered rock-salt crystal structure, such as lithium cobalt oxide ($LiCoO_2$), is known to have a high discharge capacity and excel as a positive electrode active material of a secondary battery. As an example of the material with a layered rock-salt crystal structure, a composite oxide represented by $LiMO_2$ is given.

It is known that the Jahn-Teller effect in a transition metal compound varies in degree according to the number of electrons in the d orbital of the transition metal.

In a compound containing nickel, distortion is likely to be caused because of the Jahn-Teller effect in some cases. Accordingly, when high-voltage charge and discharge are performed on $LiNiO_2$, the crystal structure might be broken because of the distortion. The influence of the Jahn-Teller effect is suggested to be small in $LiCoO_2$; hence, $LiCoO_2$ is preferable because the resistance to high-voltage charge and discharge is higher in some cases.

Figure 6:
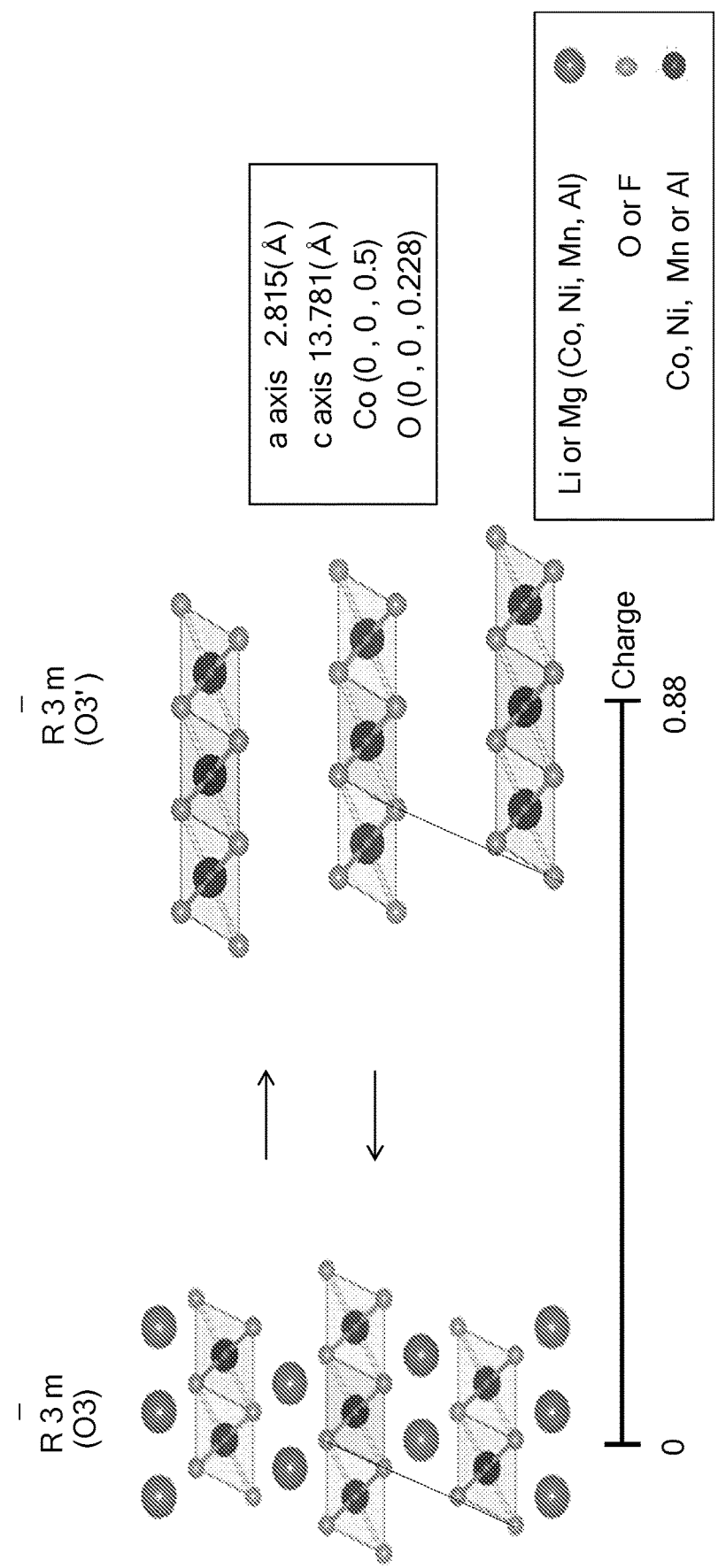
FIG. 6 is a diagram illustrating the charge depth and crystal structures of a positive electrode active material.
Figure 7:
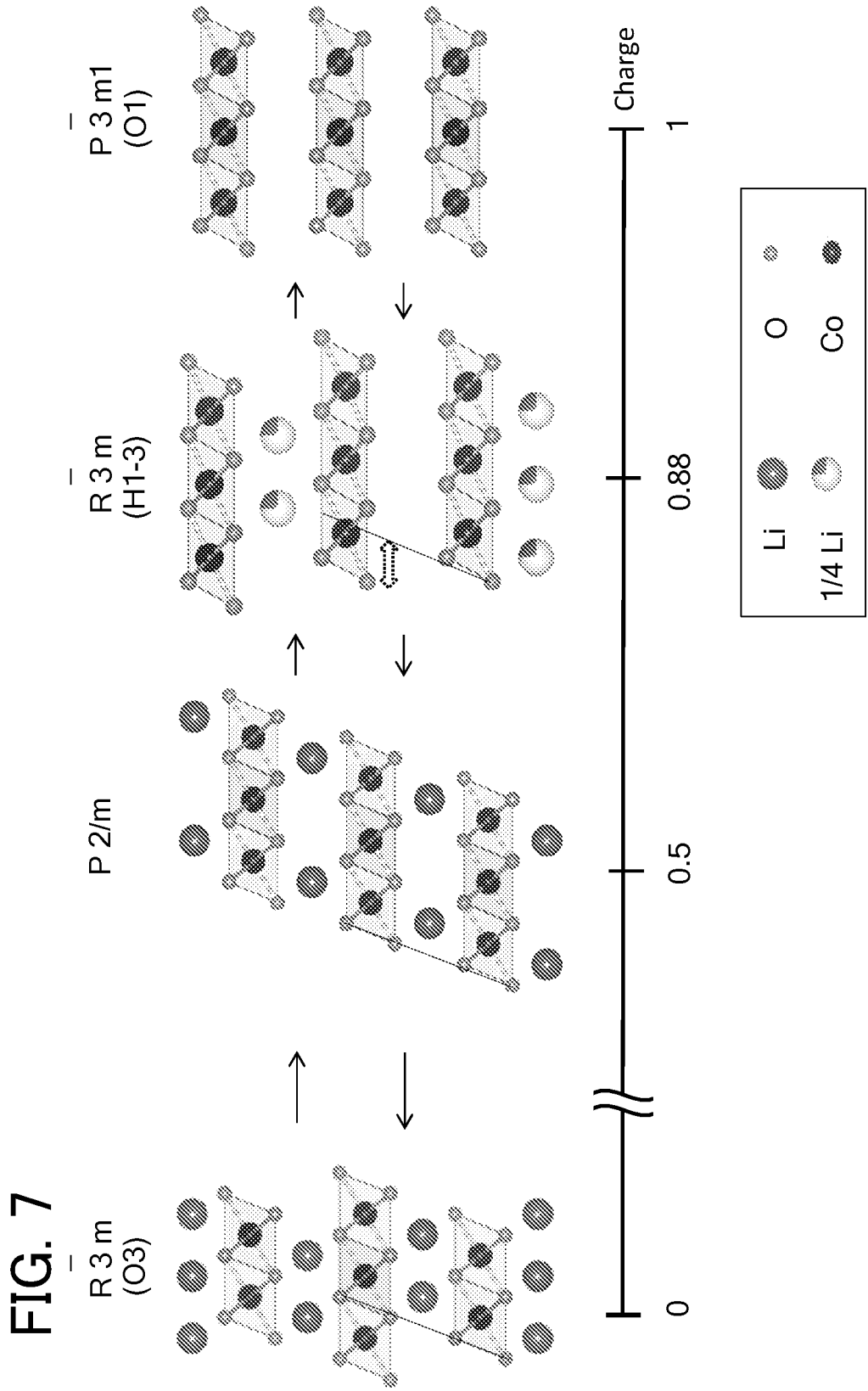
FIG. 7 is a diagram illustrating the charge depth and crystal structures of a positive electrode active material used as a comparative example.

The positive electrode active material is described with reference to FIG. 6 and FIG. 7. In FIG. 6 and FIG. 7, the case where cobalt is used as a transition metal contained in the positive electrode active material M is described.

<Conventional Positive Electrode Active Material>

A positive electrode active material illustrated in FIG. 7 is lithium cobalt oxide ($LiCoO_2$) to which fluorine and magnesium are not added in a manufacturing method described later. As described in Non-Patent Document 1, Non-Patent Document 2, and the like, the crystal structure of lithium cobalt oxide illustrated in FIG. 7 changes depending on the charge depth.

As illustrated in FIG. 7, lithium cobalt oxide with a charge depth of 0 (discharged state) includes a region having a crystal structure of the space group R-3m, lithium occupies octahedral sites, and three $CoO_2$ layers exist in a unit cell. Thus, this crystal structure is referred to as an O3 type crystal structure in some cases. Note that the $CoO_2$ layer has a structure in which octahedral geometry with oxygen hexacoordinated to cobalt continues on a plane in the edge-sharing state.

Lithium cobalt oxide with a charge depth of 1 has the crystal structure of the space group P-3m1, and one $CoO_2$ layer exists in a unit cell. Thus, this crystal structure is referred to as an O1 type crystal structure in some cases.

Moreover, lithium cobalt oxide with a charge depth of greater than or equal to 0.73, typically, approximately 0.88 has the crystal structure of the space group R-3m. This structure can also be regarded as a structure in which $CoO_2$ structures such as P-3m1 (O1) and $LiCoO_2$ structures such as R-3m (O3) are alternately stacked. Thus, this crystal structure is referred to as an H1-3 type crystal structure in some cases. Note that the number of cobalt atoms per unit cell in the actual H1-3 type crystal structure is twice as large as that of cobalt atoms per unit cell in other structures. However, in this specification including FIG. 7, the c-axis of the H1-3 type crystal structure is half that of the unit cell for easy comparison with the other structures.

As described in Non-Patent Document 3, For the H1-3 type crystal structure, the coordinates of cobalt and oxygen in the unit cell can be expressed as follows, for example: Co (0, 0, 0.42150±0.00016), $O_1$ (0, 0, 0.27671±0.00045), and $O_2$ (0, 0, 0.11535±0.00045). $O_1$ and $O_2$ are each an oxygen atom. In this manner, the H1-3 type crystal structure is represented by a unit cell including one cobalt and two oxygen. Meanwhile, the O3' type crystal structure of one embodiment of the present invention is preferably represented by a unit cell including one cobalt and one oxygen, as described later. This means that the symmetry of cobalt and oxygen differs between the O3' type structure and the H1-3 type structure, and the amount of change from the O3 structure is smaller in the O3' type structure than in the H1-3 type structure. A preferred unit cell for representing a crystal structure in a positive electrode active material is selected such that the value of GOF (goodness of fit) is smaller in the Rietveld analysis of XRD, for example.

When charge with a high voltage of 4.6 V or higher based on the redox potential of a lithium metal or charge with a large charge depth of 0.8 or more and discharge are repeated, the crystal structure of lithium cobalt oxide changes (i.e., an unbalanced phase change occurs) repeatedly between the H1-3 type crystal structure and the R-3m (O3) structure in a discharged state.

However, there is a large deviation in the position of the $CoO_2$ layer between these two crystal structures. As indicated by dotted lines and an arrow in FIG. 7, the $CoO_2$ layer in the H1-3 type crystal structure greatly shifts from that in the R-3m (O3) structure. Such a dynamic structural change might adversely affect the stability of the crystal structure.

A difference in volume is also large. The H1-3 type crystal structure and the O3 type crystal structure in a discharged state that contain the same number of cobalt atoms have a difference in volume of 3.0% or more.

In addition, a structure in which $CoO_2$ layers are continuous, such as P-3m1 (O1), included in the H1-3 type crystal structure is highly likely to be unstable.

Thus, the repeated high-voltage charge and discharge break the crystal structure of lithium cobalt oxide. The break of the crystal structure degrades the cycle performance. This is probably because the break of the crystal structure reduces sites where lithium can stably exist and makes it difficult to insert and extract lithium.

Positive Electrode Active Material of One
Embodiment of the Present Invention

<<Inner Portion>>

In the positive electrode active material 100 of one embodiment of the present invention, a deviation in the $CoO_2$ layers can be small in repeated high-voltage charge and discharge. Furthermore, the change in the volume can be small. Accordingly, the positive electrode active material of one embodiment of the present invention can achieve excellent cycle performance. In addition, the positive electrode active material of one embodiment of the present invention can have a stable crystal structure in a high-voltage charging state. Thus, in the positive electrode active material of one embodiment of the present invention, a short circuit is less likely to occur while the high-voltage charging state is maintained. This is preferable because the safety is further improved.

The positive electrode active material of one embodiment of the present invention has a small change in the crystal structure and a small difference in volume per the same number of transition metal atoms between a sufficiently discharging state and a high-voltage charging state.

FIG. 6 shows the crystal structures of the positive electrode active material 100 before and after being charged and discharged. The positive electrode active material 100 is a composite oxide containing lithium, cobalt as the transition metal M, and oxygen. In addition to the above, the positive electrode active material 100 preferably contains magnesium. Furthermore, the positive electrode active material 100 preferably contains halogen such as fluorine or chlorine.

The crystal structure with a charge depth of 0 (in the discharged state) in FIG. 6 is R-3m (O3) as in FIG. 7. Meanwhile, the positive electrode active material 100 with a charge depth in a sufficiently charged state includes a crystal whose structure is different from the H1-3 type crystal structure. This structure belongs to the space group R-3m, and is not a spinel type crystal structure but a structure in which oxygen is hexacoordinated to ions of cobalt, magnesium, or the like and the cation arrangement has symmetry similar to that of the spinel type crystal structure. Furthermore, the symmetry of $CoO_2$ layers of this structure is the same as that in the O3 type crystal structure. This structure is referred to as an O3' type crystal structure or a pseudo-spinel crystal structure in this specification and the like. Accordingly, the O3' type crystal structure may be rephrased as the pseudo-spinel crystal structure. Note that although the indication of lithium is omitted in the diagram of the O3' type crystal structure shown in FIG. 8 to explain the symmetry of cobalt atoms and the symmetry of oxygen atoms, a lithium of 20 atomic % or less, for example, with respect to cobalt practically exists between the $CoO_2$ layers. In addition, in both the O3 type crystal structure and the O3' type crystal structure, a slight amount of magnesium preferably exists between the $CoO_2$ layers, i.e., in lithium sites. In addition, a slight amount of halogen such as fluorine preferably exists in oxygen sites at random.

Note that in the O3' type crystal structure, a light element such as lithium is sometimes coordinated to four oxygen atoms. Also in that case, the ion arrangement has symmetry similar to that of the spinel crystal structure.

The O3' type crystal structure can also be regarded as a crystal structure that contains Li between layers at random but is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material containing a large amount of cobalt is known not to have this crystal structure in general.

In the positive electrode active material 100 of one embodiment of the present invention, a change in the crystal structure when high-voltage charge is performed and a large amount of lithium is released is inhibited as compared with a conventional positive electrode active material. As shown by dotted lines in FIG. 6, for example, $CoO_2$ layers hardly deviate in the crystal structures.

More specifically, the structure of the positive electrode active material 100 of one embodiment of the present invention is highly stable even when charge voltage is high. For example, the crystal structure of the conventional positive electrode active material changes to the H1-3 crystal structure at a charge voltage of approximately 4.6 V with reference to the potential of a lithium metal; whereas the positive electrode active material 100 of one embodiment of the present invention can maintain the R-3m (O3) crystal structure even at a charge voltage of approximately 4.6 V. At a higher charge voltage, for example, a voltage of approximately 4.65 V to 4.7 V with reference to the potential of a lithium metal, the positive electrode active material 100 of one embodiment of the present invention can have the O3' crystal structure. Furthermore, when the charge voltage is higher than 4.7 V, the H1-3 crystal is observed in the positive electrode active material 100 of one embodiment of the present invention in some cases. In addition, the positive electrode active material 100 of one embodiment of the present invention can have the O3' crystal structure in some cases even at a lower charge voltage (e.g., a charge voltage of higher than or equal to 4.5 V and lower than 4.6 V with reference to the potential of a lithium metal).

Note that in the case where graphite is used as a negative electrode active material in a secondary battery, for example, the voltage of the secondary battery is lower than the above-mentioned voltages by the potential of graphite. The potential of graphite is approximately 0.05 V to 0.2 V with reference to the potential of a lithium metal. Thus, even in a secondary battery which includes graphite as a negative electrode active material and which has a voltage of higher than or equal to 4.3 V and lower than or equal to 4.5 V, for example, the positive electrode active material 100 of one embodiment of the present invention can maintain the crystal structure belonging to R-3m (O3) and moreover, can have the O3' type crystal structure at higher voltages, e.g., a voltage of the secondary battery of higher than 4.5 V and lower than or equal to 4.6 V. In addition, the positive electrode active material 100 of one embodiment of the present invention can have the O3' type crystal structure at lower charge voltages, e.g., at a voltage of the secondary battery of higher than or equal to 4.2 V and lower than 4.3 V, in some cases.

Thus, in the positive electrode active material 100 of one embodiment of the present invention, the crystal structure is less likely to be disordered even when charge and discharge are repeated at high voltage.

In the unit cell of the O3' type crystal structure, coordinates of cobalt and oxygen can be represented by Co (0, 0, 0.5) and O (0, 0, x) within the range of $0.20 \leq x \leq 0.25$.

A slight amount of an additive, e.g., magnesium, existing between the $CoO_2$ layers, i.e., in lithium sites at random, has an effect of inhibiting a deviation in the $CoO_2$ layers in high-voltage charging. Thus, when magnesium exists between the $CoO_2$ layers, the O3' type crystal structure is likely to be formed. Therefore, magnesium is preferably distributed over whole particles of the positive electrode active material 100 of one embodiment of the present invention. In addition, to distribute magnesium over whole particles, heat treatment is preferably performed in the production process of the positive electrode active material 100 of one embodiment of the present invention.

However, cation mixing occurs when the heat treatment temperature is excessively high, so that the additive, e.g., magnesium, is highly likely to enter the cobalt sites. Magnesium in the cobalt sites does not have the effect of maintaining the R-3m structure in high-voltage charging. Furthermore, when the heat treatment temperature is excessively high, adverse effects such as reduction of cobalt to have a valence of two and transpiration of lithium are concerned.

In view of the above, a halogen compound such as fluoride is preferably added to lithium cobalt oxide before the heat treatment for distributing magnesium over whole particles. The addition of the fluoride depresses the melting point of lithium cobalt oxide. The depression of the melting point makes it easier to distribute magnesium over whole particles at a temperature at which the cation mixing is unlikely to occur. Furthermore, it is expected that the existence of the fluorine compound can improve corrosion resistance to hydrofluoric acid generated by decomposition of an electrolyte solution.

When the magnesium concentration is higher than a predetermined value, the effect of stabilizing a crystal structure becomes small in some cases. This is probably because magnesium enters the cobalt sites in addition to the lithium sites. The number of magnesium atoms in the positive electrode active material of one embodiment of the present invention is preferably 0.001 to 0.1 times, preferably larger than 0.01 times and less than 0.04 times, still further preferably approximately 0.02 times the number of atoms of transition metal M. The magnesium concentration described here may be a value obtained by element analysis on the entire particles of the positive electrode active material using ICP-MS or the like, or may be a value based on the ratio of the raw materials mixed in the production process of the positive electrode active material, for example.

To lithium cobalt oxide, as a metal other than cobalt (hereinafter, a metal Z), one or more metals selected from nickel, aluminum, manganese, titanium, vanadium, and chromium may be added, for example, and in particular, at least one of nickel and aluminum is preferably added. In some cases, manganese, titanium, vanadium, and chromium are likely to have a valence of four stably and thus contribute highly to a stable structure. The addition of the metal Z may enable the positive electrode active material of one embodiment of the present invention to have a more stable crystal structure in high-voltage charge, for example. Here, in the positive electrode active material of one embodiment of the present invention, the metal Z is preferably added at a concentration at which the crystallinity of the lithium cobalt oxide is not greatly changed. For example, the metal Z is preferably added at an amount with which the aforementioned Jahn-Teller effect is not exhibited.

As shown in the legend in FIG. 6, aluminum and transition metals typified by nickel and manganese preferably exist in cobalt sites, but some of them may exist in lithium sites. Magnesium preferably exists in lithium sites. Fluorine may be substituted for part of oxygen.

As the magnesium concentration in the positive electrode active material of one embodiment of the present invention increases, the capacity of the positive electrode active material decreases in some cases. As an example, one possible reason is that the amount of lithium that contributes to charge and discharge decreases when magnesium enters the lithium sites. Furthermore, excess magnesium sometimes generates a magnesium compound that does not contribute to charge and discharge. When the positive electrode active material of one embodiment of the present invention contains nickel as the metal Z in addition to magnesium, the capacity per weight and per volume can be increased in some cases. When the positive electrode active material of one embodiment of the present invention contains aluminum as the metal Z in addition to magnesium, the capacity per weight and per volume can be increased in some cases. When the positive electrode active material of one embodiment of the present invention contains nickel and aluminum in addition to magnesium, the capacity per weight and per volume can be increased in some cases.

The concentrations of the elements, such as magnesium and the metal Z, contained in the positive electrode active material of one embodiment of the present invention are described below using the number of atoms.

The number of nickel atoms in the positive electrode active material of one embodiment of the present invention is preferably 7.5% or less, further preferably 0.05% or more and 4% or less, still further preferably 0.1% or more and 2% or less of the number of cobalt atoms. The nickel concentration described here may be a value obtained by element analysis on the entire particle of the positive electrode active material using ICP-MS or the like, or may be a value based on the ratio of the raw materials mixed in the production process of the positive electrode active material, for example.

The number of aluminum atoms in the positive electrode active material of one embodiment of the present invention is preferably 0.05% or more and 4% or less, further preferably 0.1% or more and 2% or less of the number of cobalt atoms. The aluminum concentration described here may be a value obtained by element analysis on the entire particle of the positive electrode active material using ICP-MS or the like, or may be a value based on the ratio of the raw materials mixed in the process of producing the positive electrode active material, for example.

It is preferable that the positive electrode active material of one embodiment of the present invention include an element X, and phosphorus be used as the element X. The positive electrode active material of one embodiment of the present invention further preferably includes a compound including phosphorus and oxygen.

When the positive electrode active material of one embodiment of the present invention includes a compound including the element X, a short circuit is less likely to occur while the high-voltage charged state is maintained in some cases.

When the positive electrode active material of one embodiment of the present invention contains phosphorus as the element X, phosphorus may react with hydrogen fluoride generated by the decomposition of the electrolyte solution, which might decrease the hydrogen fluoride concentration in the electrolyte solution.

In the case where the electrolyte solution contains $LiPF_6$, hydrogen fluoride may be generated by hydrolysis. In some cases, hydrogen fluoride is generated by the reaction of PVDF used as a component of the positive electrode and alkali. The decrease in hydrogen fluoride concentration in the electrolyte solution can inhibit corrosion or coating film separation of a current collector in some cases. Furthermore, the decrease in hydrogen fluoride concentration in the charge solution can inhibit a reduction in adhesion properties due to gelling or insolubilization of PVDF in some cases.

When containing magnesium in addition to the element X, the positive electrode active material of one embodiment of the present invention is extremely stable in the high-voltage charged state. When the element X is phosphorus, the number of phosphorus atoms is preferably 1% or more and 20% or less, further preferably 2% or more and 10% or less, still further preferably 3% or more and 8% or less of the number of cobalt atoms. In addition, the number of magnesium atoms is preferably 0.1% or more and 10% or less, further preferably 0.5% or more and 5% or less, still further preferably 0.7% or more and 4% or less of the number of cobalt atoms. The phosphorus concentration and the magnesium concentration described here may each be a value obtained by element analysis on the entire particle of the positive electrode active material using ICP-MS or the like, or may be a value based on the ratio of the raw materials mixed in the process of producing the positive electrode active material, for example.

In the case where the positive electrode active material has a crack, phosphorus, more specifically, a compound containing phosphorus and oxygen, in the inner portion of the crack may inhibit crack development, for example.

<<Surface Portion>>

Magnesium is preferably distributed over whole particles of the positive electrode active material 100 of one embodiment of the present invention, and further preferably, the magnesium concentration in the surface portion 100a of the particle is higher than the average in whole particles. For example, the magnesium concentration in the surface portion 100a of the particle that is measured by XPS or the like is preferably higher than the average magnesium concentration in whole particles measured by ICP-MS or the like.

In the case where the positive electrode active material 100 of one embodiment of the present invention contains an element other than cobalt, for example, one or more metals selected from nickel, aluminum, manganese, iron, and chromium, the concentration of the metal(s) in the surface portion is preferably higher than the average concentration of the metal(s) in the whole particle. For example, the concentration of the element other than cobalt in the surface portion 100a of the particle measured by XPS or the like is preferably higher than the average concentration of the element in the whole particle measured by ICP-MS or the like.

The surface of the particle is a kind of crystal defects and lithium is extracted from the surface during charging; thus, the lithium concentration in the surface of the particle tends to be lower than that inside the particle. Therefore, the surface of the particle tends to be unstable and its crystal structure is likely to break. The higher the magnesium concentration in the surface portion 100a is, the more effectively the change in the crystal structure can be inhibited. In addition, when a magnesium concentration in the surface portion 100a is high, it is expected that the corrosion resistance to hydrofluoric acid generated by the decomposition of the electrolyte solution is improved.

In addition, the concentration of fluorine in the surface portion 100a of the positive electrode active material 100 of one embodiment of the present invention is preferably higher than the average concentration of halogen such as fluorine in whole particles. When fluorine exists in the surface portion 100a that is a region in contact with an electrolyte solution, the corrosion resistance to hydrofluoric acid can be effectively improved.

In this manner, the surface portion 100a of the positive electrode active material 100 of one embodiment of the present invention preferably has higher concentrations of additives such as magnesium and fluorine than those in the inner portion 100b and a composition different from that in the inner portion 100b. In addition, the composition preferably has a crystal structure stable at normal temperature. Thus, the surface portion 100a may have a crystal structure different from that of the inner portion 100b. For example, at least part of the surface portion 100a of the positive electrode active material 100 of one embodiment of the present invention may have a rock-salt crystal structure. Furthermore, in the case where the surface portion 100a and the inner portion 100b have different crystal structures, the orientations of crystals in the surface portion 100a and the inner portion 100b are preferably substantially aligned.

Only with the structure where the surface portion 100a includes only MgO or MgO and CoO(II) forms a solid solution, it is difficult to insert and extract lithium. Thus, the surface portion 100a should contain at least cobalt, and further contain lithium in the discharged state to have a path through which lithium is inserted and extracted. In addition, the concentration of cobalt is preferably higher than that of magnesium.

The element X is preferably positioned in the surface portion 100a of the particle of the positive electrode active material 100 of one embodiment of the present invention. For example, the positive electrode active material 100 of one embodiment of the present invention may be covered with a coating film containing the element X.

<<Grain Boundary>>

The additive contained in the positive electrode active material 100 of one embodiment of the present invention may randomly exist in the inner portion at a slight concentration, but part of the additive element is further preferably segregated at a grain boundary.

In other words, the concentration of the additive in the crystal grain boundary and its vicinity of the positive electrode active material 100 of one embodiment of the present invention is preferably higher than that in the other regions in the inner portion.

Like the particle surface, the crystal grain boundary is also a plane defect. Thus, the crystal grain boundary tends to be unstable and its crystal structure easily starts to change. Therefore, the higher the concentration of the additive in the crystal grain boundary and its vicinity is, the more effectively the change in the crystal structure can be inhibited.

In the case where the concentration of the addition is high in the crystal grain boundary and its vicinity, even when a crack is generated along the grain boundary of the particle of the positive electrode active material 100 of one embodiment of the present invention, the concentration of the addition is increased in the vicinity of the surface generated by the crack. Thus, the positive electrode active material after the cracks are generated can also have increased corrosion resistance to hydrofluoric acid.

Note that in this specification and the like, the vicinity of the crystal grain boundary refers to a region of approximately 10 nm from the grain boundary.

<<Particle Size>>

A too large particle size of the positive electrode active material 100 of one embodiment of the present invention causes problems such as difficulty in lithium diffusion and too much surface roughness of an active material layer in coating to a current collector. By contrast, too small a particle size causes problems such as difficulty in loading of the active material layer in coating to the current collector and overreaction with an electrolyte solution. Therefore, an average particle diameter (D50, also referred to as median diameter) is preferably greater than or equal to 1 μm and less than or equal to 100 μm, further preferably greater than or equal to 2 μm and less than or equal to 40 μm, still further preferably greater than or equal to 5 μm and less than or equal to 30 μm.

<Analysis Method>

Whether or not a positive electrode active material is the positive electrode active material 100 of one embodiment of the present invention that has an O3' type crystal structure when charged with high voltage can be determined by analyzing a high-voltage charged positive electrode using XRD, electron diffraction, neutron diffraction, electron spin resonance (ESR), nuclear magnetic resonance (NMR), or the like. The XRD is particularly preferable because the symmetry of a transition metal such as cobalt contained in the positive electrode active material can be analyzed with high resolution, the degrees of crystallinity and the crystal orientations can be compared, the distortion of lattice periodicity and the crystallite size can be analyzed, and a positive electrode obtained by disassembling a secondary battery can be measured without any change with sufficient accuracy, for example.

As described so far, the positive electrode active material 100 of one embodiment of the present invention has a feature of a small change in the crystal structure between the high-voltage charged state and the discharged state. A material where 50 wt % or more of the crystal structure largely changes between the high-voltage charged state and the discharged state is not preferable because the material cannot withstand the high-voltage charge and discharge. In addition, it should be noted that an objective crystal structure is not obtained in some cases only by addition of additive elements. For example, although the positive electrode active material that is lithium cobalt oxide containing magnesium and fluorine is a commonality, the positive electrode active material has 60 wt % or more of the O3' type crystal structure in some cases, and has 50 wt % or more of the H1-3 type crystal structure in other cases, when charged with high voltage. Furthermore, at a predetermined voltage, the positive electrode active material has almost 100 wt % of the O3' type crystal structure, and with an increase in the predetermined voltage, the H1-3 type crystal structure is generated in some cases. Thus, analysis of the crystal structure, including XRD, is needed to determine whether or not the positive electrode active material is the positive electrode active material 100 of one embodiment of the present invention.

Note that a positive electrode active material in the high-voltage charged state or the discharged state sometimes causes a change in the crystal structure when exposed to the air. For example, the O3' type crystal structure changes into the H1-3 type crystal structure in some cases. Thus, all samples are preferably handled in an inert atmosphere such as an argon atmosphere.

<<Charging Method>>

High-voltage charge for determining whether or not a composite oxide is the positive electrode active material 100 of one embodiment of the present invention can be performed on a CR2032 coin cell (with a diameter of 20 mm and a height of 3.2 mm) with a lithium counter electrode, for example.

More specifically, a positive electrode can be formed by application of a slurry in which the positive electrode active material, a conductive additive, and a binder are mixed to a positive electrode current collector made of aluminum foil.

A lithium metal can be used for a counter electrode. Note that when the counter electrode is formed using a material other than the lithium metal, the potential of a secondary battery differs from the potential of the positive electrode. Unless otherwise specified, the voltage and the potential in this specification and the like refer to the potential of a positive electrode.

As an electrolyte contained in an electrolyte solution, 1 mol/L lithium hexafluorophosphate ($LiPF_6$) can be used. As the electrolyte solution, a solution in which ethylene carbonate (EC) and diethyl carbonate (DEC) at a volume ratio of 3:7 and vinylene carbonate (VC) at 2 wt % are mixed can be used.

As a separator, 25-μm-thick polypropylene can be used.

Stainless steel (SUS) can be used for a positive electrode can and a negative electrode can.

The coin cell formed under the above conditions is charged with constant current at 4.6 V and 0.5 C and then charged with constant voltage until the current value reaches 0.01 C. Note that here, 1 C is set to 137 mA/g. The temperature is set to 25° C. After the charge is performed in this manner, the coin cell is disassembled in a glove box with an argon atmosphere and the positive electrode is taken out, whereby the high-voltage charged positive electrode active material can be obtained. In order to inhibit reaction with components in the external world, the positive electrode active material is preferably hermetically sealed in an argon atmosphere when subjected to various analyses later. For example, XRD can be performed on the positive electrode active material enclosed in an airtight container with an argon atmosphere.

<<XRD>>

The apparatus and conditions adopted in the XRD measurement are not particularly limited. The measurement can be performed with the apparatus and conditions as described below, for example.

XRD apparatus: D8 ADVANCE produced by Bruker AXS
X-ray source: CuKα radiation
Output: 40 KV, 40 mA
Slit system: Div. Slit, 0.5°
Detector: LynxEye
Scanning method: 2θ/θ continuous scanning
Measurement range (2θ): from 15° to 90°
Step width (2θ): 0.01°
Counting time: 1 second/step
Rotation of sample stage: 15 rpm In the case where the measurement sample is a powder, the sample can be set by, for example, being put in a glass sample holder or being sprinkled on a reflection-free silicon plate to which grease is applied. In the case where the measurement sample is a positive electrode, the sample can be set in such a manner that the positive electrode is attached to a substrate with a double-sided adhesive tape so that the position of the positive electrode active material layer can be adjusted to the measurement plane required by the apparatus.

Figure 8:
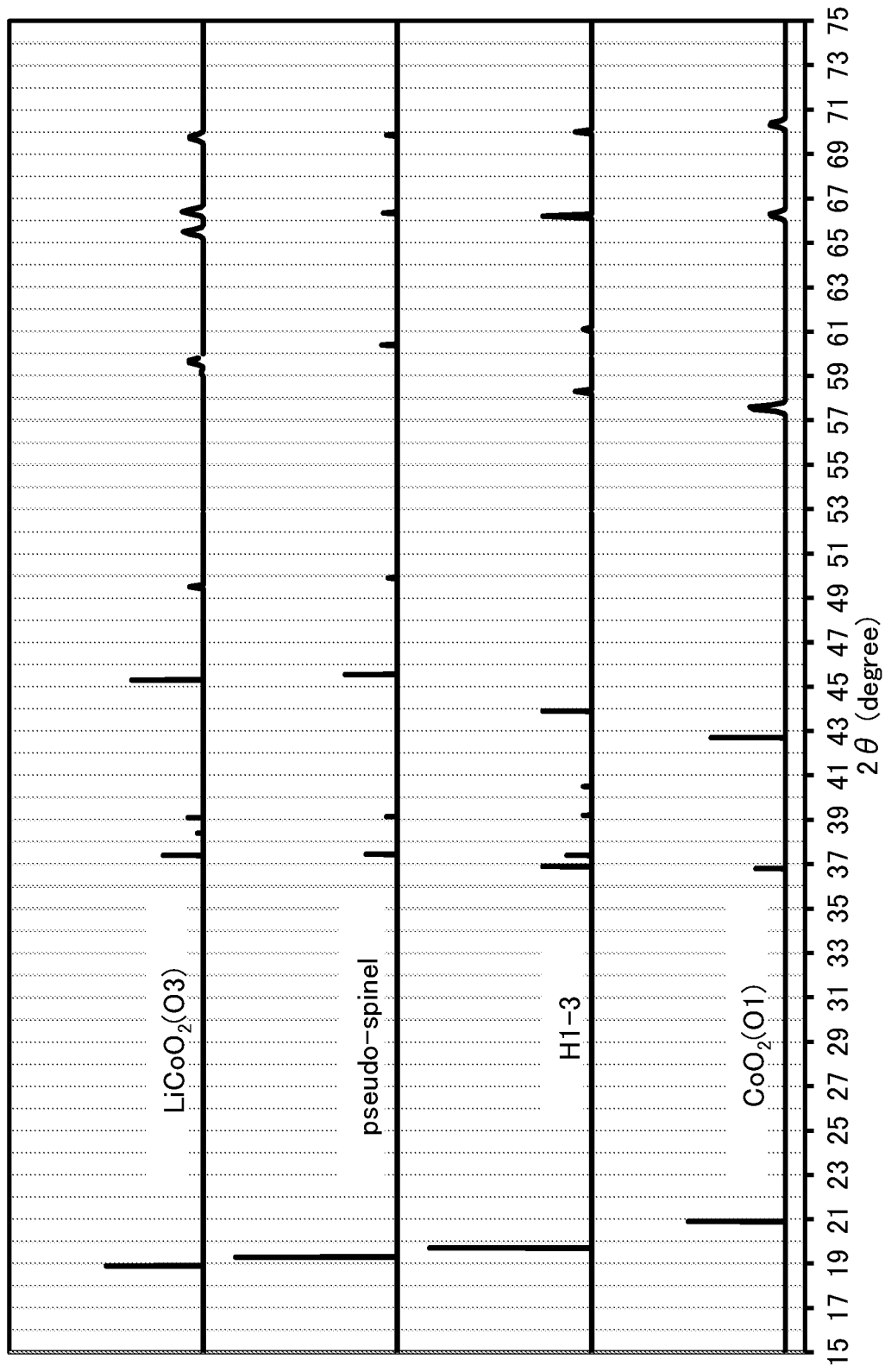
FIG. 8 is a graph showing an XRD pattern calculated from crystal structures.

FIG. 8 shows ideal powder XRD patterns with $CuKα_1$ radiation that are calculated from models of the O3' type crystal structure and the H1-3 type crystal structure. For comparison, ideal XRD patterns calculated from the crystal structure of $LiCoO_2$ (O3) with a charge depth of 0 and the crystal structure of $CoO_2$ (O1) with a charge depth of 1 are also shown. Note that the patterns of $LiCoO_2$ (O3) and $CoO_2$ (O1) were made from crystal structure data obtained from the Inorganic Crystal Structure Database (ICSD) (see Non-Patent Document 4) with Reflex Powder Diffraction, which is a module of Materials Studio (BIOVIA). The range of 2θ was from 15° to 75°, the step size was 0.01, the wavelength λ1 was $1.540562 \times 10^{-10}$ m, the wavelength λ2 was not set, and a single monochromator was used. The pattern of the H1-3 type crystal structure was similarly made from the crystal structure data disclosed in Non-Patent Document 3. The O3' type crystal structure was estimated from the XRD pattern of the positive electrode active material of one embodiment of the present invention, the crystal structure was fitted with TOPAS Version 3 (crystal structure analysis software produced by Bruker Corporation), and the XRD pattern of the O3' type crystal structure was made in a similar manner to other structures.

As shown in FIG. 8, the O3' type crystal structure exhibits diffraction peaks at 2θ of 19.30±0.20° (greater than or equal to 19.10° and less than or equal to 19.50°) and 2θ of 45.55±0.10° (greater than or equal to 45.450 and less than or equal to 45.65°). More specifically, the O3' type crystal structure exhibits sharp diffraction peaks at 2θ of 19.30±0.100 (greater than or equal to 19.20° and less than or equal to 19.40°) and 2θ of 45.55±0.05° (greater than or equal to 45.500 and less than or equal to 45.60°). By contrast, the H1-3 type crystal structure and $CoO_2$ (P-3m1, O1) do not exhibit peaks at these positions. Thus, the peaks at 2θ of 19.30±0.20° and 2θ of 45.55±0.100 in a charged state with high voltage can be the features of the positive electrode active material 100 of one embodiment of the present invention.

It can be said that the positions of the XRD diffraction peaks exhibited by the crystal structure with a charge depth of 0 are close to those of the XRD diffraction peaks exhibited by the crystal structure in the high-voltage charged state. More specifically, it can be said that a difference in the positions of two or more, preferably three or more of the main diffraction peaks between the crystal structures is 2θ=0.7 or less, preferably 2θ=0.5 or less.

Although the positive electrode active material 100 of one embodiment of the present invention has the O3' type crystal structure charged with high voltage, not all the particles necessarily have the O3' type crystal structure. Some of the particles may have another crystal structure or be amorphous. Note that when the XRD patterns are subjected to the Rietveld analysis, the O3' type crystal structure preferably accounts for greater than or equal to 50 wt %, further preferably greater than or equal to 60 wt %, still further preferably greater than or equal to 66 wt % of the positive electrode active material. The positive electrode active material in which the O3' type crystal structure accounts for greater than or equal to 50 wt %, preferably greater than or equal to 60 wt %, further preferably greater than or equal to 66 wt % can have sufficiently good cycle performance.

Furthermore, even after 100 or more cycles of charge and discharge after the measurement starts, the O3' type crystal structure preferably accounts for greater than or equal to 35 wt %, further preferably greater than or equal to 40 wt %, still further preferably greater than or equal to 43 wt %, in the Rietveld analysis.

The crystallite size of the O3' type crystal structure of the positive electrode active material particle is decreased to approximately one-tenth that of $LiCoO_2$ (O3) in a discharged state. Thus, the peak of the O3' type crystal structure can be clearly observed after high-voltage charging even under the same XRD measurement conditions as those of a positive electrode before charge and discharge. By contrast, simple $LiCoO_2$ has a small crystallite size and exhibits a broad and small peak although it can partly have a structure similar to the O3' type crystal structure. The crystallite size can be calculated from the half width of the XRD peak.

As described above, the influence of the Jahn-Teller effect is preferably small in the positive electrode active material of one embodiment of the present invention. It is preferable that the positive electrode active material of one embodiment of the present invention have a layered rock-salt crystal structure and mainly contain cobalt as a transition metal. The positive electrode active material of one embodiment of the present invention may contain the above-described metal Z in addition to cobalt as long as the influence of the Jahn-Teller effect is small.

The range of the lattice constants where the influence of the Jahn-Teller effect is presumed to be small in the positive electrode active material is examined by XRD analysis.

Figure 9A:
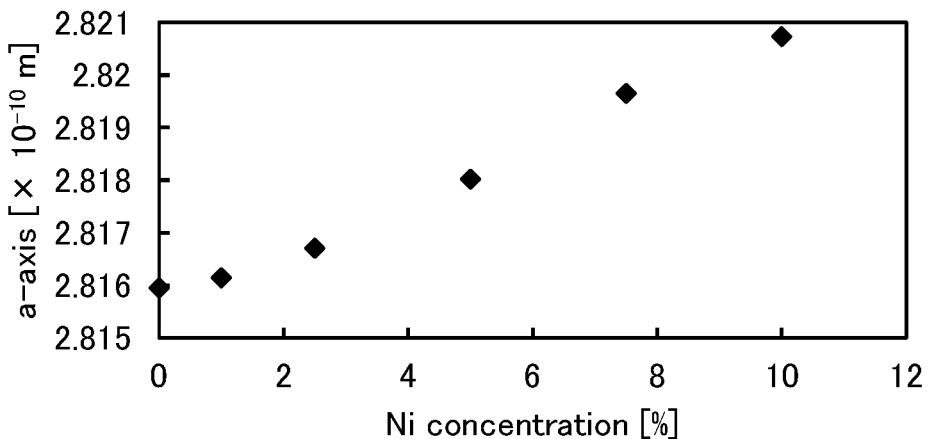
FIG. 9A to FIG. 9C show lattice constants calculated from the XRD.
Figure 9B:
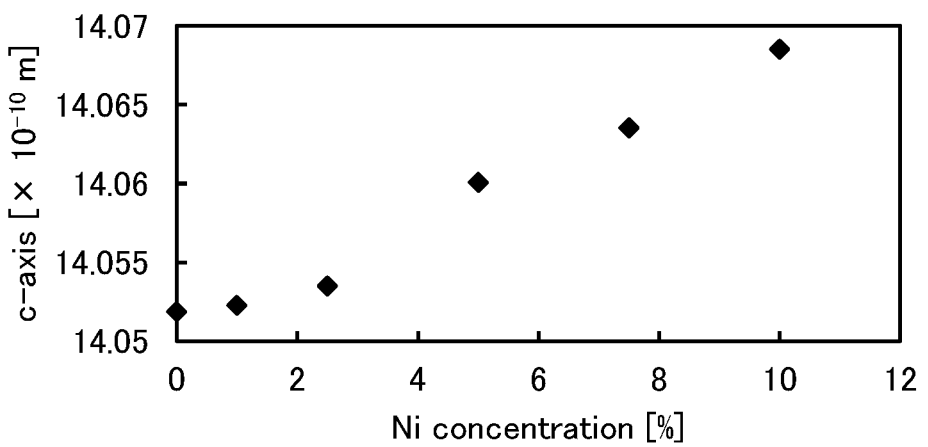

FIG. 9 shows the estimation results of the lattice constants of the a-axis and the c-axis by XRD in the case where the positive electrode active material of one embodiment of the present invention has a layered rock-salt crystal structure and contains cobalt and nickel. FIG. 9A shows the results of the a-axis, and FIG. 9B shows the results of the c-axis. Note that FIG. 9 shows an XRD pattern of a powder of the positive electrode active material after being synthesized and before being assembled into the positive electrode. The nickel concentration on the horizontal axis represents a nickel concentration with the sum of cobalt atoms and nickel atoms regarded as 100%. The positive electrode active material is formed through Step S21 to Step S25, which are described later, and a cobalt source and a nickel source are used in Step S21. The nickel concentration represents a nickel concentration with the sum of cobalt atoms and nickel atoms regarded as 100% in Step S21.

Figure 10A:
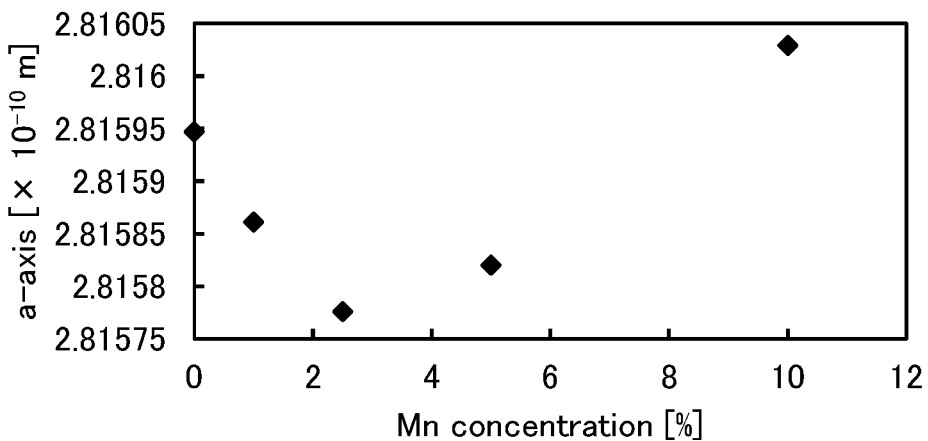
FIG. 10A to FIG. 10C show lattice constants calculated from the XRD.
Figure 10B:
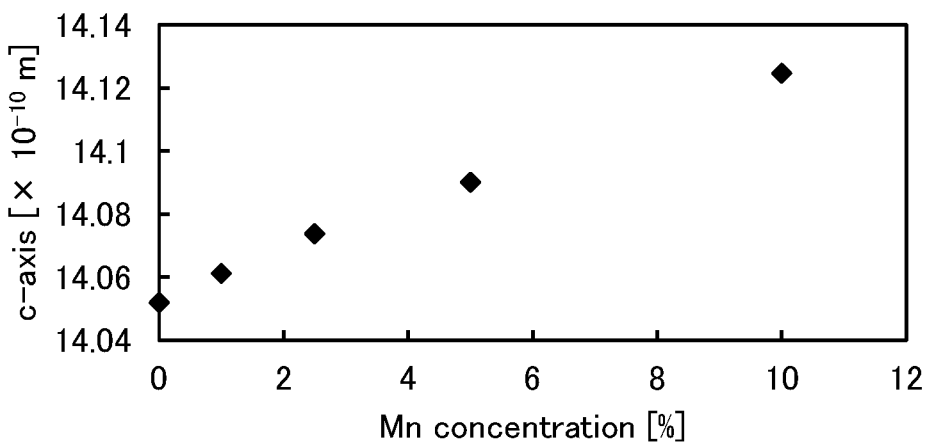

FIG. 10 shows the estimation results of the lattice constants of the a-axis and the c-axis by XRD in the case where the positive electrode active material of one embodiment of the present invention has a layered rock-salt crystal structure and contains cobalt and manganese. FIG. 10A shows the results of the a-axis, and FIG. 10B shows the results of the c-axis. Note that FIG. 10 shows an XRD pattern of a powder of the positive electrode active material after being synthesized and before being assembled into the positive electrode. The manganese concentration on the horizontal axis represents a manganese concentration with the sum of cobalt atoms and manganese atoms regarded as 100%. The positive electrode active material is formed through Step S21 to Step S25, which are described later, and a cobalt source and a manganese source are used in Step S21. The manganese concentration represents a manganese concentration with the sum of cobalt atoms and manganese atoms regarded as 100% in Step S21.

Figure 9C:
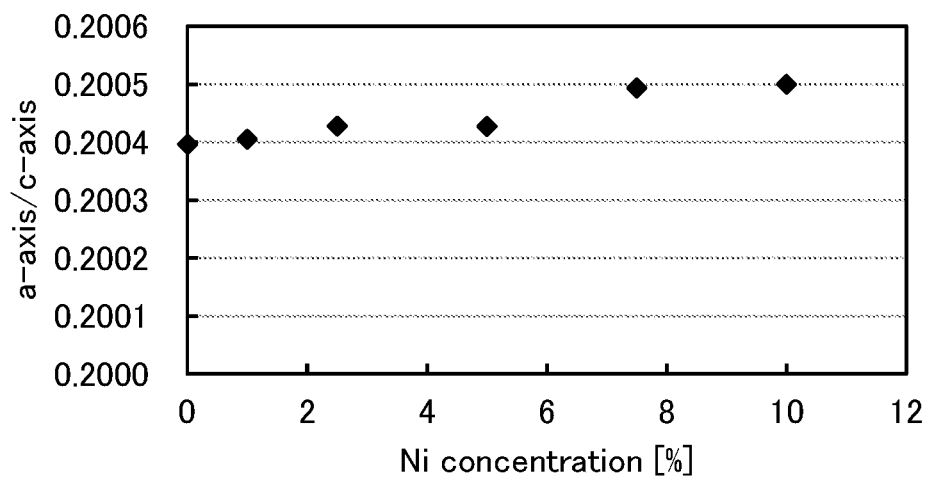
Figure 10C:
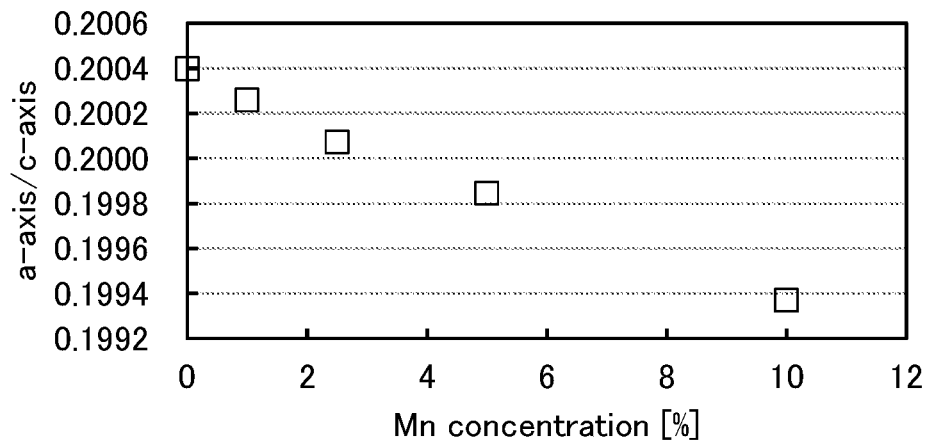

FIG. 9C shows values obtained by dividing the lattice constants of the a-axis by the lattice constants of the c-axis (a-axis/c-axis) in the positive electrode active material, whose results of the lattice constants are shown in FIGS. 9A and 9B. FIG. 10C shows values obtained by dividing the lattice constants of the a-axis by the lattice constants of the c-axis (a-axis/c-axis) in the positive electrode active material, whose results of the lattice constants are shown in FIGS. 10A and 10B.

As shown in FIG. 9C, the value of a-axis/c-axis tends to significantly change between nickel concentrations of 5% and 7.5%, indicating that the distortion of the a-axis becomes large. This distortion may be the Jahn-Teller distortion. It is suggested that an excellent positive electrode active material with small Jahn-Teller distortion can be obtained at a nickel concentration of lower than 7.5%.

FIG. 10A indicates that the lattice constant changes differently at manganese concentrations of 5% or higher and does not follow the Vegard's law. This suggests that the crystal structure changes at manganese concentrations of 5% or higher. Thus, the manganese concentration is preferably 4% or lower, for example.

Note that the nickel concentration and the manganese concentration in the surface portion 100a of the particle are not limited to the above ranges. In other words, the nickel concentration and the manganese concentration in the surface portion 100a of the particle may be higher than the above concentrations in some cases.

Preferable ranges of the lattice constants of the positive electrode active material of one embodiment of the present invention are examined above. In the layered rock-salt crystal structure of the particle of the positive electrode active material in a discharged state or a state where charge and discharge are not performed, which can be estimated from the XRD patterns, the lattice constant of the a-axis is preferably greater than $2.814 \times 10^{-10}$ m and less than $2.817 \times 10^{-10}$ m, and the lattice constant of the c-axis is preferably greater than $14.05 \times 10^{-10}$ m and less than $14.07 \times 10^{-10}$ m. The state where charge and discharge are not performed may be the state of a powder before the formation of a positive electrode of a secondary battery.

Alternatively, in the layered rock-salt crystal structure of the particle of the positive electrode active material in the discharged state or the state where charge and discharge are not performed, the value obtained by dividing the lattice constant of the a-axis by the lattice constant of the c-axis (a-axis/c-axis) is preferably greater than 0.20000 and less than 0.20049.

Alternatively, when the layered rock-salt crystal structure of the particle of the positive electrode active material in the discharged state or the state where charge and discharge are not performed is subjected to XRD analysis, a first peak is observed at 2θ of greater than or equal to 18.50° and less than or equal to 19.30°, and a second peak is observed at 2θ of greater than or equal to 38.00° and less than or equal to 38.80°, in some cases.

Note that the peaks appearing in the powder XRD patterns reflect the crystal structure of the inner portion 100b of the positive electrode active material 100, which accounts for the majority of the volume of the positive electrode active material 100. The crystal structure of the surface portion 100a or the like can be analyzed by electron diffraction of a cross section of the positive electrode active material 100, for example.

<<XPS>>

A region from the surface to a depth of approximately 2 nm to 8 nm (normally, approximately 5 nm) can be analyzed by X-ray photoelectron spectroscopy (XPS); thus, the concentrations of elements in approximately half of the surface portion 100a in the depth direction can be quantitatively analyzed. The bonding states of the elements can be analyzed by narrow scanning. Note that the quantitative accuracy of XPS is approximately ±1 atomic % in many cases. The lower detection limit is approximately 1 atomic % but depends on the element.

When the positive electrode active material 100 of one embodiment of the present invention is subjected to XPS analysis, the number of atoms of the additive is preferably greater than or equal to 1.6 times and less than or equal to 6.0 times, further preferably greater than or equal to 1.8 times and less than 4.0 times the number of atoms of the transition metal M. When the additive is magnesium and the transition metal M is cobalt, the number of magnesium atoms is preferably greater than or equal to 1.6 times and less than or equal to 6.0 times, further preferably greater than or equal to 1.8 times and less than 4.0 times the number of cobalt atoms. The number of atoms of fluorine is preferably greater than or equal to 0.2 times and less than or equal to 6.0 times, further preferably greater than or equal to 1.2 times and less than or equal to 4.0 times the number of atoms of the transition metal M.

In the XPS analysis, monochromatic aluminum can be used as an X-ray source, for example. An extraction angle is, for example, 45°.

In addition, when the positive electrode active material 100 of one embodiment of the present invention is analyzed by XPS, a peak indicating the bonding energy of fluorine with another element is preferably higher than or equal to 682 eV and lower than 685 eV, further preferably approximately 684.3 eV. This bonding energy is different from that of lithium fluoride (685 eV) and that of magnesium fluoride (686 eV). That is, the positive electrode active material 100 of one embodiment of the present invention containing fluorine is preferably in the bonding state other than lithium fluoride and magnesium fluoride.

Furthermore, when the positive electrode active material 100 of one embodiment of the present invention is analyzed by XPS, a peak indicating the bonding energy of magnesium with another element is preferably higher than or equal to 1302 eV and lower than 1304 eV, further preferably approximately 1303 eV. This bonding energy is different from that of magnesium fluoride (1305 eV) and is close to that of magnesium oxide. That is, the positive electrode active material 100 of one embodiment of the present invention containing magnesium is preferably in the bonding state other than magnesium fluoride.

The concentrations of additives that preferably exist in the surface portion 100a in large amount, such as magnesium and aluminum, measured by XPS or the like are preferably higher than the concentrations measured by inductively coupled plasma mass spectrometry (ICP-MS), glow discharge mass spectrometry (GD-MS), or the like.

When the positive electrode active material 100 is processed such that its cross section is exposed to be analyzed by TEM-EDX, the concentrations of magnesium and aluminum in the surface portion 100a are preferably higher than those in the inner portion 100b. A focused ion beam (FIB) can be used for the processing, for example.

In the X-ray photoelectron spectroscopy (XPS), the number of magnesium atoms is preferably greater than or equal to 0.4 times and less than or equal to 1.5 times the number of cobalt atoms. In the ICP-MS analysis, the atomic ratio of magnesium to cobalt (Mg/Co) is preferably greater than or equal to 0.001 and less than or equal to 0.06.

By contrast, it is preferable that nickel, which is one of the transition metals M, not be unevenly distributed in the surface portion 100a but be distributed over the positive electrode active material 100. Note that one embodiment of the present invention is not limited thereto in the case where a region in which the excess additives are unevenly distributed exists.

<<Surface Roughness and Specific Surface Area>>

The positive electrode active material 100 of one embodiment of the present invention preferably has a smooth surface with little unevenness. A smooth surface with little unevenness indicates favorable distribution of the additive in the surface portion 100a.

A smooth surface with little unevenness can be recognized from, for example, a cross-sectional SEM image or a cross-sectional TEM image of the positive electrode active material 100 or the specific surface area of the positive electrode active material 100.

The level of the surface smoothness of the positive electrode active material 100 can be quantified from its cross-sectional SEM image, as will be described below, for example.

First, the positive electrode active material 100 is processed with an FIB or the like such that its cross section is exposed. At this time, the positive electrode active material 100 is preferably covered with a protective film, a protective agent, or the like. Next, a SEM image of the interface between the positive electrode active material 100 and the protective film or the like is taken. The SEM image is subjected to noise processing using image processing software. For example, the Gaussian Blur (σ=2) is performed, followed by binarization. In addition, interface extraction is performed using image processing software. Moreover, an interface line between the positive electrode active material 100 and the protective film or the like is selected with an automatic selection tool or the like, and data is extracted to spreadsheet software or the like. With the use of the function of the spreadsheet software or the like, correction is performed using regression curves (quadratic regression), parameters for calculating roughness are obtained from data subjected to slope correction, and root-mean-square (RMS) surface roughness is obtained by calculating standard deviation. This surface roughness refers to the surface roughness of part of the particle periphery (at least 400 nm) of the positive electrode active material.

On the surface of the particle of the positive electrode active material 100 of this embodiment, root-mean-square (RMS) surface roughness, which is an index of roughness, is preferably less than 3 nm, further preferably less than 1 nm, still further preferably less than 0.5 nm.

Note that the image processing software used for the noise processing, the interface extraction, or the like is not particularly limited, and "ImageJ" can be used, for example. In addition, the spreadsheet software or the like is not particularly limited, and Microsoft Office Excel can be used, for example.

For example, the level of surface smoothness of the positive electrode active material 100 can also be quantified from the ratio of the actual specific surface area $A_R$ measured by a constant-volume gas adsorption method to the ideal specific surface area $A_i$.

The ideal specific surface area $A_i$ is calculated on the assumption that all the particles have the same diameter as D50, have the same weight, and have ideal spherical shapes.

The median diameter D50 can be measured with a particle size analyzer or the like using a laser diffraction and scattering method. The specific surface area can be measured with a specific surface area analyzer or the like by a constant-volume gas adsorption method, for example.

In the positive electrode active material 100 of one embodiment of the present invention, the ratio of the actual specific surface area $A_R$ to the ideal specific surface area $A_i$ obtained from the median diameter D50 ($A_R/A_i$) is preferably less than or equal to 2.

This embodiment can be implemented in combination with the other embodiments.

Embodiment 3

In this embodiment, a manufacturing apparatus of one embodiment of the present invention will be described with reference to FIG. 11 to FIG. 14. The manufacturing apparatus is suitable for forming the positive electrode active material described in the above embodiment.

<Batch-Type Rotary Kiln>

Figure 11A:
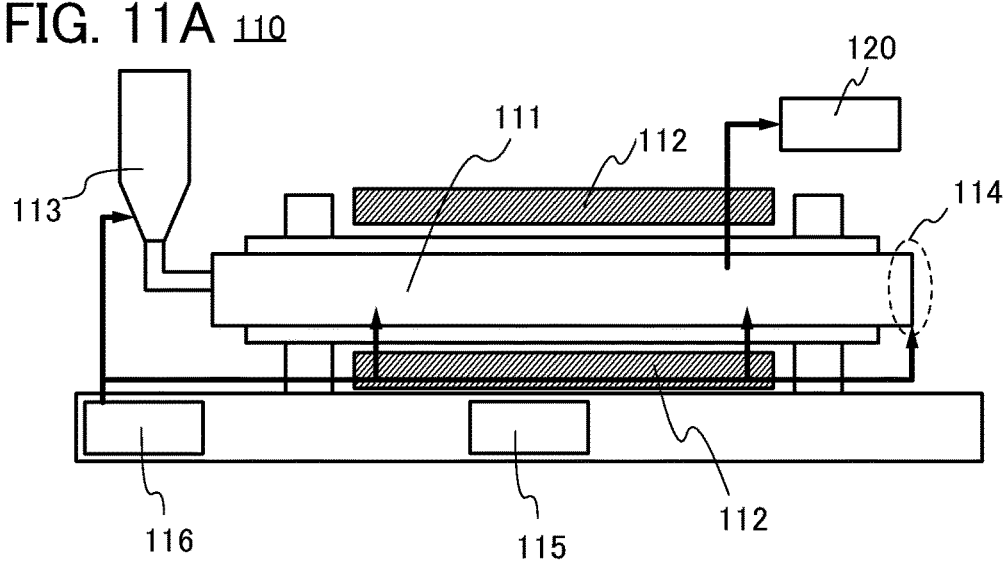
FIG. 11A and FIG. 11B are diagrams each illustrating an example of a manufacturing apparatus.

FIG. 11A is a schematic cross-sectional diagram of a batch-type rotary kiln 110. The rotary kiln 110 includes a kiln main body 111, a heating unit 112, a source material supply unit 113, and an atmosphere control unit 116. The rotary kiln 110 preferably includes a control board 115 and a measurement device 120.

The kiln main body 111 has a substantially cylindrical shape, one end of which is connected to the source material supply unit 113, and includes an exhaust port 114 at the other end. When the kiln main body rotates, an object put in the kiln is stirred.

The heating unit 112 has a function of heating the kiln main body 111 to a temperature higher than or equal to 700° C. and lower than or equal to 1200° C. As the heating unit, a silicon carbide heater, a carbon heater, a metal heater, a molybdenum disilicide heater, or the like can be used, for example.

The source material supply unit 113 has a function of putting an object into the kiln main body 111.

The atmosphere control unit 116 has a function of controlling an atmosphere inside the kiln main body 111. An example of the atmosphere control unit 116 is a gas introduction line. A gas to be introduced preferably contains oxygen.

The control board 115 can control the heating temperature, the atmosphere, and the like of the kiln main body 111.

The measurement device 120 can measure the atmosphere inside the kiln main body 111, for example. To the measurement device 120, GC (gas chromatography), MS (mass spectrometer), GC-MS, IR (infrared spectroscopy), FT-IR (Fourier transform infrared spectroscopy), or the like can be applied. By measuring the atmosphere in the kiln main body 111, more specifically, partial pressures of lithium fluoride, oxygen, and the like, whether the heating conditions are suitable can be ascertained. Note that the measurement device 120 may be a device measuring a factor other than an atmosphere as long as preferable heating conditions can be confirmed. For example, as the measurement device 120, a quartz crystal film thickness meter may be provided in the exhaust port or the vicinity thereof. Lithium fluoride exhausted to the exhaust port or the vicinity thereof is cooled down and deposited. Therefore, by measuring the thickness of the lithium fluoride with the quartz crystal film thickness meter, the lithium fluoride can be measured quantitatively.

Since the rotary kiln 110 can stir the object by rotating the kiln main body 111 during heating, particles of the object are less likely to adhere to one another. That is, a step of rotating the kiln main body 111 corresponds to the adhesion preventing step.

The batch-type rotary kiln as shown in FIG. 11A is preferable because atmosphere control is easy.

Figure 11B:
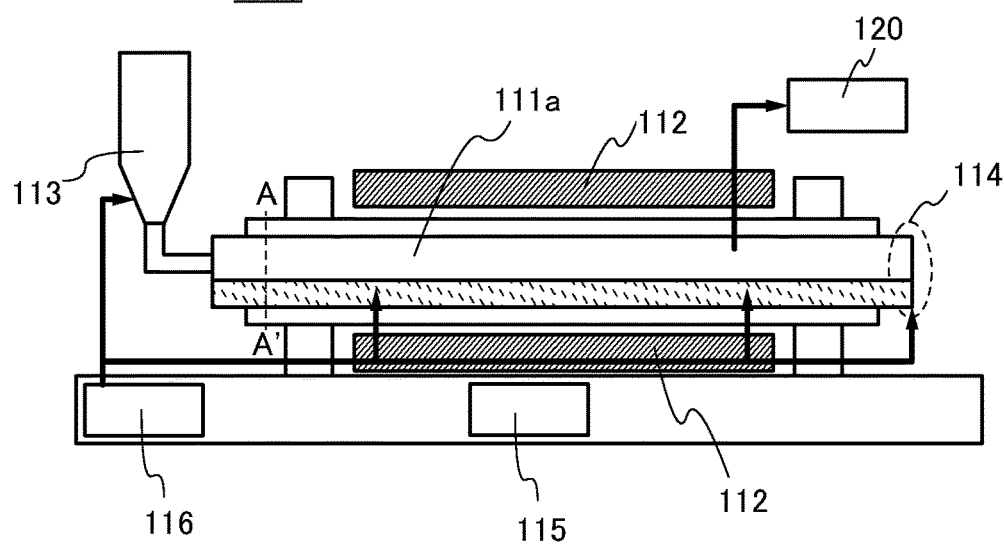
Figure 11C:
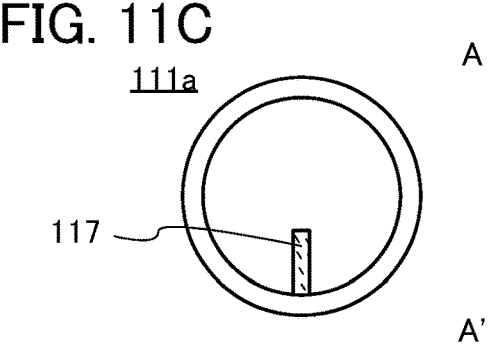
FIG. 11C is a cross-sectional diagram of the manufacturing apparatus.

As shown in FIG. 11B and FIG. 11C, a rotary kiln 110a including a kiln main body 111a in which a blade 117 for stirring is provided may be employed. FIG. 11B is a schematic cross-sectional diagram of the batch-type rotary kiln 110a, and FIG. 11C is a cross-sectional diagram of the kiln main body 111a taken along A-A' in FIG. 11B.

Although FIG. 11B and FIG. 11C show the kiln main body 111a provided with one linear blade 117 as an example, one embodiment of the present invention is not limited to this. A plurality of blades 117 may be provided. The blade 117 may have another shape, such as a helical shape.

<Sequential Rotary Kiln>

The rotary kiln is not limited to the batch-type rotary kiln, and a sequential rotary kiln may be employed. The rotary kiln may include a plurality of source material supply units and have a function of supplying a new source material during heating. A mill may be provided inside the kiln main body, and the mill may inhibit adhesion of the object.

Figure 12A:
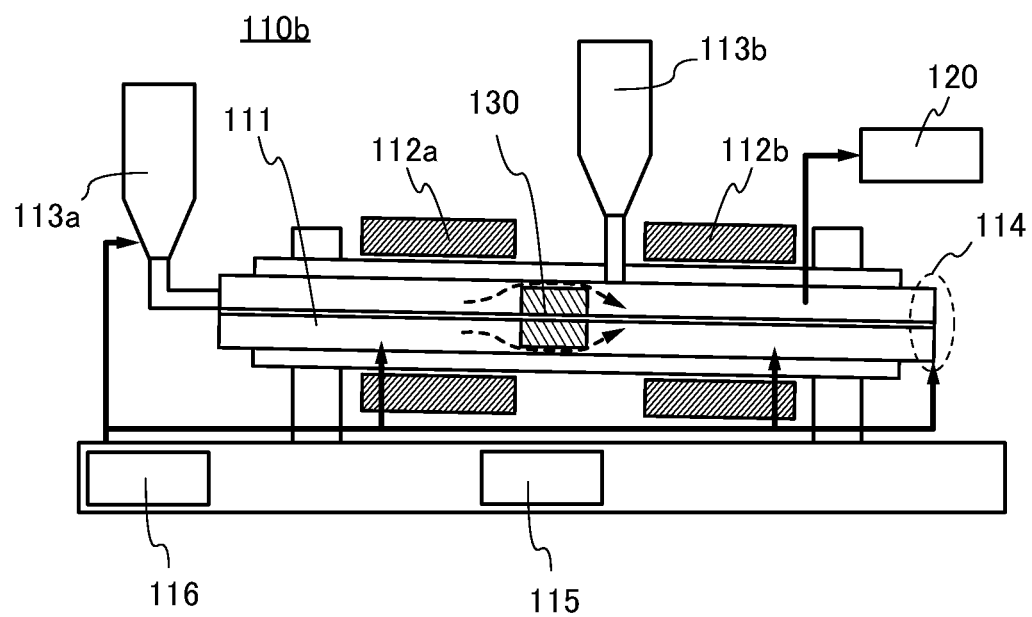
FIG. 12A and FIG. 12B are diagrams each illustrating an example of a manufacturing apparatus.

FIG. 12A is a schematic cross-sectional diagram of a rotary kiln 110b including a plurality of source material supply units and a mill. The rotary kiln 110b includes the kiln main body 111, a heating unit 112a, a heating unit 112b, a source material supply unit 113a, a source material supply unit 113b, and the atmosphere control unit 116. The rotary kiln 110b preferably includes the control board 115 and the measurement device 120.

The kiln main body 111 has a substantially cylindrical shape, one end of which is connected to the source material supply unit 113a, and includes the exhaust port 114 at the other end. Between the source material supply unit 113a and the exhaust port 114, the source material supply unit 113b is connected. A portion from the source material supply unit 113a to the source material supply unit 113b is called an upstream portion. A portion from the source material supply unit 113b to the exhaust port 114 is called a downstream portion. In addition, a mill 130 is preferably provided inside the kiln main body 111.

The kiln main body 11I preferably has a function of retaining an object in the upstream portion for an hour or longer and 100 hours or shorter. Furthermore, the kiln main body 111 preferably has a function of retaining the object in the downstream portion for an hour or longer and 100 hours or shorter.

The source material supply unit 113a has a function of supplying the object to the upstream portion of the kiln main body 111. The source material supply unit 113b has a function of supplying an additional source material to the downstream portion of the kiln main body 111.

The mill 130 has a function of inhibiting adhesion of the object. Specifically, the object passes through a space between the mill 130 and the inner wall of the kiln main body 111 as shown by the dotted arrow in the drawing, whereby adhesion is inhibited. Note that although one mill 130 is provided in the upstream portion in FIG. 12A, one embodiment of the present invention is not limited to this. A plurality of mills 130 may be provided. In addition, the mill 130 may be provided in the downstream portion, or in both the upstream portion and the downstream portion.

Different heating temperatures may be set for the heating unit 112a and the heating unit 112b. For example, the heating unit 112a which heats the upstream portion preferably has a function of heating the upstream portion to a temperature higher than or equal to 800° C. and lower than or equal to 1200° C. The heating unit 112b which heats the downstream portion preferably has a function of heating the downstream portion to a temperature higher than or equal to 700° C. and lower than or equal to 1000° C. Note that the temperature of a portion where the mill 130 is provided may be lower than the above temperature.

For the atmosphere control unit 116, the control board 115, the measurement device 120, and the like, the description of FIG. 11A can be referred to.

The sequential rotary kiln is preferable because the productivity is easily improved. With the rotary kiln 110b with the above structure, a positive electrode active material with higher productivity and performance can be formed. As described in the above embodiment, $LiMO_2$ with less impurities is synthesized, an additive is added, and heating is performed again, whereby the stability of the crystal structure after charging becomes preferable. For example, $LiMO_2$ is synthesized in the upstream portion at a relatively high temperature higher than or equal to 800° C. and lower than or equal to 1200° C., new materials, such as magnesium, fluorine, nickel, and aluminum, are added in the source material supply unit 113b, and then annealing is performed in the downstream portion at a relatively low temperature higher than or equal to 700° C. and lower than or equal to 1000° C., whereby a positive electrode active material with preferable performance can be formed.

<Vertical Kiln>

Figure 12B:
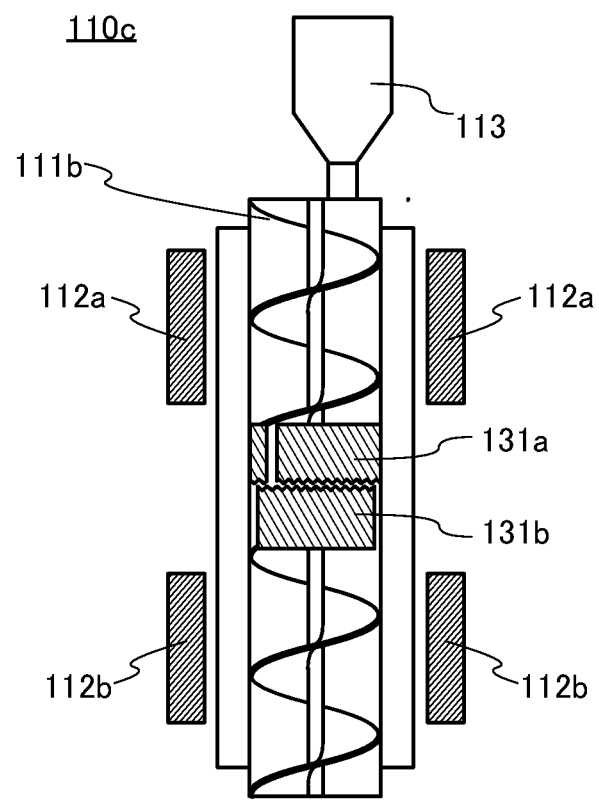

As shown in FIG. 12B, a vertical kiln 110c may be employed. FIG. 12B is a schematic cross-sectional diagram of the kiln 110c. The kiln 110c includes a kiln main body 111b, the heating unit 112a, the heating unit 112b, a first mill 131a, a second mill 131b, and the source material supply unit 113.

The kiln main body 111b has a substantially cylindrical shape, one end of which is connected to the source material supply unit 113. The kiln main body 111b includes a scraping blade inside. A first mill 131a and a second mill 131b are provided inside the kiln main body 111b. A portion from the source material supply unit 113 to the first mill 131a is called the upstream portion. A portion below the second mill 131b is called the downstream portion. That is, the first mill 131a and the second mill 131b are provided between the upstream portion and the downstream portion.

The scraping blade or the kiln main body 111b has a function of stirring the object by rotating. The scraping blade or the kiln main body 111b has a function of retaining the object in the upstream portion for an hour or longer and 100 hours or shorter. Furthermore, the scraping blade or the kiln main body 111b has a function of retaining the object in the downstream portion for an hour or longer and 100 hours or shorter.

The first mill 131a and the second mill 131b function as a pair of mills. The object is ground between the first mill 131a and the second mill 131b, which inhibits adhesion of the object. At least one of the first mill 131a and the second mill 131b preferably has a groove on the surface.

Different heating temperatures may be set for the heating unit 112a and the heating unit 112b. For example, the heating unit 112a which heats the upstream portion preferably has a function of heating the upstream portion to a temperature higher than or equal to 800° C. and lower than or equal to 1200° C. The heating unit 112b which heats the downstream portion preferably has a function of heating the downstream portion to a temperature higher than or equal to 700° C. and lower than or equal to 1000° C.

The source material supply unit 113 has a function of supplying the object to the upstream portion of the kiln main body 111b.

<Roller Hearth Kiln>

Figure 13A:
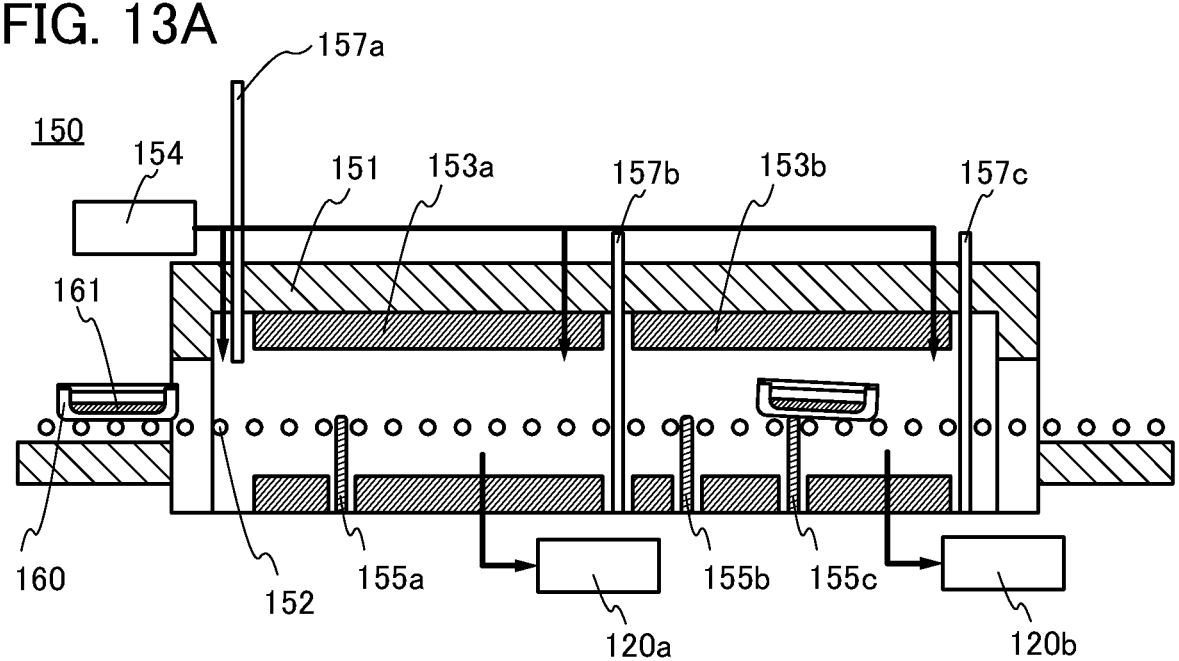
FIG. 13A is a diagram illustrating an example of a manufacturing apparatus.
Figure 13B:
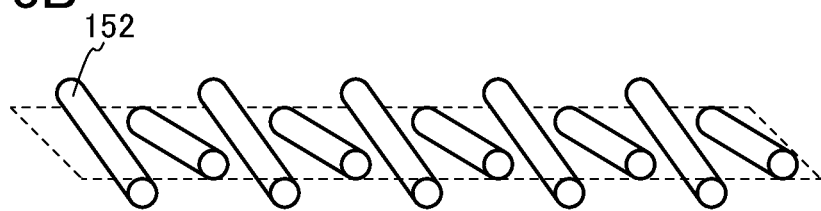
FIG. 13B illustrates the arrangement of rollers.

The manufacturing apparatus of one embodiment of the present invention may be a roller hearth kiln in which a container containing an object is successively processed. FIG. 13A is a schematic cross-sectional diagram of a roller hearth kiln 150. FIG. 13B illustrates a plurality of rollers 152 included in the roller hearth kiln.

The roller hearth kiln 150 includes a kiln main body 151, the plurality of rollers 152, a heating unit 153a, a heating unit 153b, an atmosphere control unit 154, an adhesion preventing unit 155a, an adhesion preventing unit 155b, and an adhesion preventing unit 155c. The roller hearth kiln 150 preferably includes a blocking board 157a, a blocking board 157b, a blocking board 157c, a measurement device 120a, and a measurement device 120b.

The kiln main body 151 has a tunnel-like shape. The plurality of rollers 152 have a function of transferring a container 160 containing an object 161. The plurality of rollers 152 make the container 160 pass through the tunnel-like kiln main body 151 to transfer it to the outside.

The kiln main body 151 includes the upstream portion and the downstream portion along the transfer direction of the plurality of rollers 152. The kiln main body 151 includes the heating unit 153a in the upstream portion, and the heating unit 153b in the downstream portion. The blocking board 157*b* may be provided between the upstream portion and the downstream portion. By providing the blocking board 157*b*, the atmospheres in the upstream portion and the atmosphere in the downstream portion can be independently controlled. The blocking board 157*b* may be provided near the inlet of the kiln main body 151, and the blocking board 157*c* may be provided near the outlet. The provision of these facilitates control of the atmosphere inside the kiln main body 151.

The adhesion preventing unit included in the roller hearth kiln 150 is, for example, a unit which vibrates the container 160. For example, the adhesion preventing unit may be a rod-like or a plate-like device provided between the plurality of rollers 152, like the adhesion preventing unit 155*a*, the adhesion preventing unit 155*b*, and the adhesion preventing unit 155*c* shown in FIG. 13A. The adhesion preventing unit 155*a*, the adhesion preventing unit 155*b*, and the adhesion preventing unit 155*c* may be fixed, or may be unfixed so as to vibrate the container 160. Although FIG. 13A shows the structure in which three adhesion preventing units 155 are provided, one embodiment of the present invention is not limited to this. The number of provided adhesion preventing units 155 may be one or two, or four or more.

The adhesion preventing unit included in the roller hearth kiln 150 may be the plurality of rollers 152 having different inclinations as shown in FIG. 13B.

For the heating unit 153*a*, the heating unit 153*b*, the atmosphere control unit 154, the measurement device 120*a*, the measurement device 120*b*, and the like, the description of FIG. 11A can be referred to.

The roller hearth kiln 150 is preferable because the object is successively processed and thus the productivity is increased.

Figure 13C:
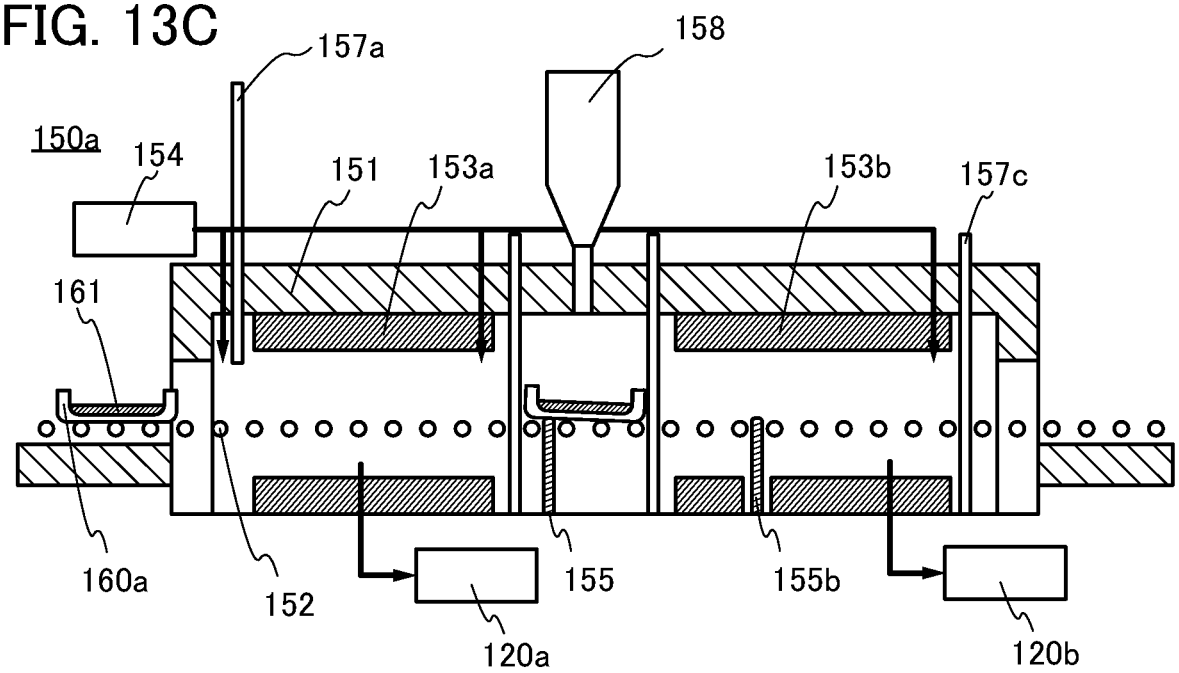
FIG. 13C is a diagram illustrating an example of a manufacturing apparatus.

The manufacturing apparatus of one embodiment of the present invention may be a roller hearth kiln having a function of supplying a new source material during heating. FIG. 13C is a schematic cross-sectional diagram of a roller hearth kiln 150*a* including a source material supply unit 158.

The roller hearth kiln 150*a* includes the source material supply unit 158 between the upstream portion and the downstream portion of the kiln main body 151. Since the roller hearth kiln 150*a* includes the source material supply unit 158, after synthesis of LiMO$_2$ with less impurities, an additive can be added by the source material supply unit 158 and heating can be performed again as in the rotary kiln 110*b* shown in FIG. 12A. In that case, a container containing the object 161 is preferably a container 160*a* without a lid.

For the other components, the description of FIG. 13A can be referred to.

<Mesh Belt Kiln>

Figure 14A:
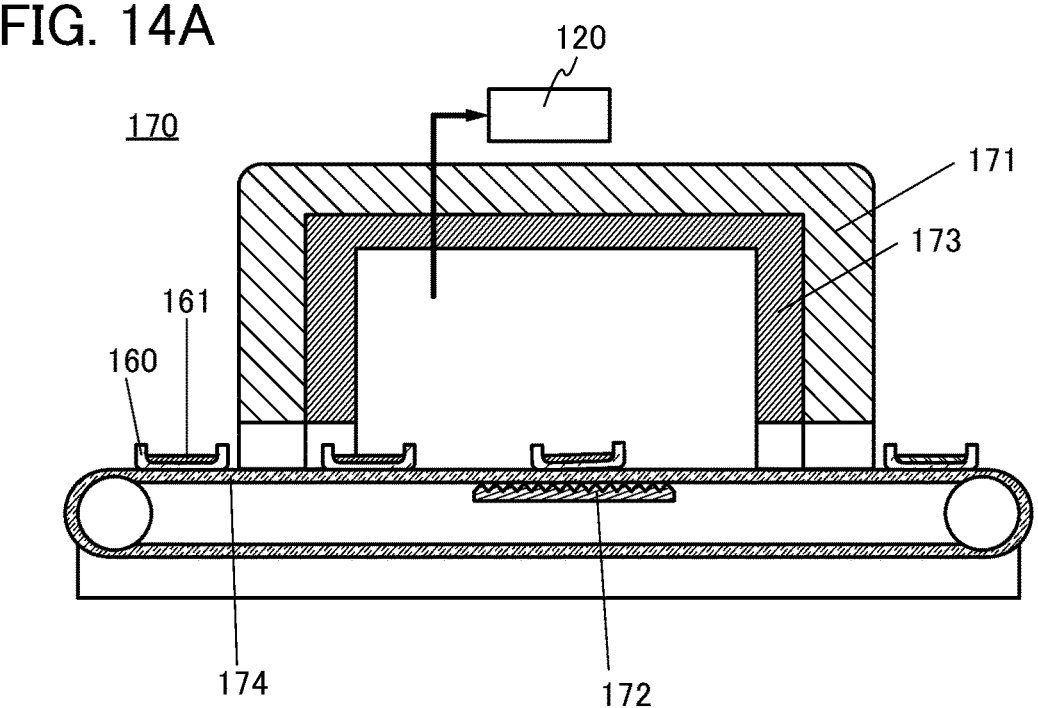
FIG. 14A and FIG. 14B are diagrams each illustrating an example of a manufacturing apparatus.

The manufacturing apparatus of one embodiment of the present invention may be a mesh belt kiln in which a mesh belt is used as a transfer unit and an object contained in the container is successively processed. FIG. 14A is a schematic cross-sectional diagram of the mesh belt kiln 170.

The mesh belt kiln 170 includes a kiln main body 171, a mesh belt 174, a heating unit 173, and an adhesion preventing unit 172. The mesh belt kiln 170 preferably includes the measurement device 120.

The kiln main body 171 has a tunnel-like shape. The mesh belt 174 has a function of transferring the container 160 containing the object 161. The mesh belt 174 makes the container 160 pass through the tunnel-like kiln main body 171 to transfer it to the outside.

The adhesion preventing unit included in the mesh belt kiln 170 is, for example, a unit which vibrates the container 160. For example, the adhesion preventing unit may be a device which is provided under the mesh belt 174 and has unevenness for vibrating the container 160, like the adhesion preventing unit 172 shown in FIG. 14A. The adhesion preventing unit 172 may be fixed, or may move so as to vibrate the container 160. Although FIG. 14A shows the structure in which one adhesion preventing unit 172 is provided, one embodiment of the present invention is not limited to this. A plurality of adhesion preventing units 172 may be provided. The length of the adhesion preventing unit 172 may be substantially the same as that of the kiln main body 171.

The mesh belt kiln 170 is preferable because the object is successively processed and thus the productivity is increased. For the other components, the description of FIG. 13A can be referred to.

<Muffle Furnace>

Figure 14B:
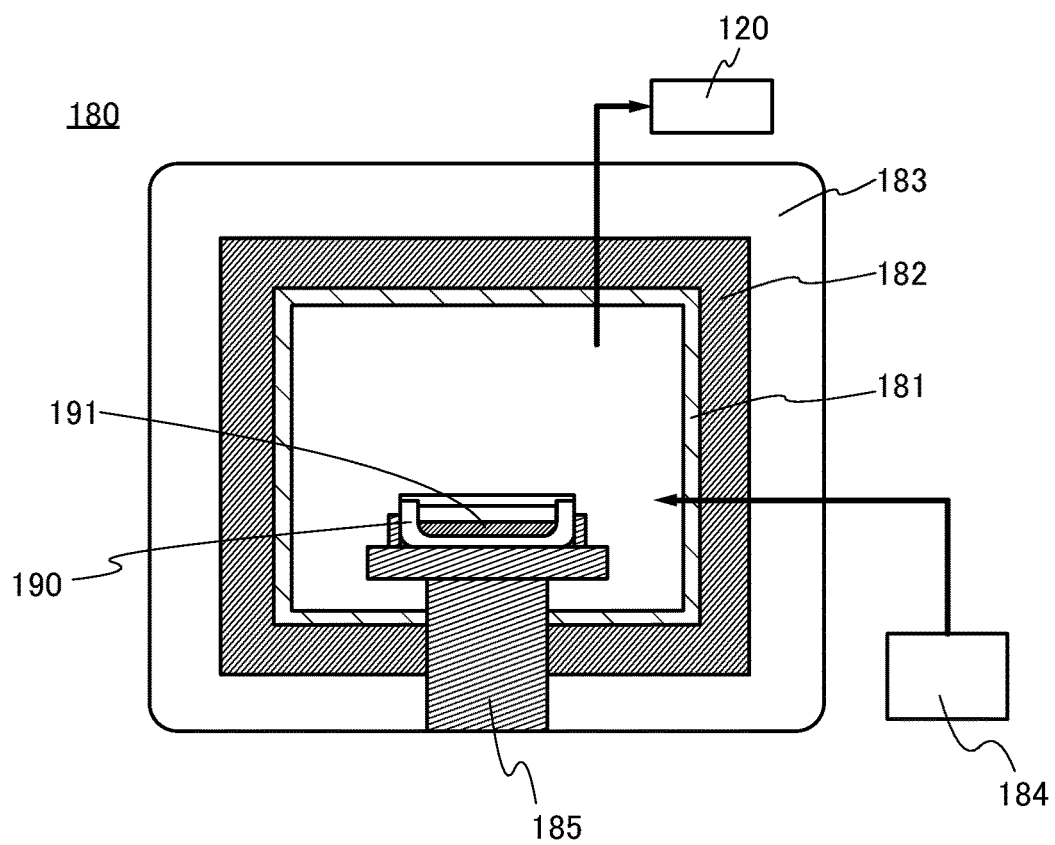

The manufacturing apparatus of one embodiment of the present invention may be a batch-type muffle furnace. FIG. 14B is a cross-sectional diagram of a muffle furnace 180.

The muffle furnace 180 includes a hot plate 181, a heating unit 182, a heat insulator 183, an atmosphere control unit 184, and an adhesion preventing unit 185. The muffle furnace 180 preferably includes the measurement device 120.

The adhesion preventing unit 185 included in the muffle furnace 180 is a unit which vibrates a container 190 containing an object 191. The adhesion preventing unit 185 shown in FIG. 14B is a stand on which the container 190 is put and has a function of vibrating the container 190.

The muffle furnace 180 is preferable because the atmosphere and temperature are easy to control. For the other components, the description of FIG. 13A can be referred to.

This embodiment can be implemented in appropriate combination with the other embodiments.

Embodiment 4

In this embodiment, an example of a secondary battery of one embodiment of the present invention is described with reference to FIG. 15 to FIG. 18.

Structure Example 1 of Secondary Battery

Hereinafter, a secondary battery in which a positive electrode, a negative electrode, and an electrolyte solution are wrapped in an exterior body is described as an example.

[Positive Electrode]

The positive electrode includes a positive electrode active material layer and a positive electrode current collector. The positive electrode active material layer includes a positive electrode active material, and may include a conductive additive and a binder. As the positive electrode active material, the positive electrode active material formed by the manufacturing method described in the foregoing embodiment is used.

The positive electrode active material described in the foregoing embodiment and another positive electrode active material may be mixed to be used.

Examples of the another positive electrode active material include a composite oxide with an olivine crystal structure, a composite oxide with a layered rock-salt crystal structure, and a composite oxide with a spinel crystal structure. For example, a compound such as LiFePO$_4$, LiFeO$_2$, LiNiO$_2$, LiMn$_2$O$_4$, V$_2$O$_5$, Cr$_2$O$_5$, or MnO$_2$ can be given.

It is preferable to mix lithium nickel oxide (LiNiO$_2$ or LiNi$_{1-x}$M$_x$O$_2$ (0<x<1) (M=Co, Al, or the like)) to a lithium-containing material with a spinel crystal structure which contains manganese such as LiMn$_2$O$_4$ to form the another positive electrode active material. This composition can improve the performance of the secondary battery.

Another example of the positive electrode active material is a lithium-manganese composite oxide represented by a composition formula $Li_aMn_bM_cO_d$. Here, the element M is preferably a metal element other than lithium and manganese, or silicon or phosphorus, further preferably nickel. Furthermore, in the case where the whole particle of a lithium-manganese composite oxide is measured, it is preferable to satisfy the following at the time of discharging: $0<a/(b+c)<2$; $c>0$; and $0.26 \leq (b+c)/d<0.5$. Note that the composition of metal, silicon, phosphorus, and other elements in the whole particle of a lithium-manganese composite oxide can be measured with, for example, ICP-MS (inductively coupled plasma mass spectrometer). The composition of oxygen in the particle of a lithium-manganese composite oxide can be measured by, for example, EDX (energy dispersive X-ray spectroscopy). Alternatively, the composition can be measured by ICP-MS combined with fusion gas analysis and valence evaluation of XAFS (X-ray absorption fine structure) analysis. Note that the lithium-manganese composite oxide is an oxide containing at least lithium and manganese, and may contain at least one element selected from chromium, cobalt, aluminum, nickel, iron, magnesium, molybdenum, zinc, indium, gallium, copper, titanium, niobium, silicon, phosphorus, and the like.

A cross-sectional structure example of the active material layer 200 containing a graphene compound as a conductive material is described below.

Figure 15A:
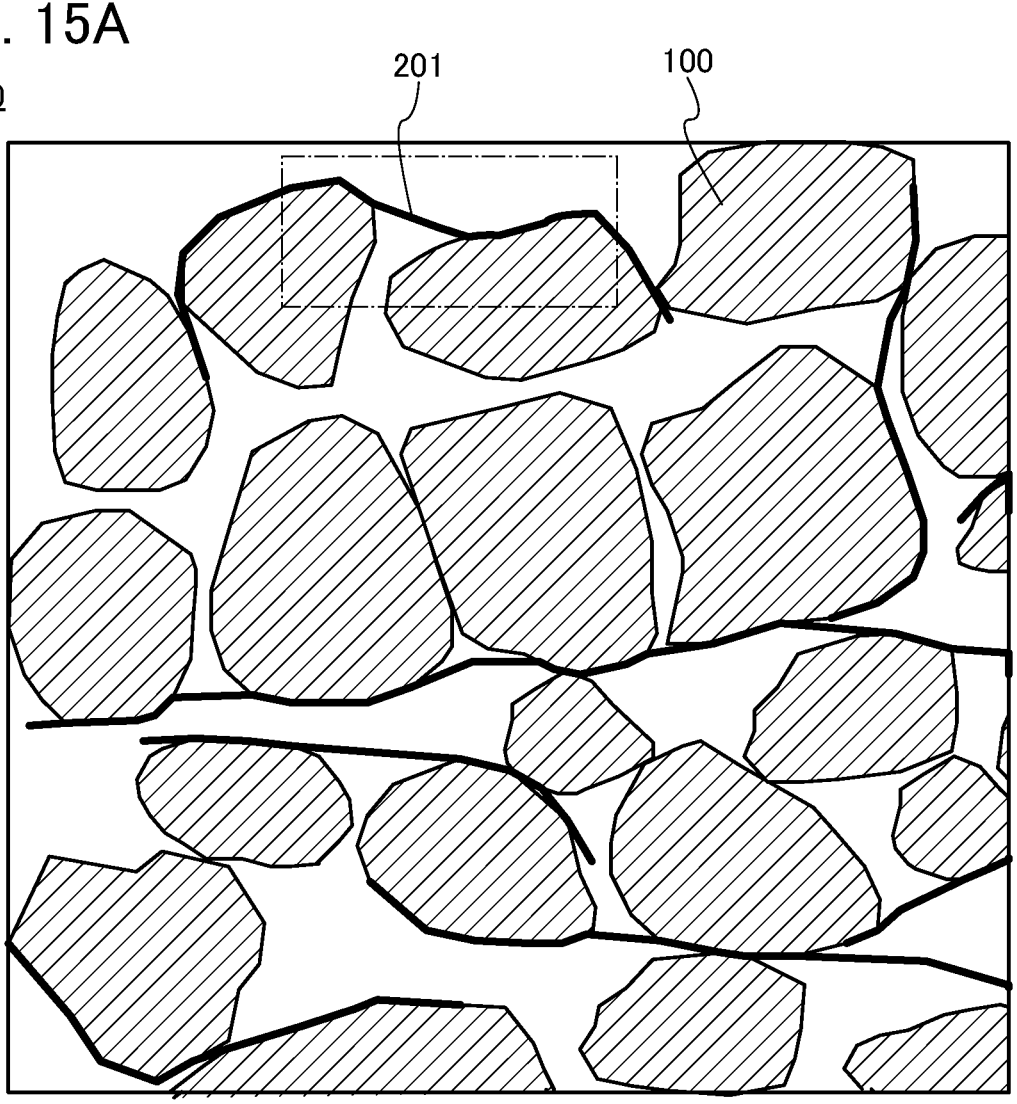
FIG. 15A and FIG. 15B are cross-sectional diagrams of an active material layer containing a graphene compound as a conductive material.

FIG. 15A is a longitudinal cross-sectional view of the active material layer 200. The active material layer 200 includes a particulate positive electrode active material 100, graphene or a graphene compound 201 serving as a conductive additive, and a binder (not illustrated).

The graphene compound 201 in this specification and the like refers to multilayer graphene, multi graphene, graphene oxide, multilayer graphene oxide, multi graphene oxide, reduced graphene oxide, reduced multilayer graphene oxide, reduced multi graphene oxide, graphene quantum dots, and the like. A graphene compound contains carbon, has a plate-like shape, a sheet-like shape, or the like, and has a two-dimensional structure formed of carbon six-membered rings. The two-dimensional structure formed of the carbon six-membered ring may be referred to as a carbon sheet. A graphene compound may include a functional group. The graphene compound preferably has a bent shape. The graphene compound may be rounded like a carbon nanofiber.

In this specification and the like, graphene oxide contains carbon and oxygen, has a sheet-like shape, and includes a functional group, in particular, an epoxy group, a carboxy group, or a hydroxy group.

In this specification and the like, reduced graphene oxide contains carbon and oxygen, has a sheet-like shape, and has a two-dimensional structure formed of a carbon six-membered ring. A graphene compound may also be referred to as a carbon sheet. The reduced graphene oxide can function as one sheet and may have a stacked-layer structure. The reduced graphene oxide preferably includes a portion where the carbon concentration is higher than 80 at % and the oxygen concentration is higher than or equal to 2 at % and lower than or equal to 15 at %. With such a carbon concentration and such an oxygen concentration, the reduced graphene oxide can function as a conductive additive with high conductivity even with a small amount. In addition, the intensity ratio G/D of a G band to a D band of the Raman spectrum of the reduced graphene oxide is preferably 1 or more. The reduced graphene oxide with such an intensity ratio can function as a conductive additive with high conductivity even with a small amount.

Figure 15B:
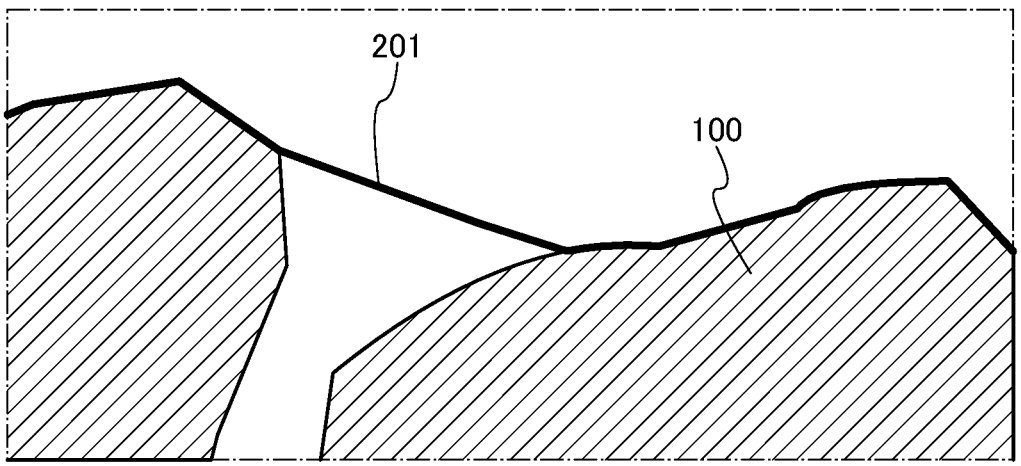

As illustrated in FIG. 15B, in the longitudinal cross section of the active material layer 200, sheet-like graphene or the graphene compound 201 is substantially uniformly dispersed in the active material layer 200. The graphene or the graphene compound 201 is schematically shown by a thick line in FIG. 15B but is actually a thin film having a thickness corresponding to the thickness of a single layer or a multi-layer of carbon molecules. The plurality of graphene or graphene compounds 201 are formed to partly coat or adhere to the surfaces of the plurality of particles of the positive electrode active material 100, so that the graphene or graphene compounds 201 make surface contact with the particles of the positive electrode active material 100.

Here, the plurality of graphene or graphene compounds are bonded to each other, thereby forming a net-like graphene compound sheet (hereinafter referred to as a graphene compound net or a graphene net). The graphene net covering the active material can function as a binder for bonding active materials. The amount of binder can thus be reduced, or the binder does not have to be used. This can increase the proportion of the active material in the electrode volume or the electrode weight. That is, the capacity of the secondary battery can be increased.

Here, it is preferable that graphene oxide be used as the graphene or the graphene compound 201 and mixed with an active material to form a layer to be the active material layer 200, and then reduction be performed. That is, the formed active material layer preferably contains reduced graphene oxide. When graphene oxide with extremely high dispersibility in a polar solvent is used for the formation of the graphene or the graphene compound 201, the graphene or the graphene compounds 201 can be substantially uniformly dispersed in the active material layer 200. The solvent is removed by volatilization from a dispersion medium in which graphene oxide is uniformly dispersed, and the graphene oxide is reduced; hence, the graphene or the graphene compounds 201 remaining in the active material layer 200 partly overlap with each other and are dispersed such that surface contact is made, thereby forming a three-dimensional conductive path. Note that graphene oxide can be reduced by heat treatment or with the use of a reducing agent, for example.

Unlike a conductive additive in the form of particles, such as acetylene black, which makes point contact with an active material, the graphene or the graphene compound 201 is capable of making low-resistance surface contact; accordingly, the electrical conduction between the particulate positive electrode active materials 100 and the graphene or the graphene compound 201 can be improved with a smaller amount of the graphene or the graphene compound 201 than that of a normal conductive additive. This can increase the proportion of the positive electrode active material 100 in the active material layer 200. Thus, the discharge capacity of the secondary battery can be increased.

With a spray dry apparatus, a graphene compound serving as a conductive additive can be formed in advance as a coating film to cover the entire surface of the active material, and a conductive path can be formed between the active materials using the graphene compound.

[Negative Electrode]

The negative electrode includes a negative electrode active material layer and a negative electrode current collector. The negative electrode active material layer may contain a conductive material and a binder.

[Negative Electrode Active Material]

As the negative electrode active material, for example, an alloy-based material or a carbon-based material can be used.

For the negative electrode active material, an element that enables charge-discharge reactions by an alloying and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon and especially, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying and a dealloying reaction with lithium and a compound containing the element, for example, may be referred to as an alloy-based material.

In this specification and the like, SiO refers, for example, to silicon monoxide. Note that SiO can alternatively be expressed as SiOx. Here, x preferably has an approximate value of 1. For example, x is preferably more than or equal to 0.2 and less than or equal to 1.5, and further preferably more than or equal to 0.3 and less than or equal to 1.2.

As the carbon-based material, graphite, graphitizing carbon (soft carbon), non-graphitizing carbon (hard carbon), carbon nanotube, graphene, carbon black, and the like may be used.

Examples of graphite include artificial graphite and natural graphite. Examples of artificial graphite include meso-carbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it is relatively easy to have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are intercalated into graphite (when a lithium-graphite intercalation compound is formed). For this reason, a lithium-ion secondary battery can have a high operating voltage. In addition, graphite is preferable because of its advantages such as a relatively high capacity per unit volume, relatively small volume expansion, low cost, and higher level of safety than that of a lithium metal.

Alternatively, for the negative electrode active material, oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a composite nitride of lithium and a transition metal, can be used. For example, $Li_{2.6}Co_{0.4}N_3$ is preferable because of high charging and discharging capacity (900 mAh/g and 1890 $mAh/cm^3$).

A composite nitride of lithium and a transition metal is preferably used, in which case the negative electrode active material contains lithium ions and thus can be used in combination with a positive electrode active material that does not contain lithium ions, such as $V_2O_5$ or $Cr_3O_8$. Note that in the case of using a material containing lithium ions as a positive electrode active material, the composite nitride of lithium and a transition metal can be used for the negative electrode active material by extracting the lithium ions contained in the positive electrode active material in advance.

Alternatively, a material that causes a conversion reaction can be used for the negative electrode active material. For example, a transition metal oxide that does not form an alloy with lithium, such as cobalt oxide (CoO), nickel oxide (NiO), or iron oxide (FeO), may be used for the negative electrode active material. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

[Negative Electrode Current Collector]

For the negative electrode current collector, a material similar to that of the positive electrode current collector can be used. Note that a material that is not alloyed with carrier ions such as lithium is preferably used for the negative electrode current collector.

[Electrolyte Solution]

The electrolyte solution contains a solvent and an electrolyte. As the solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more ionic liquids (room temperature molten salts) that are less likely to burn and volatize as the solvent of the electrolyte solution can prevent a secondary battery from exploding or catching fire even when the secondary battery internally shorts out or the internal temperature increases owing to overcharge or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and LiN($C_2F_5SO_2$)$_2$ can be used, or two or more of these lithium salts can be used in an appropriate combination in an appropriate ratio.

The electrolyte solution used for a secondary battery is preferably highly purified and contains small contents of dust particles or elements other than the constituent elements of the electrolyte solution (hereinafter, also simply referred to as "impurities"). Specifically, the weight ratio of impurities to the electrolyte solution is preferably less than or equal to 1%, further preferably less than or equal to 0.1%, still further preferably less than or equal to 0.01%.

An additive such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of a material to be added in the whole solvent is, for example, higher than or equal to 0.1 wt % and lower than or equal to 5 wt %.

Alternatively, a polymer gelled electrolyte obtained in such a manner that a polymer is swelled with an electrolyte solution may be used.

When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP), can be used. The formed polymer may be porous.

Instead of the electrolyte solution, a solid electrolyte including an inorganic material such as a sulfide-based inorganic material or an oxide-based inorganic material, or a solid electrolyte including a high-molecular material such as a PEO (polyethylene oxide)-based high-molecular material may be used. When the solid electrolyte is used, a separator and a spacer are not necessary. Furthermore, the battery can be entirely solidified; therefore, there is no possibility of liquid leakage and thus the safety is dramatically increased.

[Separator]

The secondary battery preferably includes a separator. As the separator, for example, paper; nonwoven fabric; glass fiber; ceramics; or synthetic fiber containing nylon (polyamide), vinylon (polyvinyl alcohol-based fiber), polyester, acrylic, polyolefin, or polyurethane can be used. The separator is preferably formed to have an envelope-like shape to wrap one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

Deterioration of the separator in charging and discharging at high voltage can be inhibited and thus the reliability of the secondary battery can be improved because oxidation resistance is improved when the separator is coated with the ceramic-based material. In addition, when the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of the polypropylene film that is in contact with the positive electrode may be coated with the mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Exterior Body]

For an exterior body included in the secondary battery, a metal material such as aluminum or a resin material can be used, for example. An exterior body in the form of a film can also be used. As the film, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Structure Example 2 of Secondary Battery

A structure of a secondary battery using a solid electrolyte layer is described below as a structure example of a secondary battery.

Figure 16A:
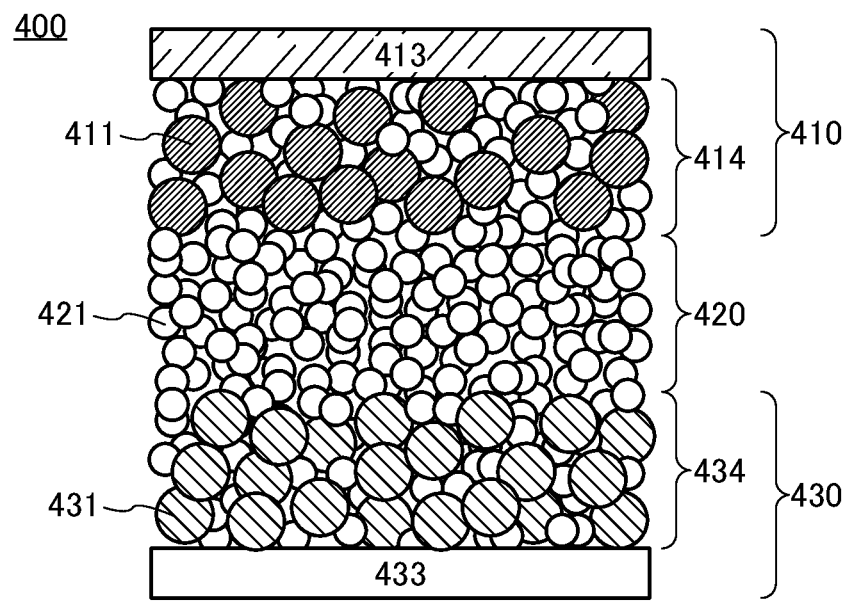
FIG. 16A and FIG. 16B are diagrams each illustrating an example of a secondary battery.

As illustrated in FIG. 16A, a secondary battery 400 of one embodiment of the present invention includes a positive electrode 410, a solid electrolyte layer 420, and a negative electrode 430.

The positive electrode 410 includes a positive electrode current collector 413 and a positive electrode active material layer 414. The positive electrode active material layer 414 includes a positive electrode active material 411 and a solid electrolyte 421. As the positive electrode active material 411, the positive electrode active material formed by the manufacturing method described in the above embodiments is used. The positive electrode active material layer 414 may also include a conductive additive and a binder.

The solid electrolyte layer 420 includes the solid electrolyte 421. The solid electrolyte layer 420 is positioned between the positive electrode 410 and the negative electrode 430, and is a region that includes neither the positive electrode active material 411 nor a negative electrode active material 431.

Figure 16B:
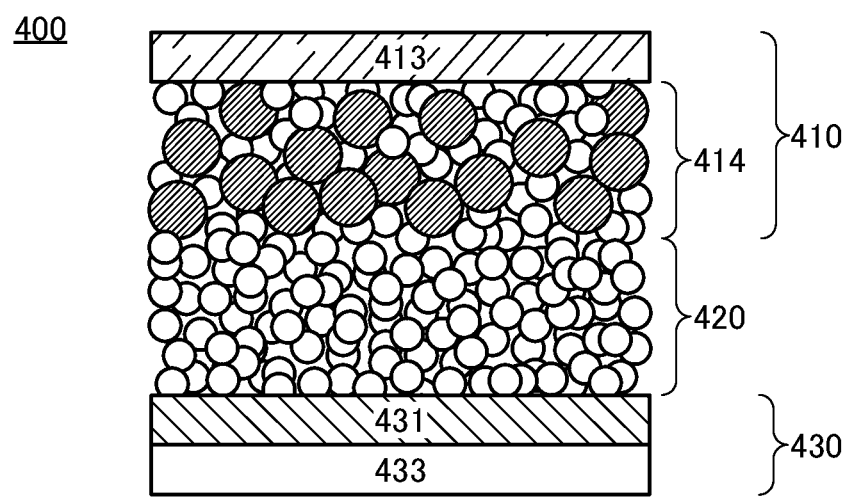

The negative electrode 430 includes a negative electrode current collector 433 and a negative electrode active material layer 434. The negative electrode active material layer 434 includes the negative electrode active material 431 and the solid electrolyte 421. The negative electrode active material layer 434 may also include a conductive additive and a binder. Note that when metal lithium is used for the negative electrode 430, it is possible that the negative electrode 430 does not include the solid electrolyte 421 as illustrated in FIG. 16B. The use of metal lithium for the negative electrode 430 is preferable because the energy density of the secondary battery 400 can be increased.

As the solid electrolyte 421 included in the solid electrolyte layer 420, a sulfide-based solid electrolyte, an oxide-based solid electrolyte, or a halide-based solid electrolyte can be used, for example.

Examples of the sulfide-based solid electrolyte include a thio-silicon-based material (e.g., $Li_{10}GeP_2S_{12}$ and $Li_{3.25}Ge_{0.25}P_{0.75}S_4$), sulfide glass (e.g., $70Li_2S·30P_2S_5$, $30Li_2S·26B_2S_3·44LiI$, $63Li_2S·38SiS_2·1Li_3PO_4$, $57Li_2S·38SiS_2·5Li_4SiO_4$, and $50Li_2S·50GeS_2$), and sulfide-based crystallized glass (e.g., $Li_7P_3S_{11}$ and $Li_{3.25}P_{0.95}S_4$). The sulfide-based solid electrolytes have advantages such as high conductivity in some of the materials, low-temperature synthesis, and ease of maintaining a conduction path after charging and discharging because of its relative softness.

Examples of the oxide-based solid electrolyte include a material with a perovskite crystal structure (e.g., $La_{2/3-x}Li_{3x}TiO_3$), a material with a NASICON crystal structure (e.g., $Li_{1-x}Al_xTi_{2-x}(PO_4)_3$), a material with a garnet crystal structure (e.g., $Li_7La_3Zr_2O_{12}$), a material with a LISICON crystal structure (e.g., $Li_{14}ZnGe_4O_{16}$), LLZO ($Li_7La_3Zr_2O_{12}$), oxide glass (e.g., $Li_3PO_4$—$Li_4SiO_4$ and $50Li_4SiO_4·50Li_3BO_3$), oxide-based crystallized glass (e.g., $Li_{1.07}Al_{0.69}Ti_{1.46}(PO_4)_3$, and $Li_{1.5}Al_{0.5}Ge_{1.5}(PO_4)_3$). The oxide-based solid electrolyte has an advantage of stability in the air.

Examples of the halide-based solid electrolyte include $LiAlCl_4$, $Li_3InBr_6$, LiF, LiCl, LiBr, and LiI. Moreover, a composite material in which pores of porous aluminum oxide or porous silica are filled with such a halide-based solid electrolyte can be used as the solid electrolyte.

Alternatively, different solid electrolytes may be mixed and used.

In particular, $Li_{1+x}Al_xTi_{2-x}(PO_4)_3$ ($0 \leq x \leq 1$) with a NASICON crystal structure (hereinafter LATP) is preferable because LATP contains aluminum and titanium, each of which is an element that can be contained in the positive electrode active material used for the secondary battery 400 of one embodiment of the present invention, and thus a synergistic effect of improving the cycle performance is expected. Moreover, higher productivity due to the reduction in the number of steps is expected. Note that in this specification and the like, a material with a NASICON crystal structure refers to a compound that is represented by $M_2(XO_4)_3$ (M: transition metal; X: S, P, As, Mo, W, or the like) and has a structure in which $MO_6$ octahedra and $XO_4$ tetrahedra that share common corners are arranged three-dimensionally.

[Exterior Body and Shape of Secondary Battery]

An exterior body of the secondary battery 400 of one embodiment of the present invention can be formed using a variety of materials and have a variety of shapes, and preferably has a function of applying pressure to the positive electrode, the solid electrolyte layer, and the negative electrode.

FIG. 17 shows an example of a cell for evaluating materials of an all-solid-state battery, for example.

Figure 17A:
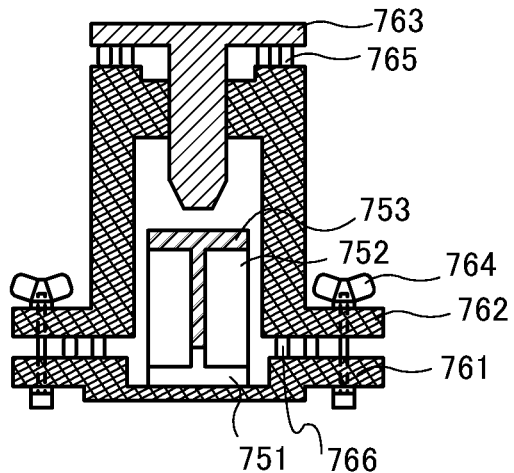
FIG. 17A to FIG. 17C are diagrams illustrating an example of a secondary battery.

FIG. 17A is a schematic cross-sectional view of an evaluation cell, the evaluation cell includes a lower component 761, an upper component 762, and a fixation screw and a butterfly nut 764 for fixing them, and by rotating a pressure screw 763, an electrode plate 753 is pressed to fix an evaluation material. The insulator 766 is provided between the lower component 761 and the upper component 762 that are made of a stainless steel material. An O ring 765 for hermetic sealing is provided between the upper component 762 and the pressure screw 763.

Figure 17B:
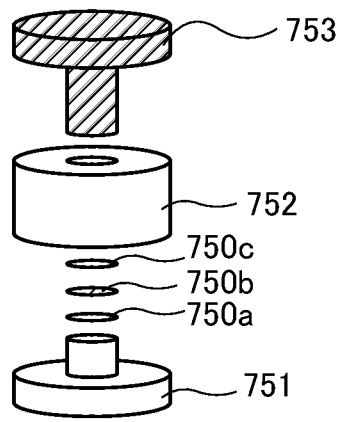

The evaluation material is placed on an electrode plate 751, surrounded by an insulating tube 752, and pressed from above by the electrode plate 753. FIG. 17B is an enlarged perspective view of the evaluation material and its vicinity.

Figure 17C:
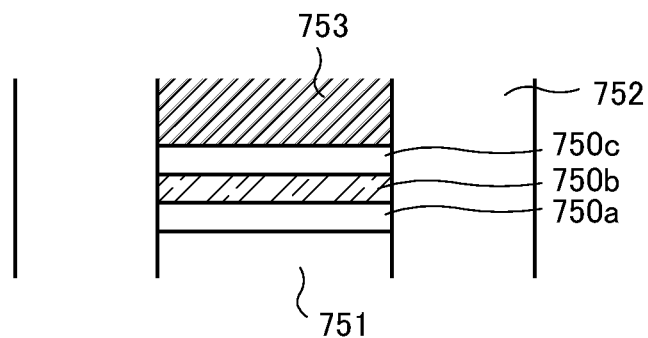

A stack of a positive electrode 750a, a solid electrolyte layer 750b, and a negative electrode 750c is exemplified as the evaluation material, and its cross section is shown in FIG. 17C. Note that the same portions in FIG. 17A, FIG. 17B, and FIG. 17C are denoted by the same reference numerals.

The electrode plate 751 and the lower component 761 that are electrically connected to the positive electrode 750a can be said to correspond to a positive electrode terminal. The electrode plate 753 and the upper component 762 that are electrically connected to the negative electrode 750c can be said to correspond to a negative electrode terminal. The electric resistance or the like can be measured while pressure is applied to the evaluation material through the electrode plate 751 and the electrode plate 753.

The exterior body of the secondary battery of one embodiment of the present invention is preferably a package having excellent airtightness. For example, a ceramic package or a resin package can be used. Sealing of the exterior body is preferably performed in a closed atmosphere, for example, in a glove box, in which outside air is blocked.

Figure 18A:
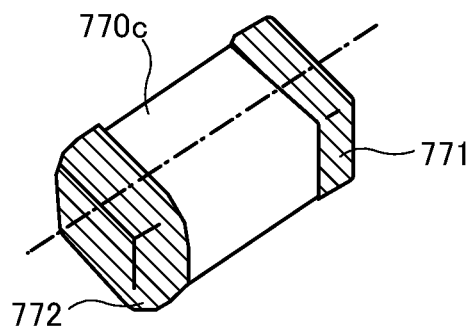
FIG. 18A and FIG. 18B are diagrams illustrating an example of a secondary battery.

FIG. 18A is a perspective view of a secondary battery of one embodiment of the present invention that has an exterior body and a shape different from those in FIG. 17. The secondary battery in FIG. 18A includes external electrodes 771 and 772 and is sealed with an exterior body including a plurality of package components.

Figure 18B:
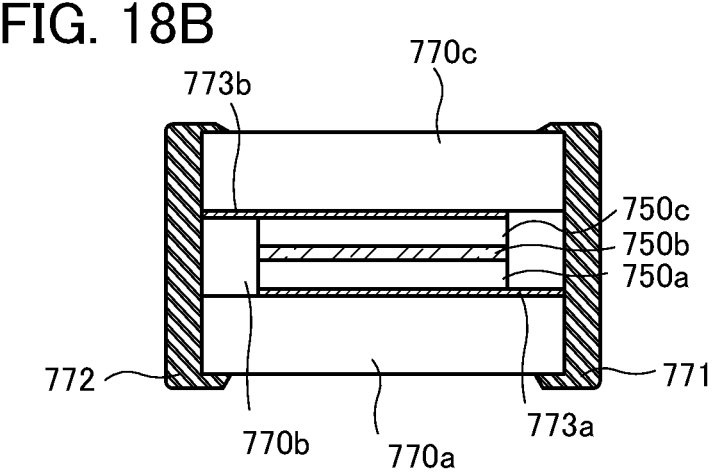

FIG. 18B shows an example of a cross section along the dashed-dotted line in FIG. 18A. A stacked body including the positive electrode 750a, the solid electrolyte layer 750b, and the negative electrode 750c is surrounded and sealed by a package component 770a in which an electrode layer 773a is provided on a flat plate, a frame-like package component 770b, and a package component 770c in which an electrode layer 773b is provided on a flat plate. For the package components 770a, 770b, and 770c, an insulating material such as a resin material or ceramic can be used.

The external electrode 771 is electrically connected to the positive electrode 750a through the electrode layer 773a and functions as a positive electrode terminal. The external electrode 772 is electrically connected to the negative electrode 750c through the electrode layer 773b and functions as a negative electrode terminal.

This embodiment can be implemented in appropriate combination with the other embodiments.

Embodiment 5

In this embodiment, examples of the shape of a secondary battery including the positive electrode described in the above embodiment are described. For the materials used for the secondary battery described in this embodiment, it is possible to refer to the description of the above embodiment.

<Coin-Type Secondary Battery>

Figure 19A:
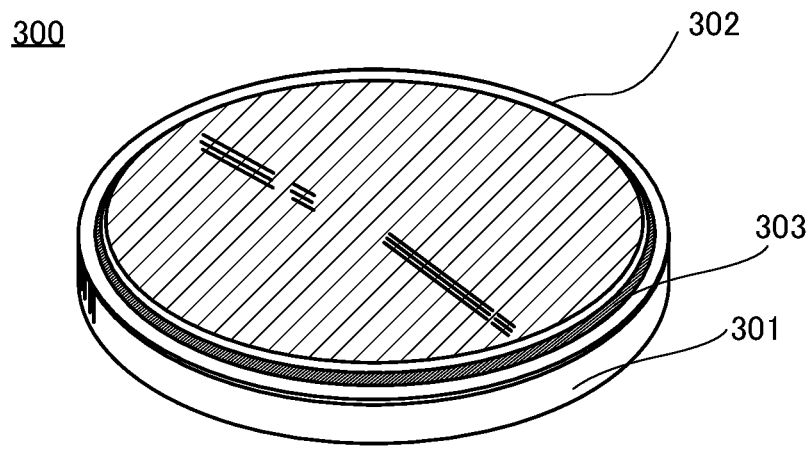
FIG. 19A to FIG. 19C are diagrams illustrating a coin-type secondary battery.
Figure 19B:
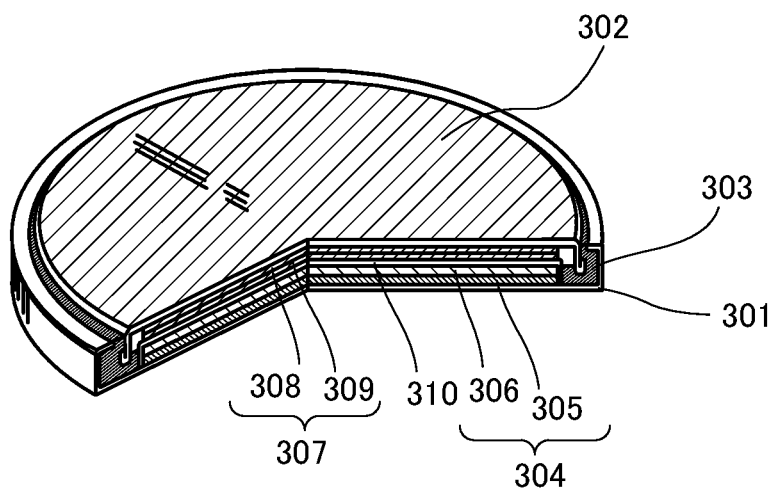

First, an example of a coin-type secondary battery is described. FIG. 19A is an external view of a coin-type (single-layer flat type) secondary battery, and FIG. 19B is a cross-sectional view thereof.

In a coin-type secondary battery 300, a positive electrode can 301 doubling as a positive electrode terminal and a negative electrode can 302 doubling as a negative electrode terminal are insulated and sealed by a gasket 303 formed of polypropylene or the like. A positive electrode 304 is formed of a positive electrode current collector 305 and a positive electrode active material layer 306 provided to be in contact with the positive electrode current collector 305. In addition, a negative electrode 307 is formed of a negative electrode current collector 308 and a negative electrode active material layer 309 provided to be in contact with the negative electrode current collector 308.

Note that an active material layer may be formed over only one surface of each of the positive electrode 304 and the negative electrode 307 used for the coin-type secondary battery 300.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and a separator 310 are immersed in the electrolyte; as illustrated in FIG. 19B, the positive electrode 304, the separator 310, the negative electrode 307, and the negative electrode can 302 are stacked in this order with the positive electrode can 301 positioned at the bottom; and the positive electrode can 301 and the negative electrode can 302 are subjected to pressure bonding through the gasket 303 to manufacture the coin-type secondary battery 300.

With the use of the positive electrode active material described in the above embodiment for the positive electrode 304, the coin-type secondary battery 300 with high capacity and excellent cycle performance can be obtained.

Here, a current flow in charging a secondary battery will be described using FIG. 19C. When a secondary battery using lithium is regarded as one closed circuit, movement of lithium ions and the current flow are in the same direction. Note that in the secondary battery using lithium, an anode and a cathode interchange in charging and discharging, and oxidation reaction and reduction reaction interchange; hence, an electrode with a high reaction potential is called a positive electrode and an electrode with a low reaction potential is called a negative electrode. For this reason, in this specification, the positive electrode is referred to as a "positive electrode" or a "+ electrode (plus electrode)" and the negative electrode is referred to as a "negative electrode" or a "− electrode (minus electrode)" in any of the case where charging is performed, the case where discharging is performed, the case where a reverse pulse current is made to flow, and the case where charging current is made to flow. The use of terms an anode and a cathode related to oxidation reaction and reduction reaction might cause confusion because the anode and the cathode interchange in charging and in discharging. Thus, the terms the anode and the cathode are not used in this specification. If the term the anode or the cathode is used, it should be clearly mentioned that the anode or the cathode is which of the one in charging or in discharging and corresponds to which of the positive electrode (plus electrode) or the negative electrode (minus electrode)

Figure 19C:
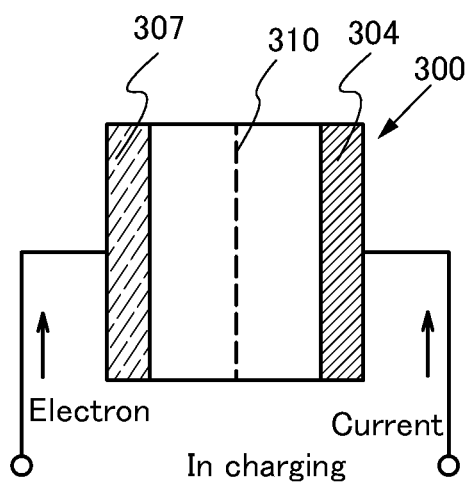

A charger is connected to two terminals shown in FIG. 19C to charge the secondary battery 300. As the charging of the secondary battery 300 proceeds, a potential difference between electrodes increases.

<Cylindrical Secondary Battery>

Figure 20A:
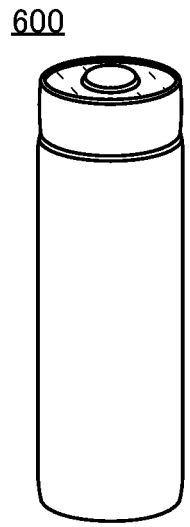
FIG. 20A to FIG. 20D are diagrams illustrating a cylindrical secondary battery.
Figure 20B:
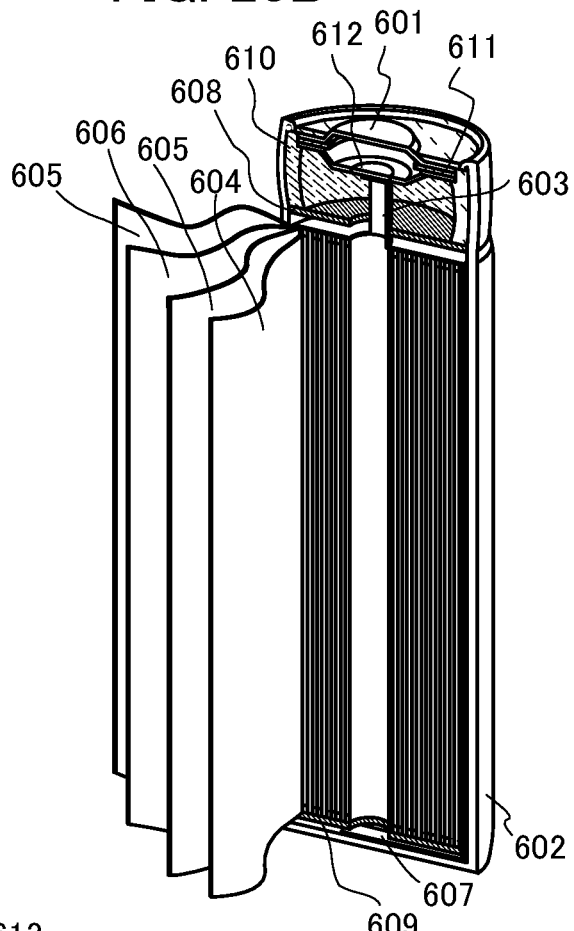

Next, an example of a cylindrical secondary battery is described with reference to FIG. 20. FIG. 20A is an external view of a cylindrical secondary battery 600. FIG. 20B is a diagram schematically illustrating a cross section of the cylindrical secondary battery 600. As illustrated in FIG. 20B, the cylindrical secondary battery 600 includes a positive electrode cap (battery lid) 601 on a top surface and a battery can (outer can) 602 on a side surface and a bottom surface. The positive electrode cap and the battery can (outer can) 602 are insulated by a gasket (insulating gasket) 610.

Inside the battery can 602 having a hollow cylindrical shape, a battery element in which a belt-like positive electrode 604 and a belt-like negative electrode 606 are wound with a separator 605 located therebetween is provided. Although not illustrated, the battery element is wound centering around a center pin. One end of the battery can 602 is closed and the other end thereof is opened. For the battery can 602, a metal having corrosion resistance to an electrolyte solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is sandwiched between a pair of insulating plates 608 and 609 that face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type secondary battery can be used.

Since the positive electrode and the negative electrode that are used for a cylindrical storage battery are wound, active materials are preferably formed on both surfaces of the current collector. A positive electrode terminal (positive electrode current collector lead) 603 is connected to the positive electrode 604, and a negative electrode terminal (negative electrode current collector lead) 607 is connected to the negative electrode 606. For both the positive electrode terminal 603 and the negative electrode terminal 607, a metal material such as aluminum can be used. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a PTC element (Positive Temperature Coefficient) 611. The safety valve mechanism 612 cuts off electrical connection between the positive electrode cap 601 and the positive electrode 604 when the internal pressure of the battery exceeds a predetermined threshold value. In addition, the PTC element 611 is a thermally sensitive resistor whose resistance increases as temperature rises, and limits the amount of current by increasing the resistance to prevent abnormal heat generation. Barium titanate ($BaTiO_3$)-based semiconductor ceramic or the like can be used for the PTC element.

Figure 20C:
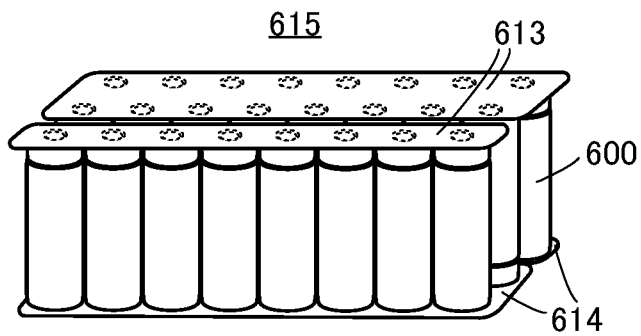

Alternatively, as illustrated in FIG. 20C, a plurality of secondary batteries 600 may be sandwiched between a conductive plate 613 and a conductive plate 614 to construct a module 615. The plurality of secondary batteries 600 may be connected in parallel, connected in series, or further connected in series after being connected in parallel. By constructing the module 615 including the plurality of secondary batteries 600, large power can be extracted.

Figure 20D:
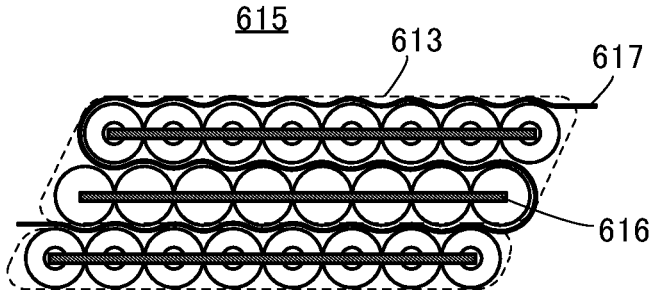

FIG. 20D is a top view of the module 615. The conductive plate 613 is shown by a dotted line for clarity of the drawing. As illustrated in FIG. 20D, the module 615 may include a conducting wiring 616 that electrically connects the plurality of secondary batteries 600. It is possible to provide the conductive plate over the conducting wiring 616 to overlap. In addition, a temperature control device 617 may be included between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is less likely to be influenced by the outside temperature. A heating medium included in the temperature control device 617 preferably has an insulating property and incombustibility.

With the use of the positive electrode active material described in the above embodiment for the positive electrode 604, the cylindrical secondary battery 600 with high capacity and excellent cycle performance can be obtained.

<Structure Examples of Secondary Batteries>

Other structure examples of secondary batteries are described using FIG. 21 to FIG. 25.

Figure 21A:
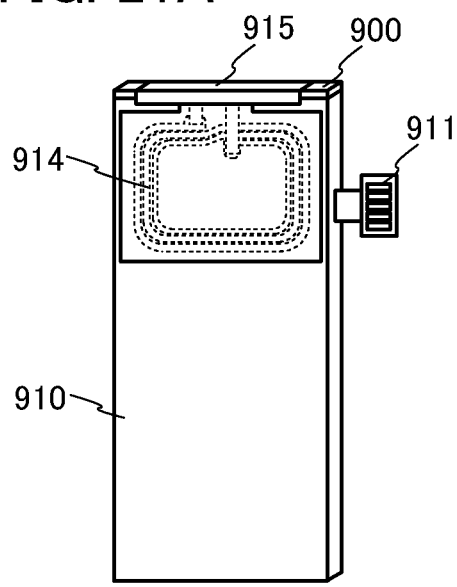
FIG. 21A and FIG. 21B are diagrams illustrating an example of a secondary battery.
Figure 21B:
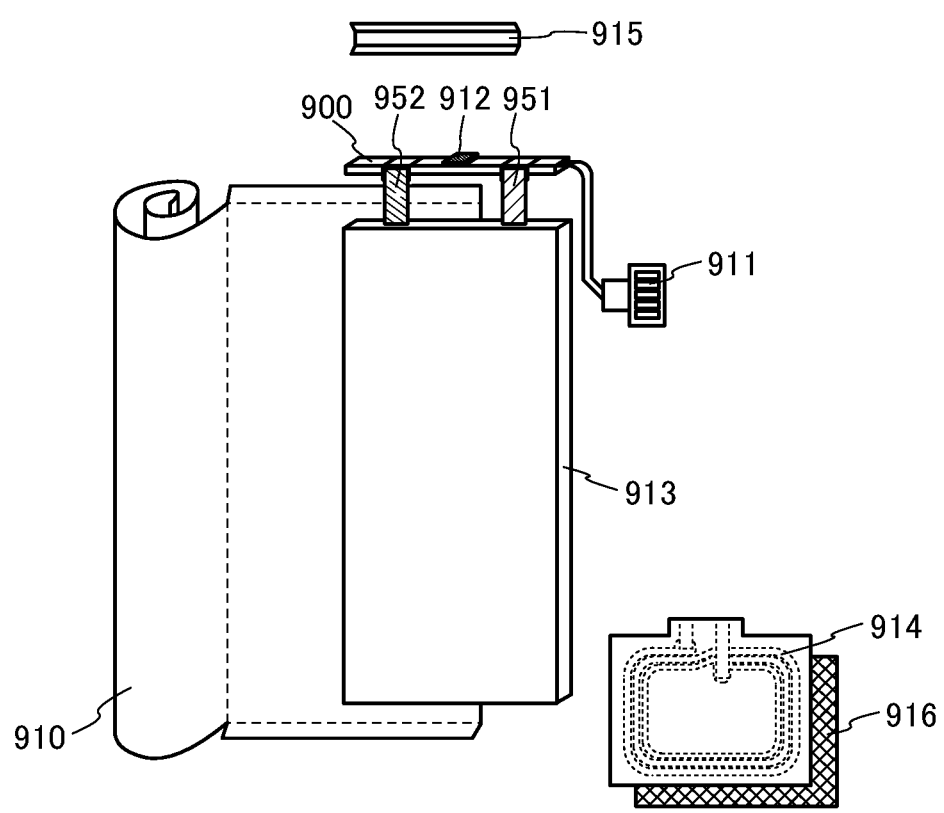

FIG. 21A and FIG. 21B are external views of a battery pack. The battery pack includes a secondary battery 913 and a circuit board 900. The secondary battery 913 is connected to an antenna 914 through the circuit board 900. In addition, a label 910 is attached to the secondary battery 913. Moreover, as illustrated in FIG. 21B, the secondary battery 913 is connected to a terminal 951 and a terminal 952. The circuit board 900 is fixed by a sealant 915.

The circuit board 900 includes a terminal 911 and a circuit 912. The terminal 911 is connected to the terminal 951, the terminal 952, an antenna 914, and the circuit 912. Note that a plurality of terminals 911 may be provided so that each of the plurality of terminals 911 serves as a control signal input terminal, a power supply terminal, or the like.

The circuit 912 may be provided on the rear surface of the circuit board 900. Note that the shape of the antenna 914 is not limited to a coil shape and may be a linear shape or a plate shape. Furthermore, an antenna such as a planar antenna, an aperture antenna, a traveling-wave antenna, an EH antenna, a magnetic-field antenna, or a dielectric antenna may be used. Alternatively, the antenna 914 may be a flat-plate conductor. The flat-plate conductor can serve as one of the conductors for electric field coupling. That is, the antenna 914 can serve as one of two conductors of a capacitor. Thus, power can be transmitted and received not only by an electromagnetic field or a magnetic field but also by an electric field.

The battery pack includes a layer 916 between the antenna 914 and the secondary battery 913. The layer 916 has a function of blocking an electromagnetic field by the secondary battery 913, for example. As the layer 916, for example, a magnetic body can be used.

Note that the structure of the battery pack is not limited to that in FIG. 21.

Figure 22A:
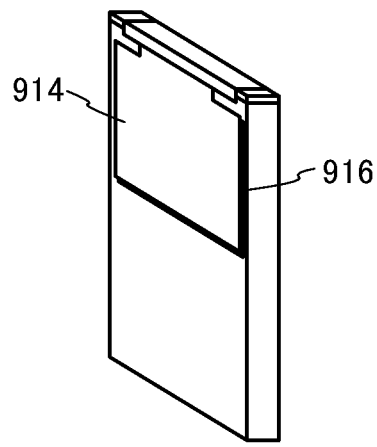
FIG. 22A to FIG. 22D are diagrams illustrating an example of a secondary battery.
Figure 22B:
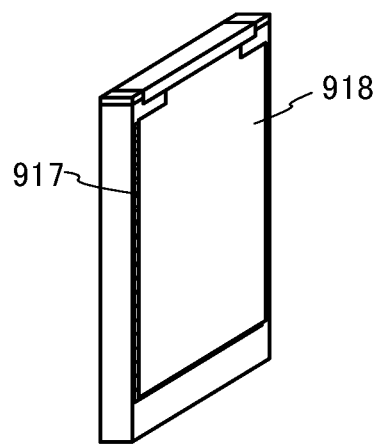

For example, as shown in FIG. 22A and FIG. 22B, an antenna may be provided for each of a pair of opposite surfaces of the secondary battery 913 shown in FIG. 21A and FIG. 21B. FIG. 22A is an external view illustrating one of the pair of surfaces, and FIG. 22B is an external view illustrating the other of the pair of surfaces. Note that, for the same portions as those in the secondary battery shown in FIG. 21A and FIG. 21B, it is possible to refer to the description of the secondary battery shown in FIG. 21A and FIG. 21B as appropriate.

As illustrated in FIG. 22A, the antenna 914 is provided on one of the opposite surfaces of the secondary battery 913 with the layer 916 located therebetween, and as illustrated in FIG. 22B, an antenna 918 is provided on the other of the opposite surfaces of the secondary battery 913 with a layer 917 located therebetween. The layer 917 has a function of blocking an electromagnetic field by the secondary battery 913, for example. As the layer 917, for example, a magnetic body can be used.

With the above structure, both of the antenna 914 and the antenna 918 can be increased in size. The antenna 918 has a function of communicating data with an external device, for example. An antenna with a shape that can be applied to the antenna 914, for example, can be applied to the antenna 918. As a system for communication using the antenna 918 between the secondary battery and another device, a response method that can be used between the secondary battery and another device, such as NFC (near field communication), can be employed.

Figure 22C:
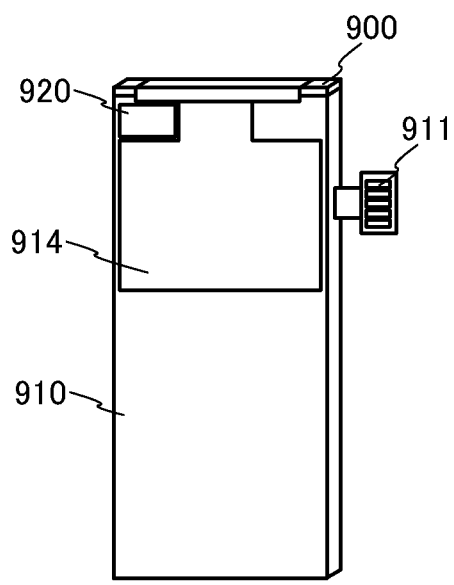

Alternatively, as illustrated in FIG. 22C, the secondary battery 913 shown in FIG. 21A and FIG. 21B may be provided with a display device 920. The display device 920 is electrically connected to the terminal 911. Note that the label 910 is not necessarily provided in a portion where the display device 920 is provided. Note that for the same portions as those in the secondary battery shown in FIG. 21A and FIG. 21B, it is possible to refer to the description of the secondary battery shown in FIG. 21A and FIG. 21B as appropriate.

The display device 920 may display, for example, an image showing whether or not charging is being carried out, an image showing the amount of stored power, or the like. As the display device 920, electronic paper, a liquid crystal display device, an electroluminescence (also referred to as EL) display device, or the like can be used, for example. For example, the use of electronic paper can reduce power consumption of the display device 920.

Figure 22D:
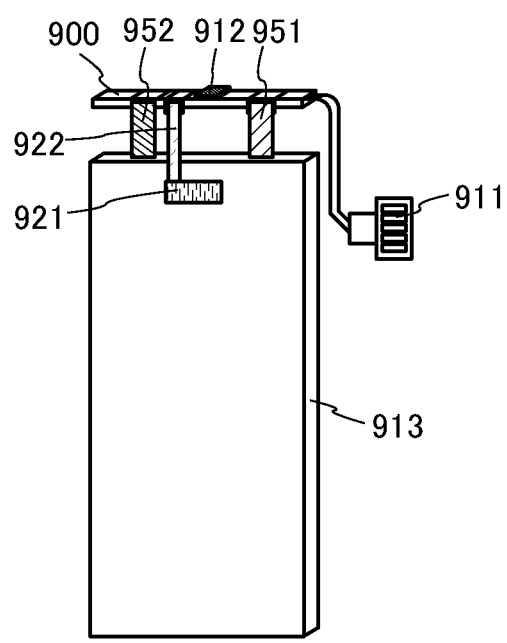

Alternatively, as illustrated in FIG. 22D, the secondary battery 913 shown in FIG. 21A and FIG. 21B may be provided with a sensor 921. The sensor 921 is electrically connected to the terminal 911 via a terminal 922. For the same portions as those in the secondary battery shown in FIG. 21A and FIG. 21B, it is possible to refer to the description of the secondary battery shown in FIG. 21A and FIG. 21B as appropriate.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, power, radiation, flow rate, humidity, gradient, vibration, odor, or infrared rays. With provision of the sensor 921, for example, data on an environment where the secondary battery is placed (e.g., temperature or the like) can be detected and stored in a memory inside the circuit 912.

Furthermore, structure examples of the secondary battery 913 are described using FIG. 23 and FIG. 29.

Figure 23A:
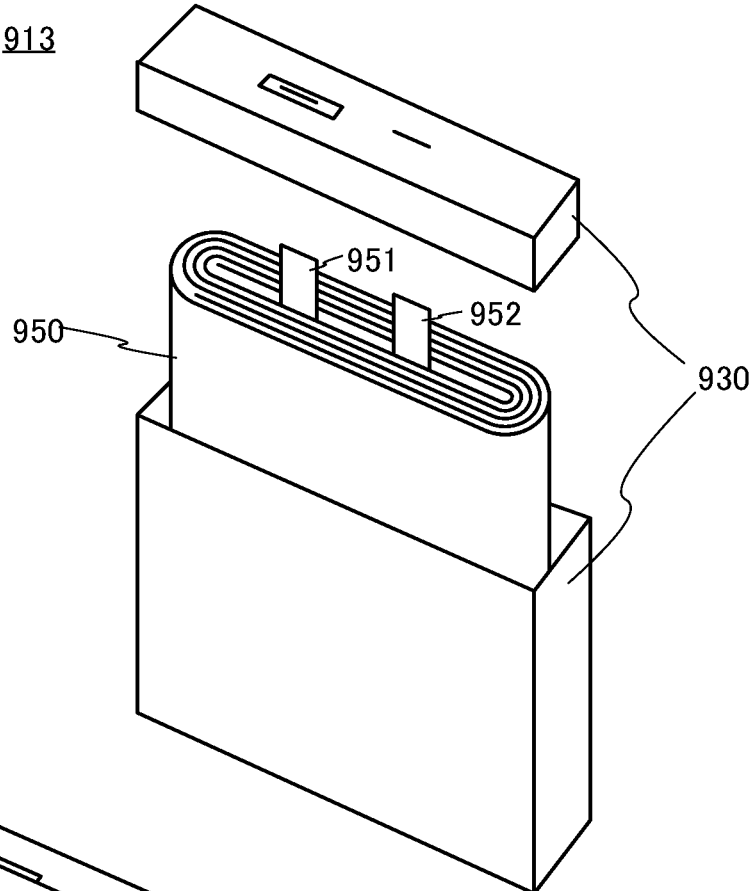
FIG. 23A and FIG. 23B are diagrams illustrating an example of a secondary battery.

The secondary battery 913 illustrated in FIG. 23A includes a wound body 950 provided with the terminal 951 and the terminal 952 inside a housing 930. The wound body 950 is immersed in an electrolyte solution inside the housing 930. The terminal 952 is in contact with the housing 930. The use of an insulator or the like prevents contact between the terminal 951 and the housing 930. Note that in FIG. 23A, the housing 930 that has been divided is illustrated for convenience; however, in reality, the wound body 950 is covered with the housing 930, and the terminal 951 and the terminal 952 extend to the outside of the housing 930. For the housing 930, a metal material (e.g., aluminum or the like) or a resin material can be used.

Figure 23B:
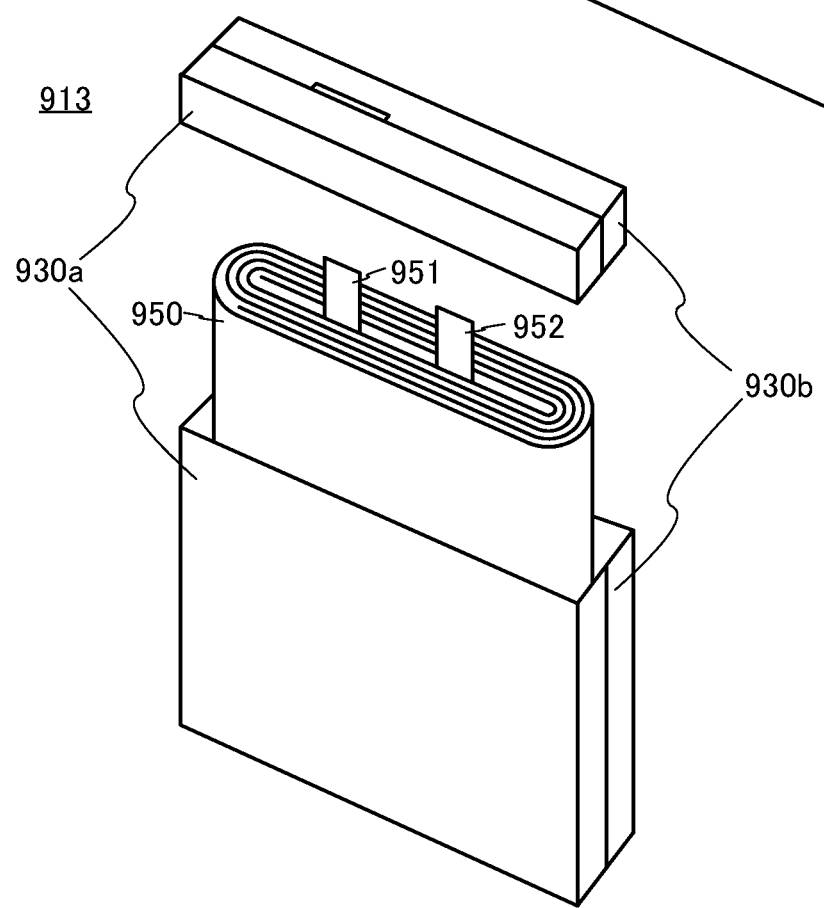

Note that as illustrated in FIG. 23B, the housing 930 illustrated in FIG. 23A may be formed using a plurality of materials. For example, in the secondary battery 913 illustrated in FIG. 23B, a housing 930a and a housing 930b are attached to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field by the secondary battery 913 can be inhibited. Note that in the case where blocking of an electric field by the housing 930a is small, an antenna such as the antenna 914 may be provided inside the housing 930a. For the housing 930b, a metal material can be used, for example.

Figure 24:
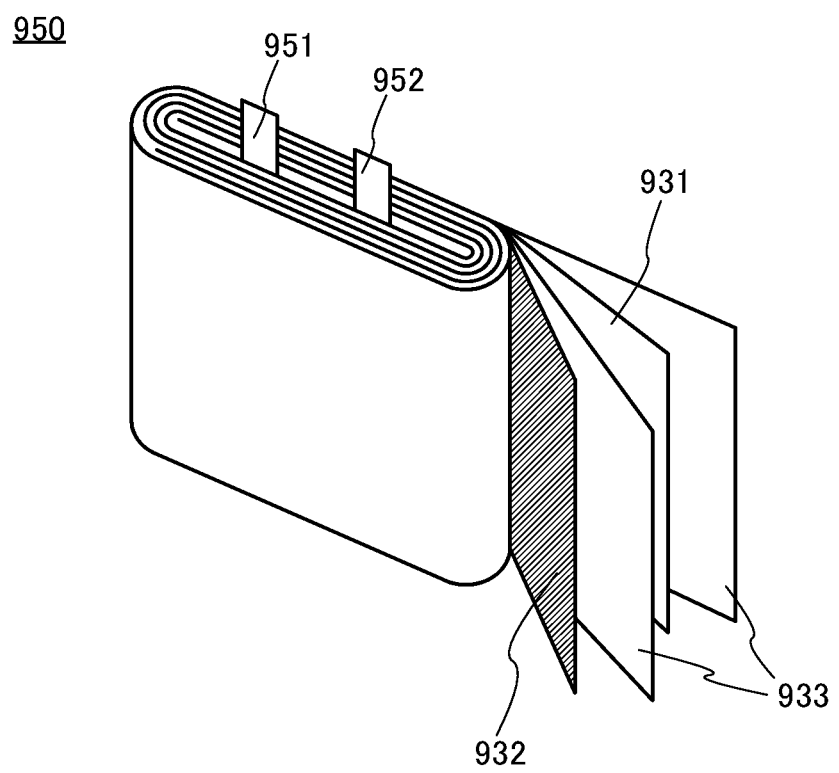
FIG. 24 is a diagram illustrating an example of a secondary battery.

In addition, FIG. 24 illustrates the structure of the wound body 950. The wound body 950 includes a negative electrode 931, a positive electrode 932, and separators 933. The wound body 950 is a wound body where the negative electrode 931 is stacked to overlap with the positive electrode 932 with the separator 933 sandwiched therebetween and the sheet of the stack is wound. Note that a plurality of stacks of the negative electrode 931, the positive electrode 932, and the separator 933 may be superimposed.

The negative electrode 931 is connected to the terminal 911 illustrated in FIG. 21 via one of the terminal 951 and the terminal 952. The positive electrode 932 is connected to the terminal 911 illustrated in FIG. 21 via the other of the terminal 951 and the terminal 952.

With the use of the positive electrode active material described in the above embodiment for the positive electrode 932, the secondary battery 913 with high capacity and excellent cycle performance can be obtained.

<Laminated Secondary Battery>

Next, examples of a laminated secondary battery are described with reference to FIG. 25 to FIG. 35. With a structure where the laminated secondary battery has flexibility and is incorporated in an electronic device at least part of which has a flexible portion, the secondary battery can also be bent in accordance with the deformation of the electronic device.

Figure 25A:
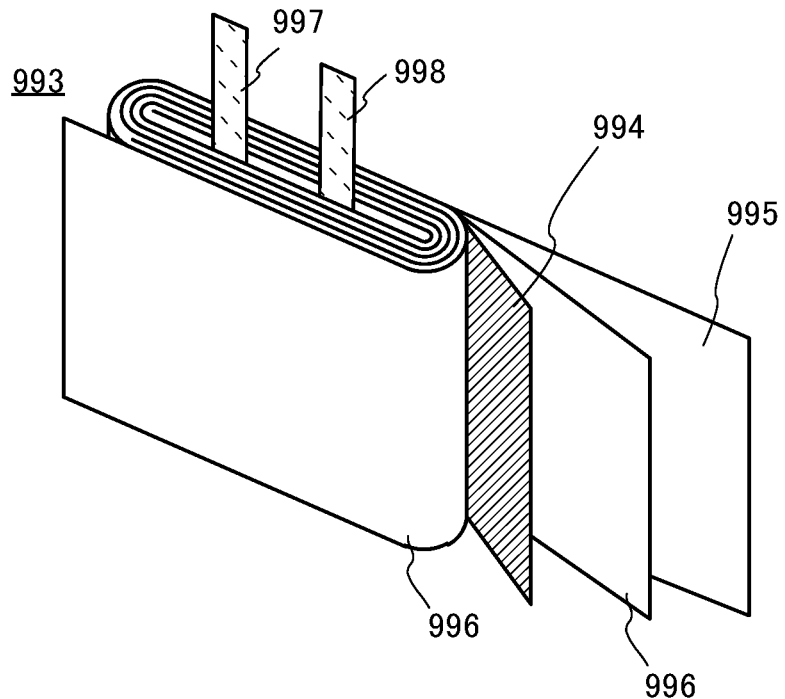
FIG. 25A to FIG. 25C are diagrams illustrating an example of a laminated secondary battery.

A laminated secondary battery 980 is described using FIG. 25. The laminated secondary battery 980 includes a wound body 993 illustrated in FIG. 25A. The wound body 993 includes a negative electrode 994, a positive electrode 995, and separators 996. Like the wound body 950 illustrated in FIG. 24, the wound body 993 is a wound body where the negative electrode 994 is stacked to overlap with the positive electrode 995 with the separator 996 sandwiched therebetween and the sheet of the stack is wound.

Note that the number of stacked layers including the negative electrode 994, the positive electrode 995, and the separator 996 may be designed as appropriate depending on required capacity and element volume. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 25B:
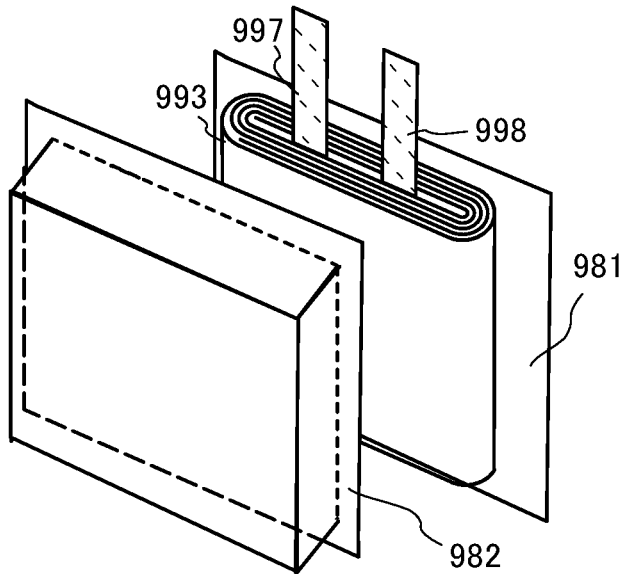
Figure 25C:
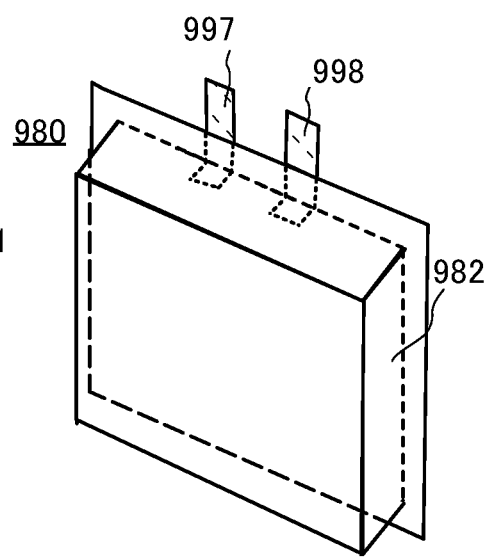

As illustrated in FIG. 25B, the wound body 993 is packed in a space formed through attachment of a film 981 that serves as an exterior body and a film 982 having a depressed portion by thermocompression bonding or the like, whereby the secondary battery 980 can be manufactured, as illustrated in FIG. 25C. The wound body 993 includes the lead electrode 997 and the lead electrode 998, and is immersed in an electrolyte solution inside the film 981 and the film 982 having a depressed portion.

For the film 981 and the film 982 having a depressed portion, a metal material such as aluminum or a resin material can be used, for example. With the use of a resin material as the material of the film 981 and the film 982 having a depressed portion, the film 981 and the film 982 having a depressed portion can be deformed when external force is applied; thus, a flexible storage battery can be manufactured.

In addition, although FIG. 25B and FIG. 25C illustrate an example of using two films, a space may be formed by bending one film and the wound body 993 may be packed in the space.

With the use of the positive electrode active material described in the above embodiment for the positive electrode 995, the secondary battery 980 with high capacity and excellent cycle performance can be obtained.

In addition, FIG. 25 illustrates an example in which the secondary battery 980 includes a wound body in a space formed by films serving as exterior bodies; however, as illustrated in FIG. 26, for example, a secondary battery may include a plurality of strip-shaped positive electrodes, separators, and negative electrodes in a space formed by films serving as exterior bodies.

Figure 26A:
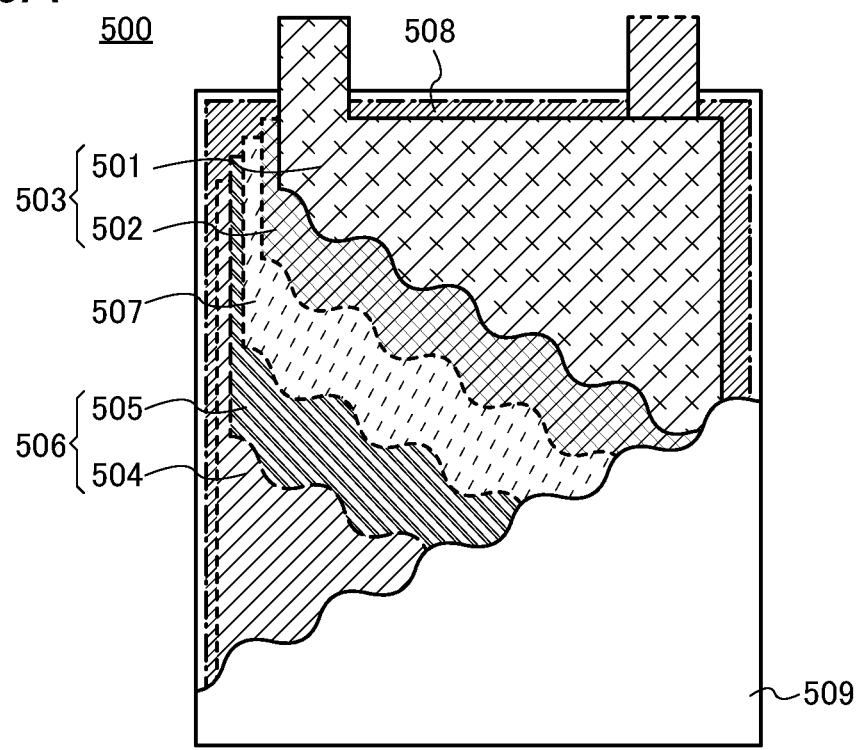
FIG. 26A and FIG. 26B are diagrams illustrating a laminated secondary battery.

A laminated secondary battery 500 illustrated in FIG. 26A includes a positive electrode 503 including a positive electrode current collector 501 and a positive electrode active material layer 502; a negative electrode 506 including a negative electrode current collector 504 and a negative electrode active material layer 505; a separator 507; an electrolyte solution 508; and an exterior body 509. The separator 507 is placed between the positive electrode 503 and the negative electrode 506 provided in the exterior body 509. In addition, the exterior body 509 is filled with the electrolyte solution 508. The electrolyte solution described in Embodiment 3 can be used as the electrolyte solution 508.

In the laminated secondary battery 500 illustrated in FIG. 26A, the positive electrode current collector 501 and the negative electrode current collector 504 also serve as terminals that make electrical contact with the outside. For this reason, parts of the positive electrode current collector 501 and the negative electrode current collector 504 may be arranged to be exposed from the exterior body 509 to the outside. Alternatively, without exposing the positive electrode current collector 501 and the negative electrode current collector 504 from the exterior body 509 to the outside, a lead electrode may be used, and the lead electrode and the positive electrode current collector 501 or the negative electrode current collector 504 may be bonded by ultrasonic welding so that the lead electrode is exposed to the outside.

In the laminated secondary battery 500, for the exterior body 509, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is further provided as the outer surface of the exterior body over the metal thin film can be used.

Figure 26B:
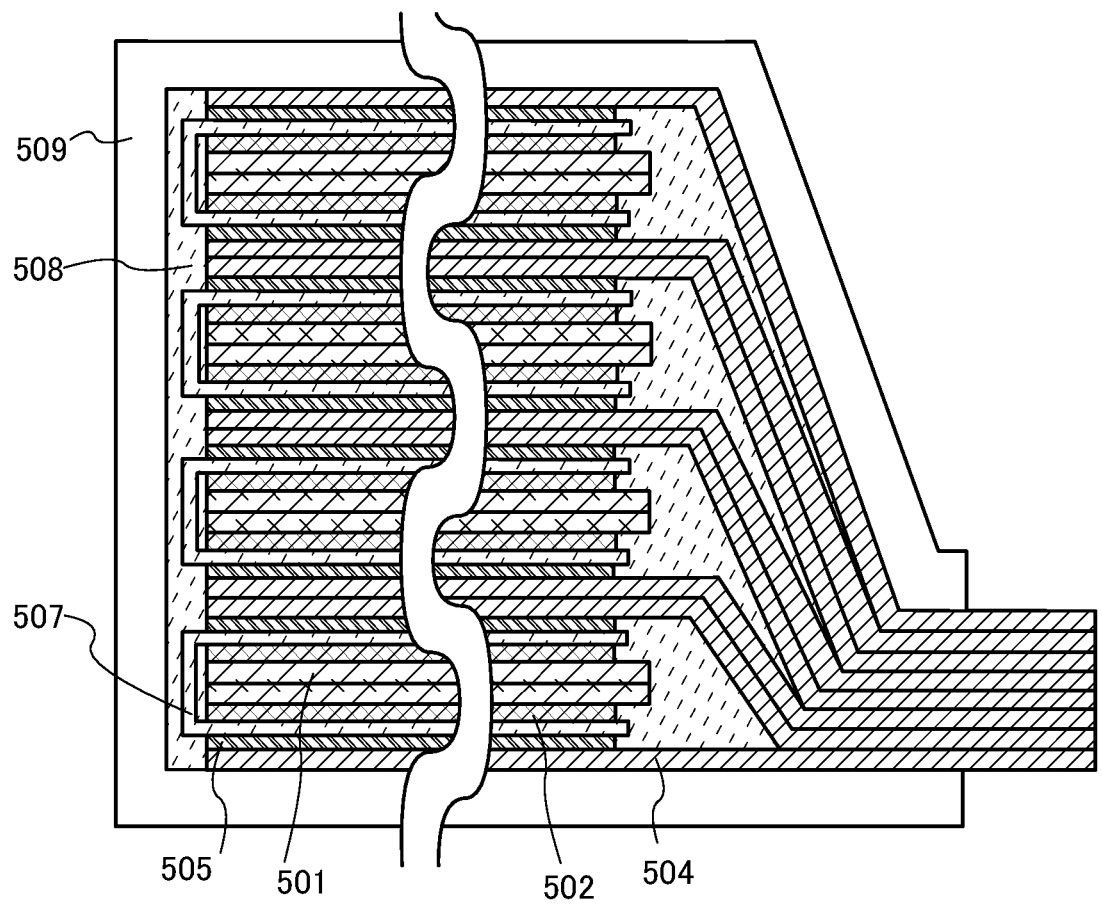

Furthermore, FIG. 26B illustrates an example of a cross-sectional structure of the laminated secondary battery 500. Although FIG. 26A illustrates an example in which the laminated secondary battery 500 is composed of two current collectors for simplicity, the laminated secondary battery 500 is actually composed of a plurality of electrode layers, as illustrated in FIG. 26B.

In FIG. 26B, the number of electrode layers is set to 16, for example. Note that the secondary battery 500 has flexibility even though the number of electrode layers is set to 16. FIG. 26B illustrates a structure including total 16 layers of eight layers of negative electrode current collectors 504 and eight layers of positive electrode current collectors 501. Note that FIG. 26B illustrates a cross section of the extraction portion of the negative electrode, and the eight layers of the negative electrode current collectors 504 are bonded by ultrasonic welding. It is needless to say that the number of electrode layers is not limited to 16, and may be either more than 16 or less than 16. In the case where the number of electrode layers is large, the secondary battery can have higher capacity. Moreover, in the case where the number of electrode layers is small, the secondary battery can have smaller thickness and high flexibility.

Figure 27:
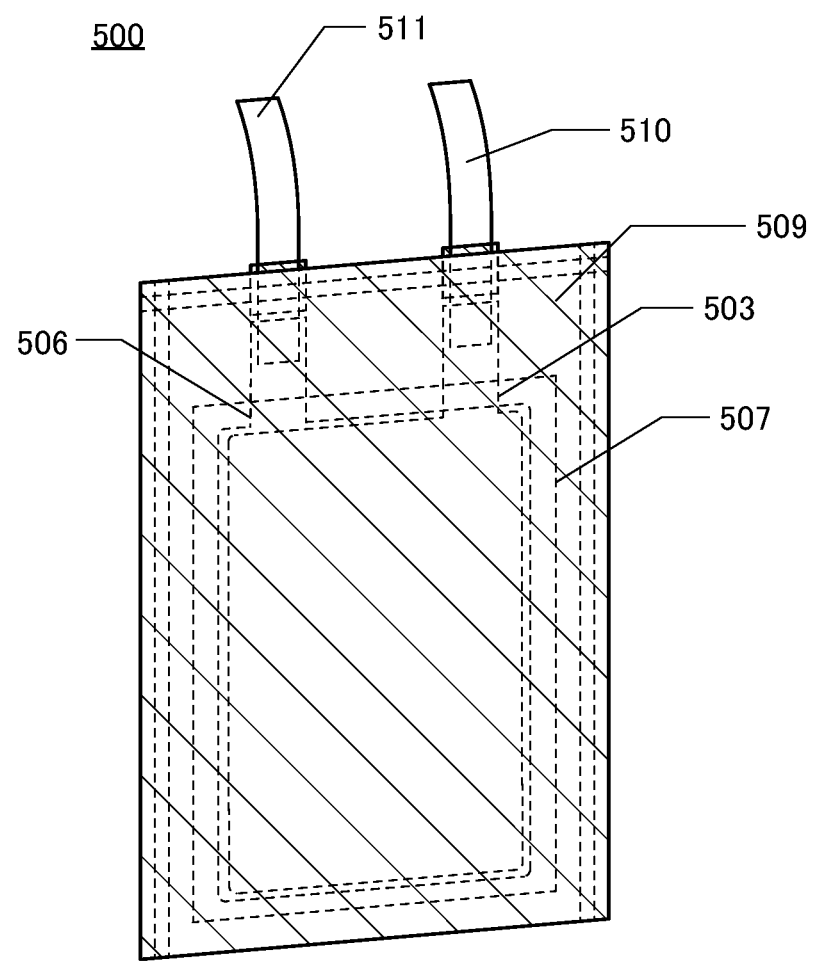
FIG. 27 is an external view of a secondary battery.
Figure 28:
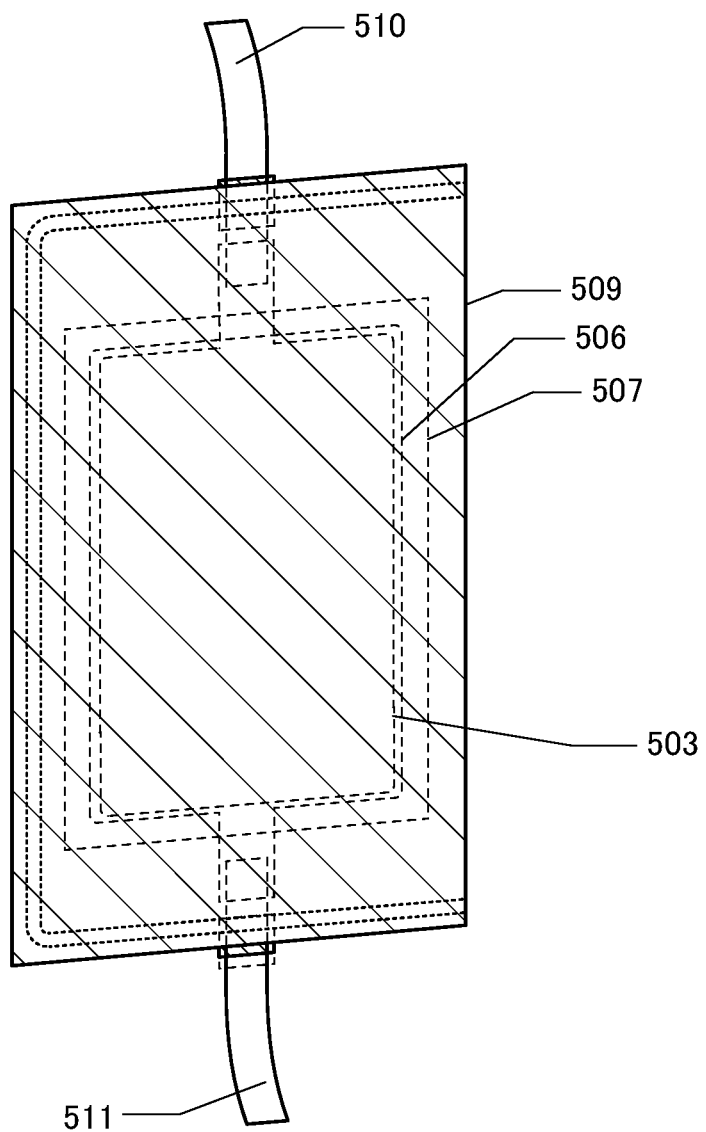
FIG. 28 is an external view of a secondary battery.

Here, FIG. 27 and FIG. 28 illustrate examples of the external view of the laminated secondary battery 500. In FIG. 27 and FIG. 28, the positive electrode 503, the negative electrode 506, the separator 507, the exterior body 509, a positive electrode lead electrode 510, and a negative electrode lead electrode 511 are included.

Figure 29A:
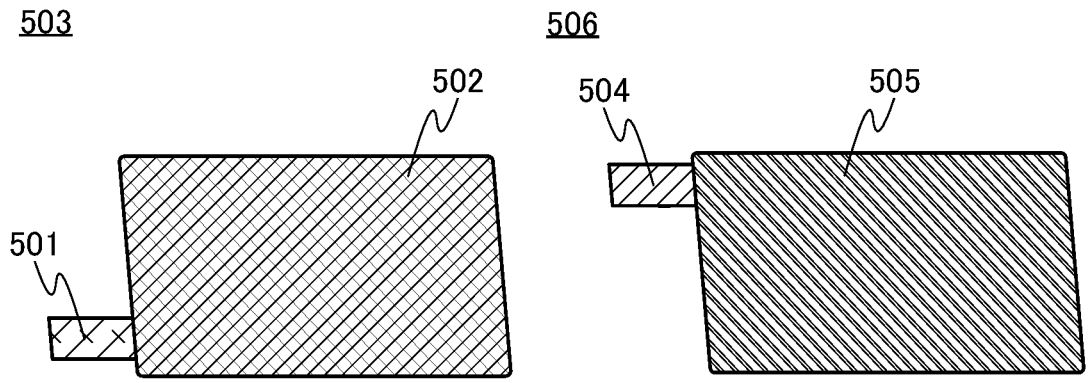
FIG. 29A to FIG. 29C are diagrams illustrating a method of forming a secondary battery.

FIG. 29A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter, such a region is referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and shapes of the tab regions included in the positive electrode and the negative electrode are not limited to the examples illustrated in FIG. 29A.

<Manufacturing Method of Laminated Secondary Battery>

Figure 29B:
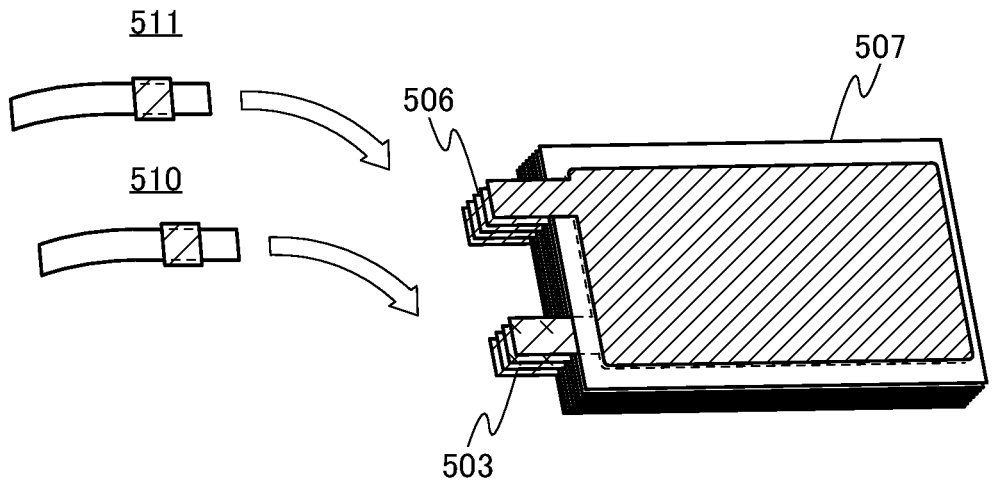
Figure 29C:
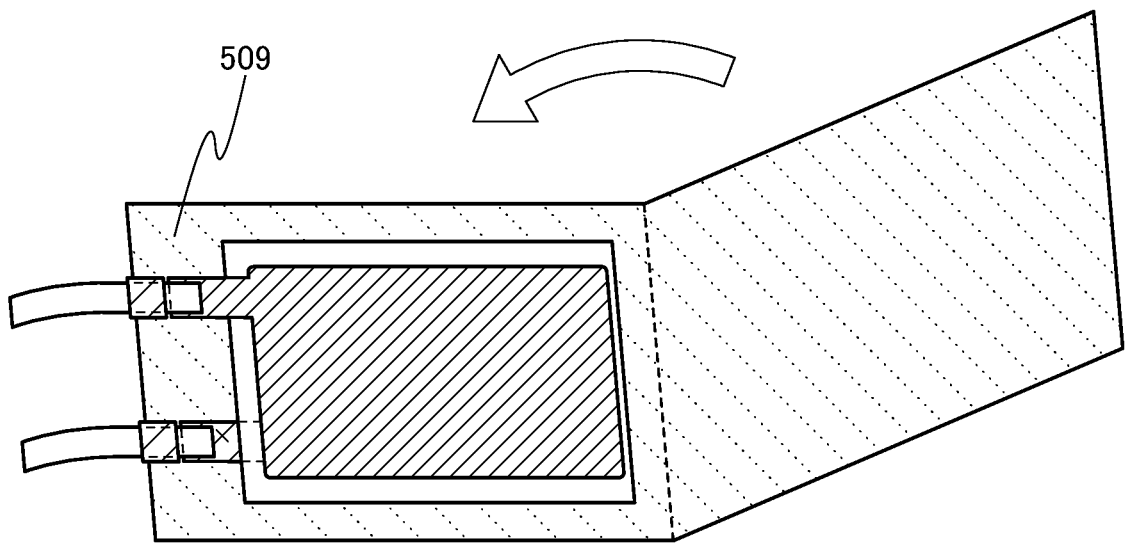

Here, an example of a manufacturing method of the laminated secondary battery whose external view is illustrated in FIG. 27 is described using FIG. 29B and FIG. 29C.

First, the negative electrode 506, the separator 507, and the positive electrode 503 are stacked. FIG. 29B illustrates the negative electrode 506, the separator 507, and the positive electrode 503 that are stacked. An example of using five sets of negative electrodes and four sets of positive electrodes is described here. Next, the tab regions of the positive electrodes 503 are bonded to each other, and the positive electrode lead electrode 510 is bonded to the tab region of the positive electrode on the outermost surface. Ultrasonic welding or the like may be used for the bonding, for example. In a similar manner, the tab regions of the negative electrodes 506 are bonded to each other, and the negative electrode lead electrode 511 is bonded to the tab region of the negative electrode on the outermost surface.

Next, the negative electrode 506, the separator 507, and the positive electrode 503 are placed over the exterior body 509.

Next, the exterior body 509 is bent along a portion shown by a dashed line, as illustrated in FIG. 29C. Then, the outer portions of the exterior body 509 are bonded. Thermocompression or the like may be used for the bonding, for example. At this time, an unbonded region (hereinafter referred to as an inlet) is provided for part (or one side) of the exterior body 509 so that the electrolyte solution 508 can be introduced later.

Next, the electrolyte solution 508 (not illustrated) is introduced into the inside of the exterior body 509 from the inlet provided for the exterior body 509. The electrolyte solution 508 is preferably introduced in a reduced pressure atmosphere or in an inert atmosphere. Lastly, the inlet is bonded. In this manner, the laminated secondary battery 500 can be manufactured.

With the use of the positive electrode active material described in the above embodiment for the positive electrode 503, the secondary battery 500 with high capacity and excellent cycle performance can be obtained.

In an all-solid-state battery, the contact state of the inside interfaces can be kept favorable by applying a predetermined pressure in the direction of stacking positive electrodes and negative electrodes. By applying a predetermined pressure in the direction of stacking positive electrodes and negative electrodes, expansion in the stacking direction due to charge and discharge of the all-solid-state battery can be inhibited, improving the reliability of the all-solid-state battery.

This embodiment can be implemented in appropriate combination with the other embodiments.

Embodiment 6

In this embodiment, examples of electronic devices each including the secondary battery of one embodiment of the present invention are described.

First, FIG. 30A to FIG. 30G show examples of electronic devices including the bendable secondary battery described in the above embodiment. Examples of electronic devices each including a bendable secondary battery include television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

Figure 30A:
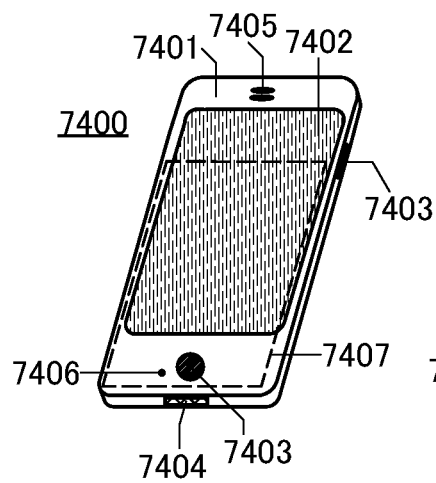
FIG. 30A to FIG. 30H are diagrams illustrating examples of electronic devices.

FIG. 30A shows an example of a mobile phone. A mobile phone 7400 is provided with a display portion 7402 incorporated in a housing 7401, operation buttons 7403, an external connection port 7404, a speaker 7405, a microphone 7406, and the like. Note that the mobile phone 7400 includes a secondary battery 7407. When the secondary battery of one embodiment of the present invention is used as the secondary battery 7407, a lightweight mobile phone with a long lifetime can be provided.

Figure 30B:
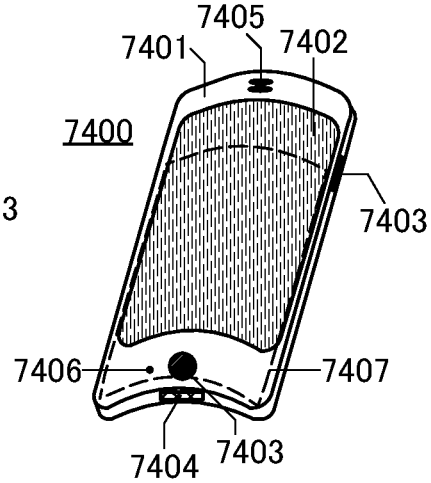
Figure 30C:
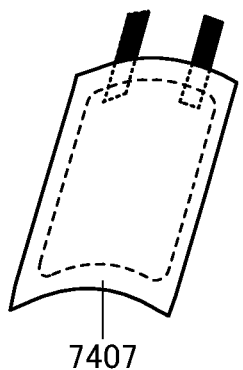

FIG. 30B illustrates the mobile phone 7400 that is bent. When the whole mobile phone 7400 is bent by the external force, the secondary battery 7407 provided therein is also bent. FIG. 30C illustrates the bent secondary battery 7407.

The secondary battery 7407 is a thin storage battery. The secondary battery 7407 is fixed in a state of being bent. Note that the secondary battery 7407 includes a lead electrode electrically connected to a current collector. The current collector is, for example, copper foil, and partly alloyed with gallium; thus, adhesion between the current collector and an active material layer in contact with the current collector is improved and the secondary battery 7407 can have high reliability even in a state of being bent.

Figure 30D:
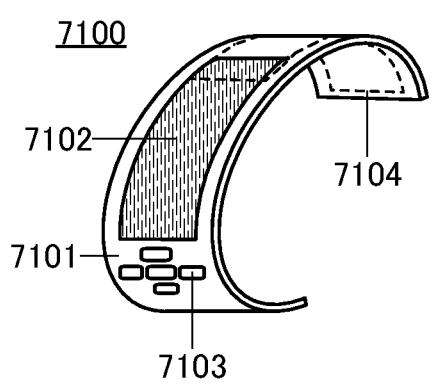
Figure 30E:

FIG. 30D shows an example of a bangle display device. A portable display device 7100 includes a housing 7101, a display portion 7102, operation buttons 7103, and a secondary battery 7104. FIG. 30E illustrates the bent secondary battery 7104. When the display device is worn on a user's arm while the secondary battery 7104 is bent, the housing changes its shape and the curvature of part or the whole of the secondary battery 7104 is changed. Note that the bending condition of a curve at a given point that is represented by a value of the radius of a corresponding circle is referred to as the radius of curvature, and the reciprocal of the radius of curvature is referred to as curvature. Specifically, part or the whole of the housing or the main surface of the secondary battery 7104 is changed in the range of radius of curvature from 40 mm or more to 150 mm or less. When the radius of curvature at the main surface of the secondary battery 7104 is in the range from 40 mm or more to 150 mm or less, the reliability can be kept high. When the secondary battery of one embodiment of the present invention is used as the secondary battery 7104, a lightweight portable display device with a long lifetime can be provided.

Figure 30F:
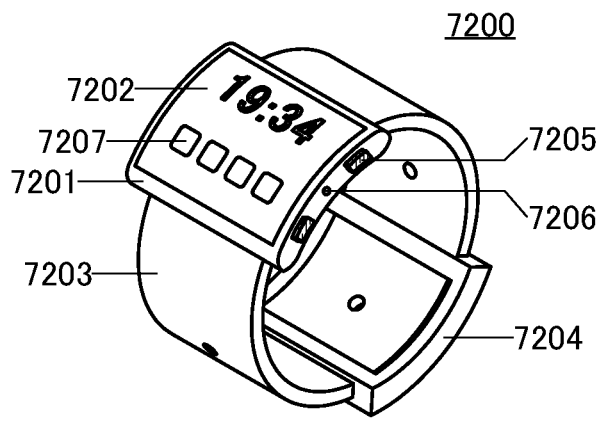

FIG. 30F shows an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input/output terminal 7206, and data can be directly transmitted to and received from another information terminal via a connector. In addition, charge via the input/output terminal 7206 is possible. Note that the charge operation may be performed by wireless power feeding without using the input/output terminal 7206.

The display portion 7202 of the portable information terminal 7200 includes the secondary battery of one embodiment of the present invention. When the secondary battery of one embodiment of the present invention is used, a lightweight portable information terminal with a long lifetime can be provided. For example, the secondary battery 7104 illustrated in FIG. 30E that is in the state of being curved can be provided in the housing 7201. Alternatively, the secondary battery 7104 illustrated in FIG. 30E can be provided in the band 7203 such that it can be curved.

The portable information terminal 7200 preferably includes a sensor. As the sensor, for example, a human body sensor such as a fingerprint sensor, a pulse sensor, or a temperature sensor, a touch sensor, a pressure sensitive sensor, or an acceleration sensor is preferably mounted.

Figure 30G:
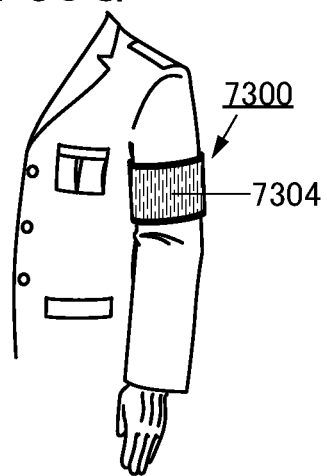

FIG. 30G shows an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication, which is a communication method based on an existing communication standard.

The display device 7300 includes an input/output terminal, and data can be directly transmitted to and received from another information terminal via a connector. In addition, charge via the input/output terminal is possible. Note that the charge operation may be performed by wireless power feeding without using the input/output terminal.

When the secondary battery of one embodiment of the present invention is used as the secondary battery included in the display device 7300, a lightweight display device with a long lifetime can be provided.

In addition, examples of electronic devices each including the secondary battery with excellent cycle performance described in the above embodiment are described with reference to FIG. 30H, FIG. 31, and FIG. 32.

When the secondary battery of one embodiment of the present invention is used as a secondary battery of a daily electronic device, a lightweight product with a long lifetime can be provided. Examples of the daily electronic device include an electric toothbrush, an electric shaver, and electric beauty equipment. As secondary batteries of these products, small and lightweight stick type secondary batteries with high capacity are desired in consideration of handling ease for users.

Figure 30H:
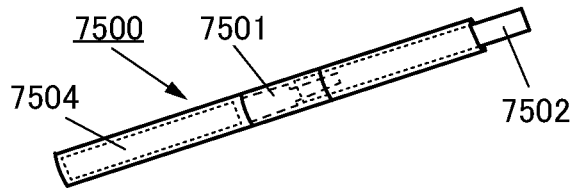

FIG. 30H is a perspective view of a device called a vaporizer (electronic cigarette). In FIG. 30H, an electronic cigarette 7500 includes an atomizer 7501 including a heating element, a secondary battery 7504 that supplies power to the atomizer, and a cartridge 7502 including a liquid supply bottle, a sensor, and the like. To improve safety, a protection circuit that prevents overcharge and overdischarge of the secondary battery 7504 may be electrically connected to the secondary battery 7504. The secondary battery 7504 illustrated in FIG. 30H includes an external terminal for connection to a charger. When the electronic cigarette 7500 is held by a user, the secondary battery 7504 becomes a tip portion; thus, it is preferred that the secondary battery 7504 have a short total length and be lightweight. With the secondary battery of one embodiment of the present invention, which has high capacity and excellent cycle performance, the small and lightweight electronic cigarette 7500 that can be used for a long time over a long period can be provided.

Figure 31A:
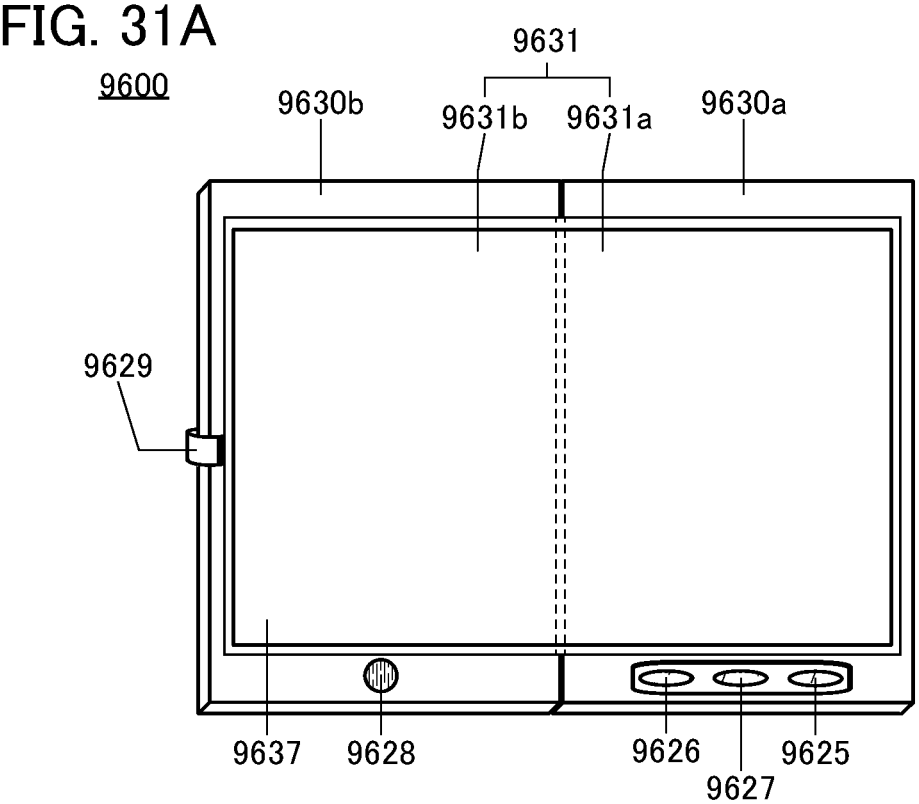
FIG. 31A to FIG. 31C are diagrams illustrating an example of an electronic device.
Figure 31B:
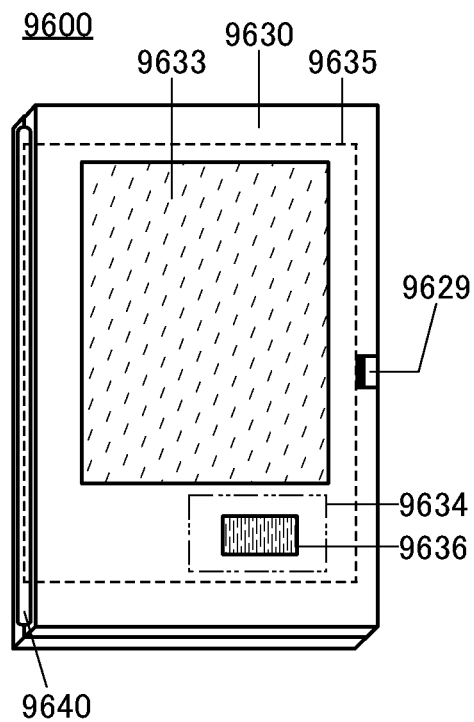

Next, FIG. 31A and FIG. 31B show an example of a tablet terminal that can be folded in half A tablet terminal 9600 illustrated in FIG. 31A and FIG. 31B includes a housing 9630*a*, a housing 9630*b*, a movable portion 9640 connecting the housing 9630*a* and the housing 9630*b* to each other, a display portion 9631 including a display portion 9631*a* and a display portion 9631*b*, a switch 9625 to a switch 9627, a fastener 9629, and an operation switch 9628. A flexible panel is used for the display portion 9631, whereby a tablet terminal with a larger display portion can be provided. FIG. 31A illustrates the tablet terminal 9600 that is opened, and FIG. 31B illustrates the tablet terminal 9600 that is closed.

The tablet terminal 9600 includes a power storage unit 9635 inside the housing 9630*a* and the housing 9630*b*. The power storage unit 9635 is provided across the housing 9630*a* and the housing 9630*b*, passing through the movable portion 9640.

Part of or the entire display portion 9631 can be a touch panel region, and data can be input by touching text, an input form, an image including an icon, and the like displayed on the region. For example, it is possible that keyboard buttons are displayed on the entire display portion 9631*a* on the housing 9630*a* side, and data such as text or an image is displayed on the display portion 9631*b* on the housing 9630*b* side.

In addition, it is possible that a keyboard is displayed on the display portion 9631*b* on the housing 9630*b* side, and data such as text or an image is displayed on the display portion 9631*a* on the housing 9630*a* side. Furthermore, it is possible that a switching button for showing/hiding a keyboard on a touch panel is displayed on the display portion 9631 and the button is touched with a finger, a stylus, or the like to display keyboard buttons on the display portion 9631.

In addition, touch input can be performed concurrently in a touch panel region in the display portion 9631*a* on the housing 9630*a* side and a touch panel region in the display portion 9631*b* on the housing 9630*b* side.

The switch 9625 to the switch 9627 may function not only as an interface for operating the tablet terminal 9600 but also as an interface that can switch various functions. For example, at least one of the switch 9625 to the switch 9627 may have a function of switching on/off of the tablet terminal 9600. For another example, at least one of the switch 9625 to the switch 9627 may have a function of switching display between a portrait mode and a landscape mode and a function of switching display between monochrome display and color display. For another example, at least one of the switch 9625 to the switch 9627 may have a function of adjusting the luminance of the display portion 9631. The luminance of the display portion 9631 can be controlled in accordance with the amount of external light in use of the tablet terminal 9600 detected by an optical sensor incorporated in the tablet terminal 9600. Note that another sensing device including a sensor for measuring inclination, such as a gyroscope sensor or an acceleration sensor, may be incorporated in the tablet terminal, in addition to the optical sensor.

FIG. 31A shows an example in which the display portion 9631*a* on the housing 9630*a* side and the display portion 9631*b* on the housing 9630*b* side have substantially the same display area; however, there is no particular limitation on the display areas of the display portion 9631*a* and the display portion 9631*b*, and the display portions may have different areas or different display quality. For example, one of the display panels may display higher definition images than the other.

The tablet terminal 9600 is folded in half in FIG. 31B. The tablet terminal 9600 includes a housing 9630, a solar cell 9633, and a charge and discharge control circuit 9634 including a DCDC converter 9636. The power storage unit of one embodiment of the present invention is used as the power storage unit 9635.

Note that as described above, the tablet terminal 9600 can be folded in half, and thus can be folded when not in use such that the housing 9630*a* and the housing 9630*b* overlap with each other. Thus, the display portion 9631 can be protected owing to the folding, which increases the durability of the tablet terminal 9600. With the power storage unit 9635 including the secondary battery of one embodiment of the present invention, which has high capacity and excellent cycle performance, the tablet terminal 9600 that can be used for a long time over a long period can be provided.

The tablet terminal 9600 illustrated in FIG. 31A and FIG. 31B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal 9600, supplies electric power to a touch panel, a display portion, a video signal processing portion, and the like. Note that the solar cell 9633 can be provided on one surface or both surfaces of the housing 9630 and the power storage unit 9635 can be charged efficiently. The use of a lithium-ion battery as the power storage unit 9635 brings an advantage such as a reduction in size.

Figure 31C:
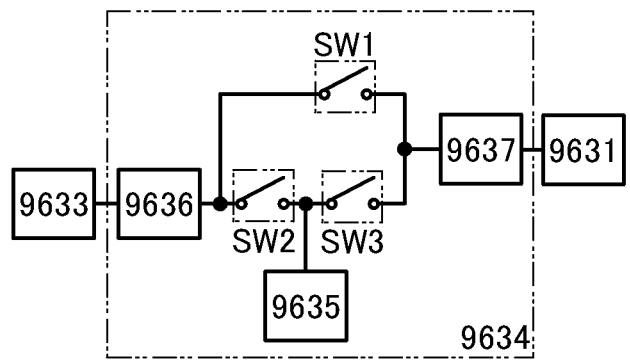

The structure and operation of the charge and discharge control circuit 9634 illustrated in FIG. 31B are described with reference to a block diagram in FIG. 31C. The solar cell 9633, the power storage unit 9635, the DCDC converter 9636, a converter 9637, switches SW1 to SW3, and the display portion 9631 are illustrated in FIG. 31C, and the power storage unit 9635, the DCDC converter 9636, the converter 9637, and the switches SW1 to SW3 correspond to the charge and discharge control circuit 9634 illustrated in FIG. 31B.

First, an operation example in which electric power is generated by the solar cell 9633 using external light is described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage is raised or lowered by the converter 9637 to a voltage needed for the display portion 9631. When display on the display portion 9631 is not performed, the switch SW1 is turned off and the switch SW2 is turned on, so that the power storage unit 9635 is charged.

Note that the solar cell 9633 is described as an example of a power generation unit; however, one embodiment of the present invention is not limited to this example. The power storage unit 9635 may be charged using another power generation unit such as a piezoelectric element or a thermoelectric conversion element (Peltier element). For example, the charge may be performed with a non-contact power transmission module that performs charge by transmitting and receiving power wirelessly (without contact), or with a combination of other charge units.

Figure 32:
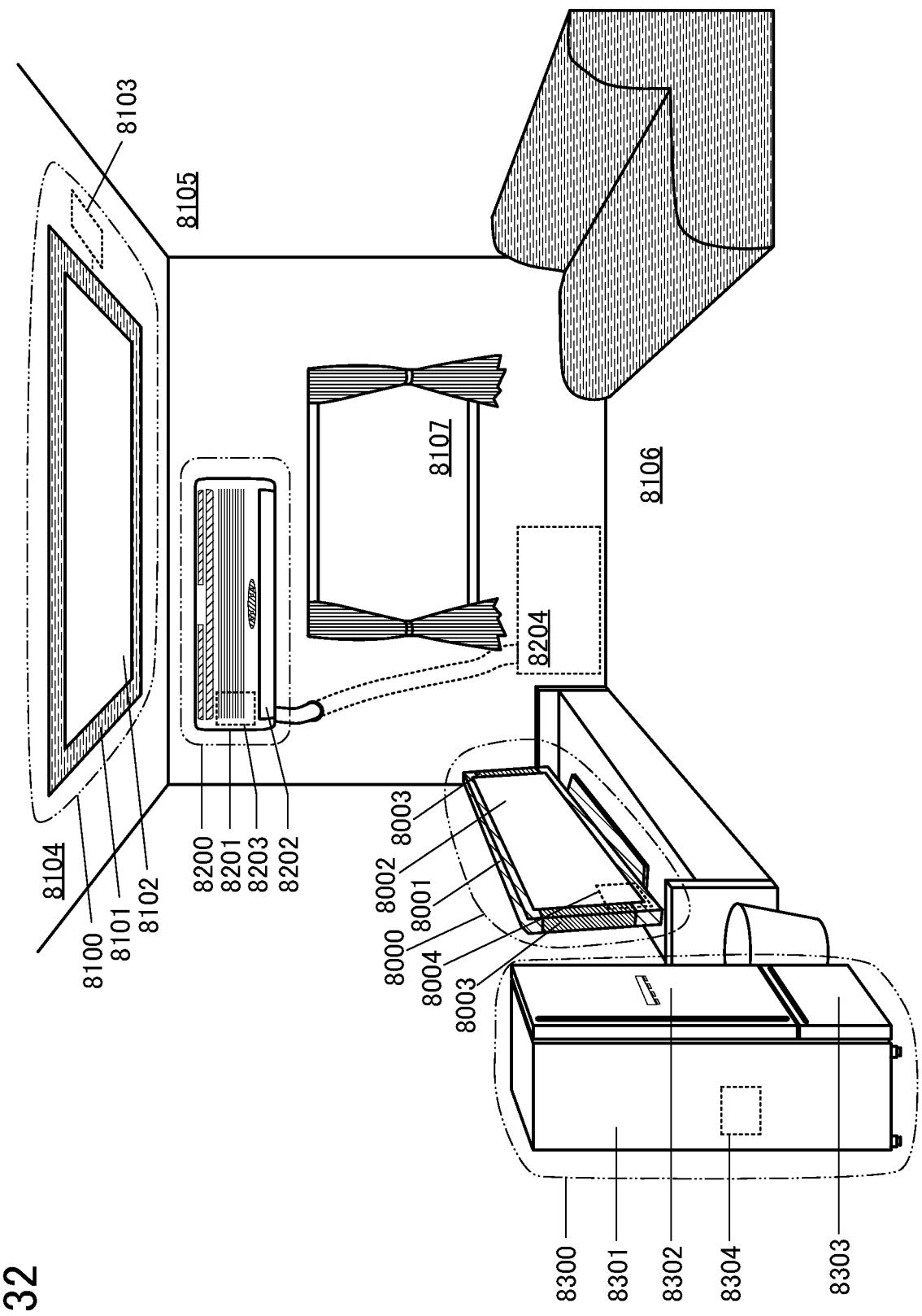
FIG. 32 is a diagram illustrating examples of electronic devices.

FIG. 32 illustrates other examples of electronic devices. In FIG. 32, a display device 8000 is an example of an electronic device including a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply and can use electric power stored in the secondary battery 8004. Thus, the display device 8000 can be operated with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a DMD (Digital Micromirror Device), a PDP (Plasma Display Panel), or an FED (Field Emission Display) can be used for the display portion 8002.

Note that the display device includes, in its category, all of information display devices for personal computers, advertisement displays, and the like besides TV broadcast reception.

In FIG. 32, an installation lighting device 8100 is an example of an electronic device including a secondary battery 8103 of one embodiment of the present invention. Specifically, the lighting device 8100 includes a housing 8101, a light source 8102, the secondary battery 8103, and the like. Although FIG. 32 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply and can use electric power stored in the secondary battery 8103. Thus, the lighting device 8100 can be operated with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 32 as an example, the secondary battery of one embodiment of the present invention can be used in an installation lighting device provided in, for example, a side wall 8105, a floor 8106, or a window 8107 other than the ceiling 8104, and can be used in a tabletop lighting device or the like.

As the light source 8102, an artificial light source that emits light artificially by using electric power can be used. Specifically, an incandescent lamp, a discharge lamp such as a fluorescent lamp, and light-emitting elements such as an LED and an organic EL element are given as examples of the artificial light source.

In FIG. 32, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 32 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply and can use electric power stored in the secondary battery 8203. Particularly in the case where the secondary batteries 8203 are provided in both the indoor unit 8200 and the outdoor unit 8204, the air conditioner can be operated with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 32 as an example, the secondary battery of one embodiment of the present invention can be used in an air conditioner in which the function of an indoor unit and the function of an outdoor unit are integrated in one housing.

In FIG. 32, an electric refrigerator-freezer 8300 is an example of an electronic device including a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided in the housing 8301 in FIG. 32. The electric refrigerator-freezer 8300 can receive electric power from a commercial power supply and can use electric power stored in the secondary battery 8304. Thus, the electric refrigerator-freezer 8300 can be operated with the use of the secondary battery 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the secondary battery of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion is referred to as a usage rate of electric power) is low, electric power is stored in the secondary battery, whereby the usage rate of electric power can be reduced in a time period other than the above time period. For example, in the case of the electric refrigerator-freezer 8300, electric power is stored in the secondary battery 8304 in night time when the temperature is low and the refrigerator door 8302 and the freezer door 8303 are not opened or closed. On the other hand, in daytime when the temperature is high and the refrigerator door 8302 and the freezer door 8303 are opened and closed, the secondary battery 8304 is used as an auxiliary power supply; thus, the usage rate of electric power in daytime can be reduced.

According to one embodiment of the present invention, the secondary battery can have excellent cycle performance and improved reliability. Furthermore, according to one embodiment of the present invention, a secondary battery with high capacity can be obtained; thus, the secondary battery itself can be made more compact and lightweight as a result of improved characteristics of the secondary battery. Thus, the secondary battery of one embodiment of the present invention is used in the electronic device described in this embodiment, whereby a more lightweight electronic device with a longer lifetime can be obtained.

This embodiment can be implemented in appropriate combination with the other embodiments.

Embodiment 7

In this embodiment, examples of electronic devices each including the secondary battery described in the above embodiment will be described with reference to FIG. 33 and FIG. 34.

Figure 33A:
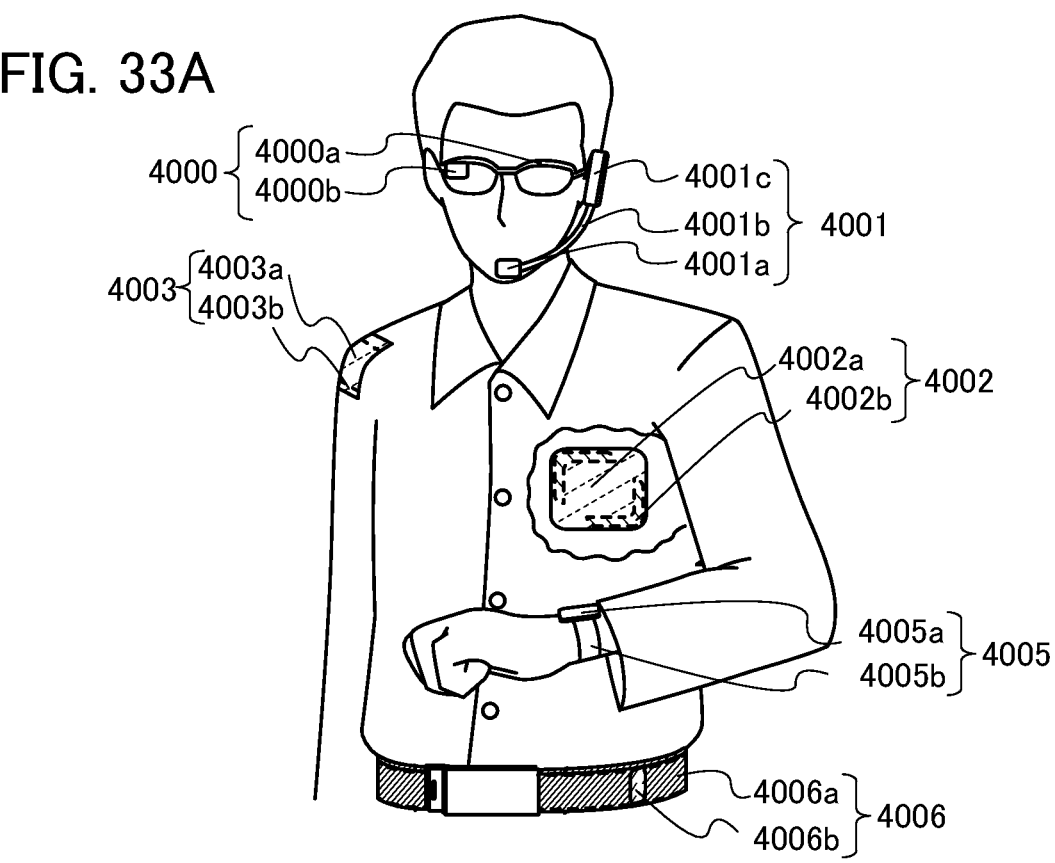
FIG. 33A to FIG. 33C are diagrams illustrating examples of electronic devices.

FIG. 33A illustrates examples of wearable devices. A secondary battery is used as a power source of a wearable device. To have improved splash resistance, water resistance, or dust resistance in daily use or outdoor use by a user, a wearable device is desirably capable of being charged with and without a wire whose connector portion for connection is exposed.

For example, the secondary battery of one embodiment of the present invention can be provided in a glasses-type device 4000 illustrated in FIG. 33A. The glasses-type device 4000 includes a frame 4000a and a display part 4000b. The secondary battery is provided in a temple of the frame 4000a having a curved shape, whereby the glasses-type device 4000 can be lightweight, can have a well-balanced weight, and can be used continuously for along time. With the use of the secondary battery of one embodiment of the present invention, space saving required with a reduction in the size of a housing can be achieved.

The secondary battery of one embodiment of the present invention can be provided in a headset-type device 4001. The headset-type device 4001 includes at least a microphone part 4001a, a flexible pipe 4001b, and an earphone portion 4001c. The secondary battery can be provided in the flexible pipe 4001b and the earphone portion 4001c. With the use of the secondary battery of one embodiment of the present invention, space saving required with a reduction in the size of a housing can be achieved.

The secondary battery of one embodiment of the present invention can be provided in a device 4002 that can be attached directly to a body. A secondary battery 4002b can be provided in a thin housing 4002a of the device 4002. With the use of the secondary battery of one embodiment of the present invention, space saving required with a reduction in the size of a housing can be achieved.

The secondary battery of one embodiment of the present invention can be provided in a device 4003 that can be attached to clothes. A secondary battery 4003b can be provided in a thin housing 4003a of the device 4003. With the use of the secondary battery of one embodiment of the present invention, space saving required with a reduction in the size of a housing can be achieved.

The secondary battery of one embodiment of the present invention can be provided in a belt-type device 4006. The belt-type device 4006 includes a belt portion 4006a and a wireless power feeding and receiving portion 4006b, and the secondary battery can be provided inside the belt portion 4006a. With the use of the secondary battery of one embodiment of the present invention, space saving required with a reduction in the size of a housing can be achieved.

The secondary battery of one embodiment of the present invention can be provided in a watch-type device 4005. The watch-type device 4005 includes a display portion 4005a and a belt portion 4005b, and the secondary battery can be provided in the display portion 4005a or the belt portion 4005b. With the use of the secondary battery of one embodiment of the present invention, space saving required with a reduction in the size of a housing can be achieved.

The display portion 4005a can display various kinds of information such as time and reception information of an e-mail or an incoming call.

In addition, the watch-type device 4005 is a wearable device that is wound around an arm directly; thus, a sensor that measures the pulse, the blood pressure, or the like of the user may be incorporated therein. Data on the exercise quantity and health of the user can be stored to be used for health maintenance.

Figure 33B:
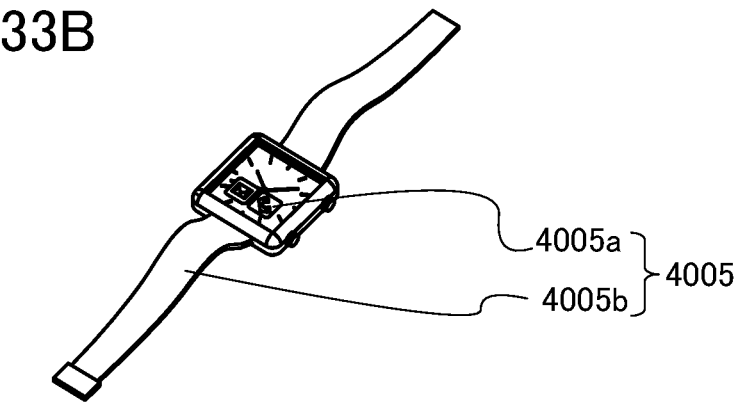

FIG. 33B is a perspective view of the watch-type device 4005 that is detached from an arm.

Figure 33C:
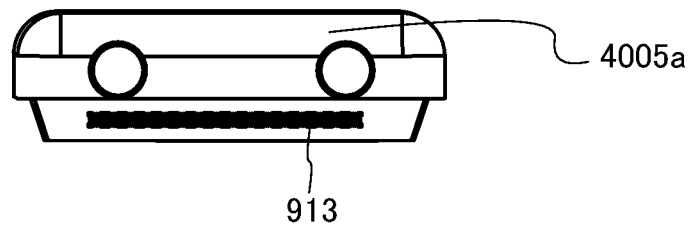

FIG. 33C is a side view. FIG. 33C illustrates a state where the secondary battery 913 is incorporated in the watch-type device 4005. The secondary battery 913 is the secondary battery described in Embodiment 5. The secondary battery 913, which is small and lightweight, overlaps with the display portion 4005a.

Figure 34A:
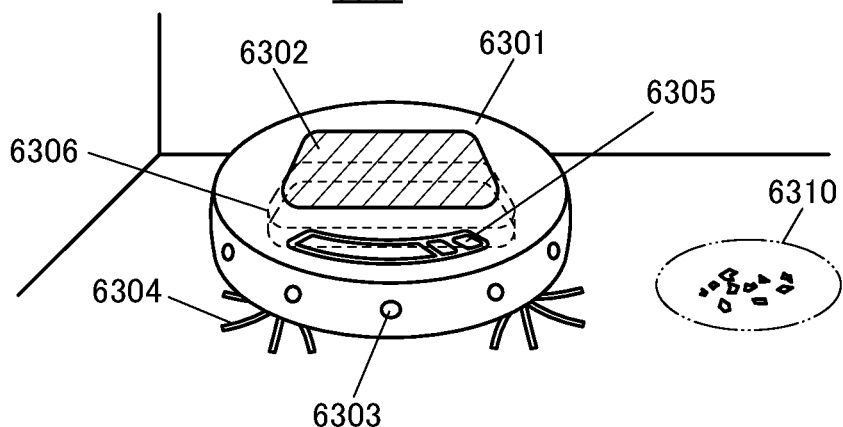
FIG. 34A to FIG. 34C are diagrams illustrating examples of electronic devices.

FIG. 34A illustrates an example of a cleaning robot. A cleaning robot 6300 includes a display portion 6302 placed on the top surface of a housing 6301, a plurality of cameras 6303 placed on the side surface of the housing 6301, a brush 6304, operation buttons 6305, a secondary battery 6306, a variety of sensors, and the like. Although not illustrated, the cleaning robot 6300 is provided with a tire, an inlet, and the like. The cleaning robot 6300 is self-propelled, detects dust 6310, and sucks up the dust through the inlet provided on the bottom surface.

For example, the cleaning robot 6300 can determine whether there is an obstacle such as a wall, furniture, or a step by analyzing images taken by the cameras 6303. In the case where the cleaning robot 6300 detects an object that is likely to be caught in the brush 6304 (e.g., a wire) by image analysis, the rotation of the brush 6304 can be stopped. The cleaning robot 6300 further includes a secondary battery 6306 of one embodiment of the present invention and a semiconductor device or an electronic component. The cleaning robot 6300 including the secondary battery 6306 of one embodiment of the present invention can be a highly reliable electronic device that can operate for a long time.

Figure 34B:
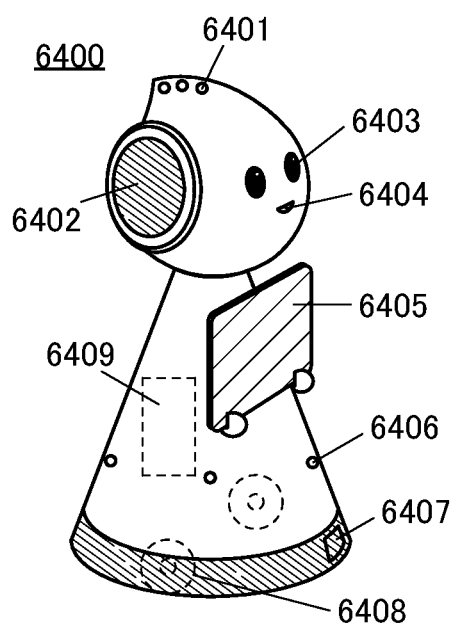

FIG. 34B illustrates an example of a robot. A robot 6400 illustrated in FIG. 34B includes a secondary battery 6409, an illuminance sensor 6401, a microphone 6402, an upper camera 6403, a speaker 6404, a display portion 6405, a lower camera 6406, an obstacle sensor 6407, a moving mechanism 6408, an arithmetic device, and the like.

The microphone 6402 has a function of detecting a speaking voice of a user, an environmental sound, and the like. The speaker 6404 has a function of outputting sound. The robot 6400 can communicate with a user using the microphone 6402 and the speaker 6404.

The display portion 6405 has a function of displaying various kinds of information. The robot 6400 can display information desired by a user on the display portion 6405. The display portion 6405 may be provided with a touch panel. Moreover, the display portion 6405 may be a detachable information terminal, in which case charging and data communication can be performed when the display portion 6405 is set at the home position of the robot 6400.

The upper camera 6403 and the lower camera 6406 each have a function of taking an image of the surroundings of the robot 6400. The obstacle sensor 6407 can detect an obstacle in the direction where the robot 6400 advances with the moving mechanism 6408. The robot 6400 can move safely by recognizing the surroundings with the upper camera 6403, the lower camera 6406, and the obstacle sensor 6407.

The robot 6400 further includes the secondary battery 6409 of one embodiment of the present invention and a semiconductor device or an electronic component. The robot 6400 including the secondary battery of one embodiment of the present invention can be a highly reliable electronic device that can operate for a long time.

Figure 34C:
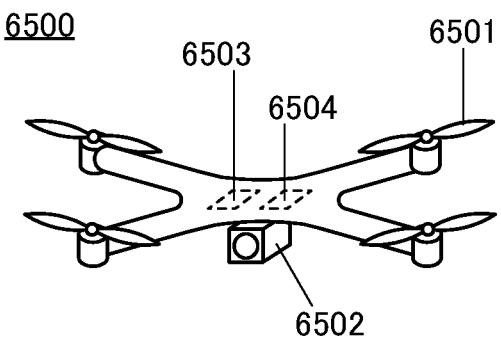

FIG. 34C illustrates an example of a flying object. A flying object 6500 illustrated in FIG. 34C includes propellers 6501, a camera 6502, a secondary battery 6503, and the like and has a function of flying autonomously.

For example, image data taken by the camera 6502 is stored in an electronic component 6504. The electronic component 6504 can analyze the image data to detect whether there is an obstacle in the way of the movement. Moreover, the electronic component 6504 can estimate the remaining battery level from a change in the power storage capacity of the secondary battery 6503. The flying object 6500 further includes the secondary battery 6503 of one embodiment of the present invention. The flying object 6500 including the secondary battery of one embodiment of the present invention can be a highly reliable electronic device that can operate for a long time.

This embodiment can be implemented in appropriate combination with the other embodiments.

Embodiment 8

In this embodiment, examples of vehicles each including the secondary battery of one embodiment of the present invention will be described.

The use of secondary batteries in vehicles enables production of next-generation clean energy vehicles such as hybrid electric vehicles (HEVs), electric vehicles (EVs), and plug-in hybrid electric vehicles (PHEVs).

Figure 35A:
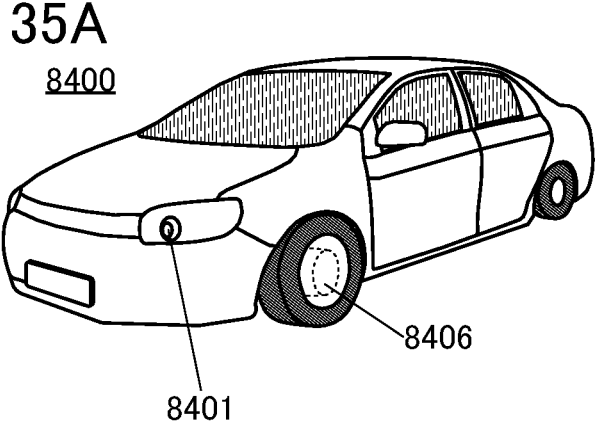
FIG. 35A to FIG. 35C are diagrams illustrating examples of vehicles.

FIG. 35 shows examples of a vehicle including the secondary battery of one embodiment of the present invention. An automobile 8400 shown in FIG. 35A is an electric vehicle that runs on the power of an electric motor. Alternatively, the automobile 8400 is a hybrid electric vehicle capable of running on the power of either an electric motor or an engine as appropriate. The use of one embodiment of the present invention achieves a high-mileage vehicle. The automobile 8400 includes the secondary battery. As the secondary battery, the modules of the secondary batteries shown in FIG. 20C and FIG. 20D may be arranged to be used in a floor portion in the automobile. Alternatively, a battery pack in which a plurality of secondary batteries shown in FIG. 23 are combined may be placed in the floor portion in the automobile. The secondary battery is used not only for driving an electric motor 8406, but also for supplying electric power to a light-emitting device such as a headlight 8401 or a room light (not shown).

The secondary battery can also supply electric power to a display device included in the automobile 8400, such as a speedometer or a tachometer. Furthermore, the secondary battery can supply electric power to a semiconductor device included in the automobile 8400, such as a navigation system.

Figure 35B:
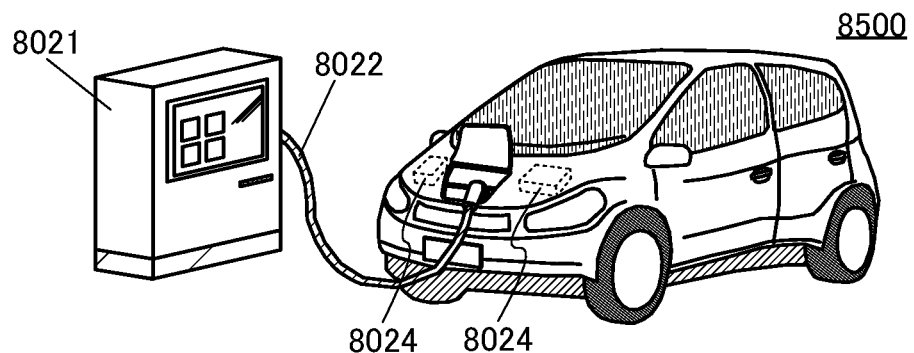

An automobile 8500 shown in FIG. 35B can be charged when the secondary battery included in the automobile 8500 is supplied with electric power through external charge equipment by a plug-in system, a contactless power feeding system, or the like. FIG. 35B shows a state where a secondary battery 8024 included in the automobile 8500 is charged with the use of a ground-based charging apparatus 8021 through a cable 8022. Charging can be performed as appropriate by a given method such as CHAdeMO (registered trademark) or Combined Charging System as a charging method, the standard of a connector, or the like. The charging apparatus 8021 may be a charge station provided in a commerce facility or a power source in a house. For example, with the use of a plug-in technique, the secondary battery 8024 included in the automobile 8500 can be charged by being supplied with electric power from outside. The charging can be performed by converting AC electric power into DC electric power through a converter such as an ACDC converter.

Although not shown, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the vehicle is stopped but also when driven. In addition, the contactless power feeding system may be utilized to perform transmission and reception of electric power between vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

Figure 35C:
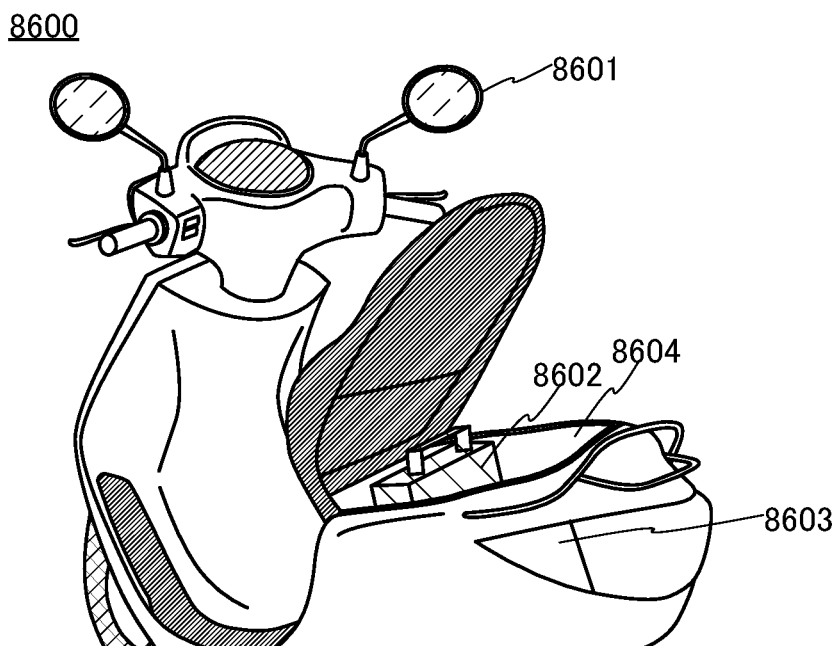

FIG. 35C shows an example of a motorcycle including the secondary battery of one embodiment of the present invention. A motor scooter 8600 shown in FIG. 35C includes a secondary battery 8602, side mirrors 8601, and direction indicators 8603. The secondary battery 8602 can supply electric power to the direction indicators 8603.

In the motor scooter 8600 shown in FIG. 35C, the secondary battery 8602 can be held in a storage unit under seat 8604. The secondary battery 8602 can be held in the storage unit under seat 8604 even when the storage unit under seat 8604 is small. The secondary battery 8602 is detachable; thus, the secondary battery 8602 is carried indoors when charged, and is stored before the motor scooter is driven.

According to one embodiment of the present invention, the secondary battery can have improved cycle performance and the capacity of the secondary battery can be increased. Thus, the secondary battery itself can be made more compact and lightweight. The compact and lightweight secondary battery contributes to a reduction in the weight of a vehicle, and thus increases the mileage. Furthermore, the secondary battery included in the vehicle can be used as a power source for supplying electric power to products other than the vehicle. In such a case, the use of a commercial power supply can be avoided at peak time of electric power demand, for example. Avoiding the use of a commercial power supply at peak time of electric power demand can contribute to energy saving and a reduction in carbon dioxide emissions. Moreover, the secondary battery with excellent cycle performance can be used over a long period; thus, the use amount of rare metals typified by cobalt can be reduced.

This embodiment can be implemented in appropriate combination with the other embodiments.

Example 1

In this example, positive electrode active materials were formed by the formation method shown in FIG. 4 and their characteristics were analyzed and evaluated.

<Formation of Positive Electrode Active Material>

Samples formed in this example will be described with reference to the formation method shown in FIG. 4.

As $LiMO_2$ in Step S14, with the use of cobalt as the transition metal M, a commercially available lithium cobalt oxide (Cellseed C-10N produced by NIPPON CHEMICAL INDUSTRIAL CO., LTD.) not containing any additive was prepared. Into this, lithium fluoride, magnesium fluoride, nickel hydroxide, and aluminum hydroxide were added by a solid phase method and mixed as in Step S21 to Step S23, Step S31, Step S32, and Step S41. The addition was performed such that the molecular weight of lithium fluoride was 0.33, the molecular weight of magnesium fluoride was 1, the atomic weight of nickel was 0.5, and the atomic weight of aluminum was 0.5 with the number of cobalt atoms regarded as 100. This is called the mixture 903.

Next, annealing was performed as in Step S53. Into a rectangular alumina container was put 20 g or more and 60 g or less of the mixture 903, the container was covered with a lid, and heating was performed in a muffle furnace, whereby a composite oxide was obtained. The annealing temperature was set to 900° C., 920° C., 930° C., or 950° C. The annealing time was set to 10 hours or 30 hours.

Next, as adhesion preventing operation in Step S54, adhesion between particles of the composite oxide was broken by hitting the composite oxide with a pestle. Then, microparticulated lithium fluoride was added to some of the samples. Mixing was performed such that the molecular weight of lithium fluoride was 0.33 when the number of cobalt atoms was regarded as 100.

Next, annealing was performed as in Step S55. The annealing temperature was the same as that in Step S53.

Then, Step S54 and Step S55 were repeated n times. Note that n is 0, 1, 2, 3, or 4.

In this manner, the positive electrode active materials of Sample 1 to Sample 21 were formed. Table 1 shows the formation conditions. The number of annealing times in Table 1 shows the total number of annealing times (n+1).

TABLE 1

| Sample name | Addition of LiF | Annealing temperature | Annealing time | Number of annealing times |
|---|---|---|---|---|
| Sample 1 (comparative example) | ○ | 900° C. | 10 h | 1 |
| Sample 2 (comparative example) | — | 900° C. | 10 h | 1 |
| Sample 3 | ○ | 900° C. | 10 h | 2 |
| Sample 4 | — | 900° C. | 10 h | 2 |
| Sample 5 | ○ | 900° C. | 10 h | 3 |
| Sample 6 | — | 900° C. | 10 h | 3 |
| Sample 7 | ○ | 900° C. | 10 h | 4 |
| Sample 8 | — | 900° C. | 10 h | 4 |
| Sample 9 | ○ | 900° C. | 10 h | 5 |
| Sample 10 | — | 900° C. | 10 h | 5 |
| Sample 11 (comparative example) | — | 900° C. | 30 h | 1 |
| Sample 12 (comparative example) | — | 920° C. | 10 h | 1 |
| Sample 13 | — | 920° C. | 10 h | 2 |
| Sample 14 | — | 920° C. | 10 h | 3 |
| Sample 15 | — | 920° C. | 10 h | 4 |
| Sample 16 (comparative example) | — | 930° C. | 10 h | 1 |
| Sample 17 | — | 930° C. | 10 h | 2 |
| Sample 18 | — | 930° C. | 10 h | 3 |
| Sample 19 (comparative example) | — | 950° C. | 10 h | 1 |
| Sample 20 | — | 950° C. | 10 h | 2 |
| Sample 21 | — | 950° C. | 10 h | 3 |

<Surface SEM Image>

Figure 36A:
FIG. 36A to FIG. 36C are SEM images of positive electrode active materials formed in Example 1.
Figure 36B:
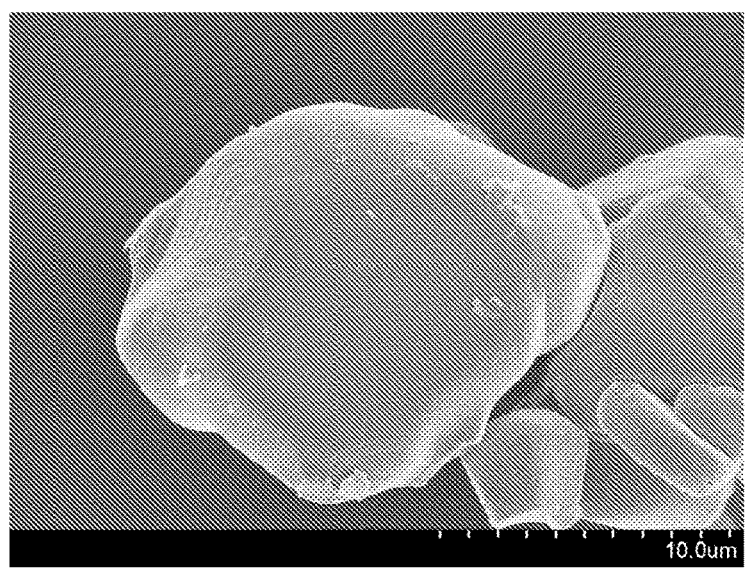
Figure 36C:
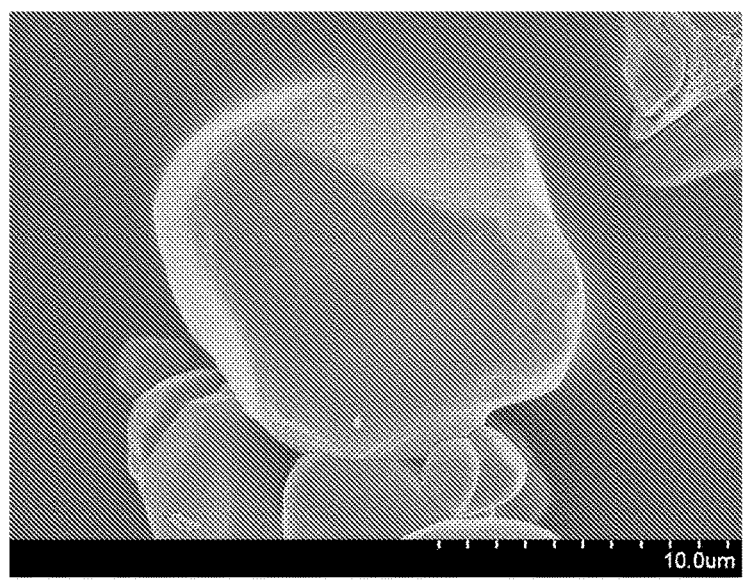

FIG. 36A, FIG. 36B, and FIG. 36C show surface SEM images of Sample 2, Sample 4, and Sample 6, respectively.

As shown in FIG. 36A, a large number of depressed and projecting portions were observed on a surface of Sample 2 on which annealing was performed only once at 900° C. for 10 hours. The number of depressed and projecting portions was reduced in Sample 4 on which annealing was performed twice. A smooth surface with a smaller number of depressed and projecting portions was observed in Sample 6 on which annealing was performed three times.

<Formation of Secondary Battery>

Secondary batteries were formed using the positive electrode active materials of Sample 1 to Sample 21. First, each of the positive electrode active materials of Sample 1 to Sample 21, AB, and PVDF were mixed at a weight ratio of 95:3:2 to form a slurry, and the slurries were applied to aluminum current collectors. As a solvent of the slurry, NMP was used.

After the current collector was coated with the slurry, the solvent was volatilized. Then, pressure was applied at 210 kN/m, and then pressure was applied at 1467 kN/m. Through the above process, the positive electrode was obtained. The carried amount of the positive electrode was approximately 7 mg/cm². The density was 3.8 g/cc or higher.

Using the obtained positive electrodes, CR2032 type coin battery cells (a diameter of 20 mm, a height of 3.2 mm) were formed.

A lithium metal was used for a counter electrode.

As an electrolyte included in an electrolytic solution, 1 mol/L lithium hexafluorophosphate ($LiPF_6$) was used. As the electrolytic solution, a solution in which ethylene carbonate (EC) and diethyl carbonate (DEC) were mixed at a volume ratio of EC:DEC=3:7 and vinylene carbonate (VC) was added at 2 wt % was used.

As a separator, 25-μm-thick polypropylene was used.

A positive electrode can and a negative electrode can formed of stainless steel (SUS) were used.

<Cycle Performance>

Figure 37A:
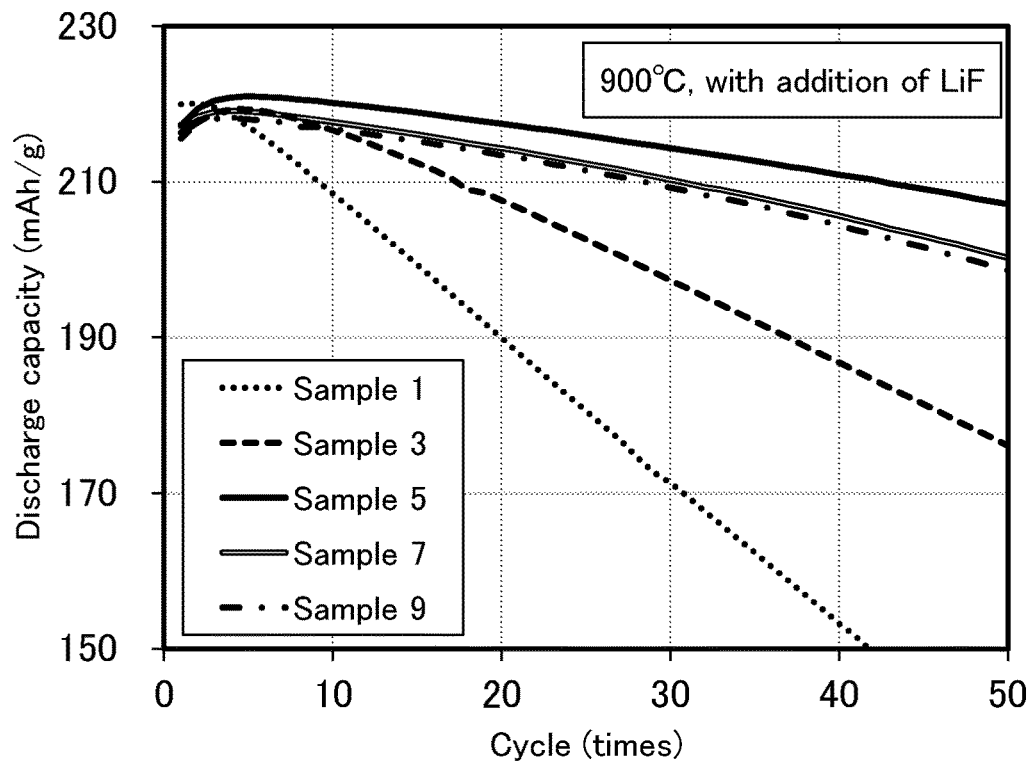
FIG. 37A and FIG. 37B are graphs showing cycle performances of positive electrode active materials formed in Example 1.
Figure 37B:
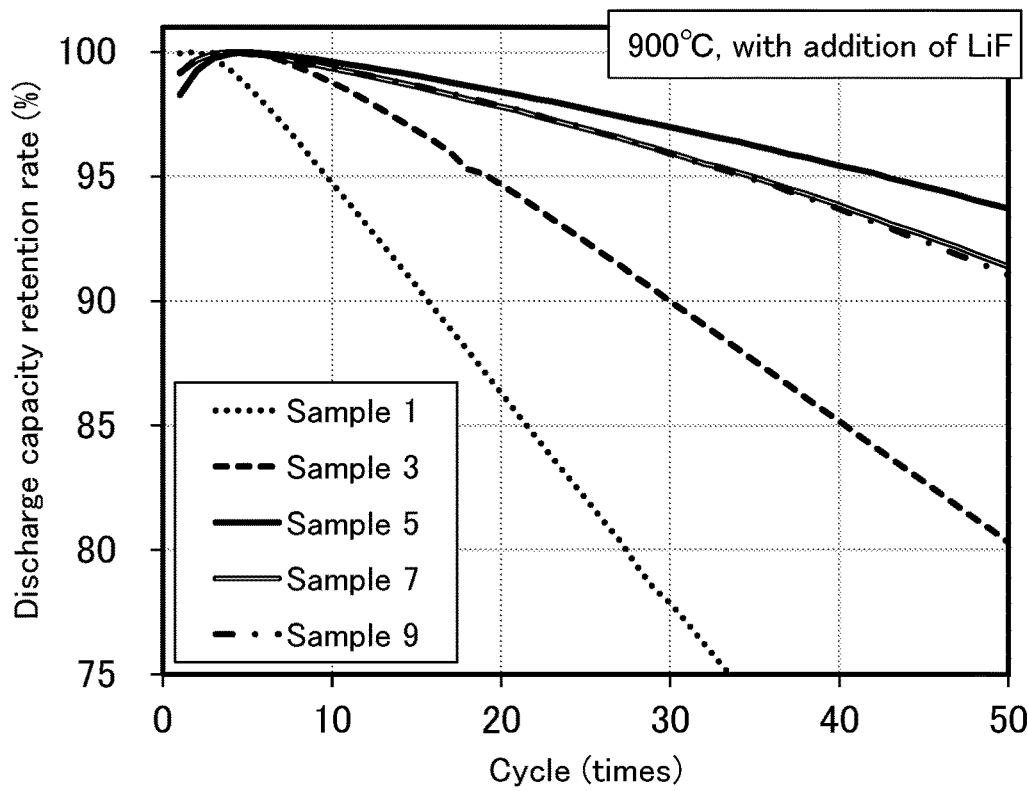
Figure 38A:
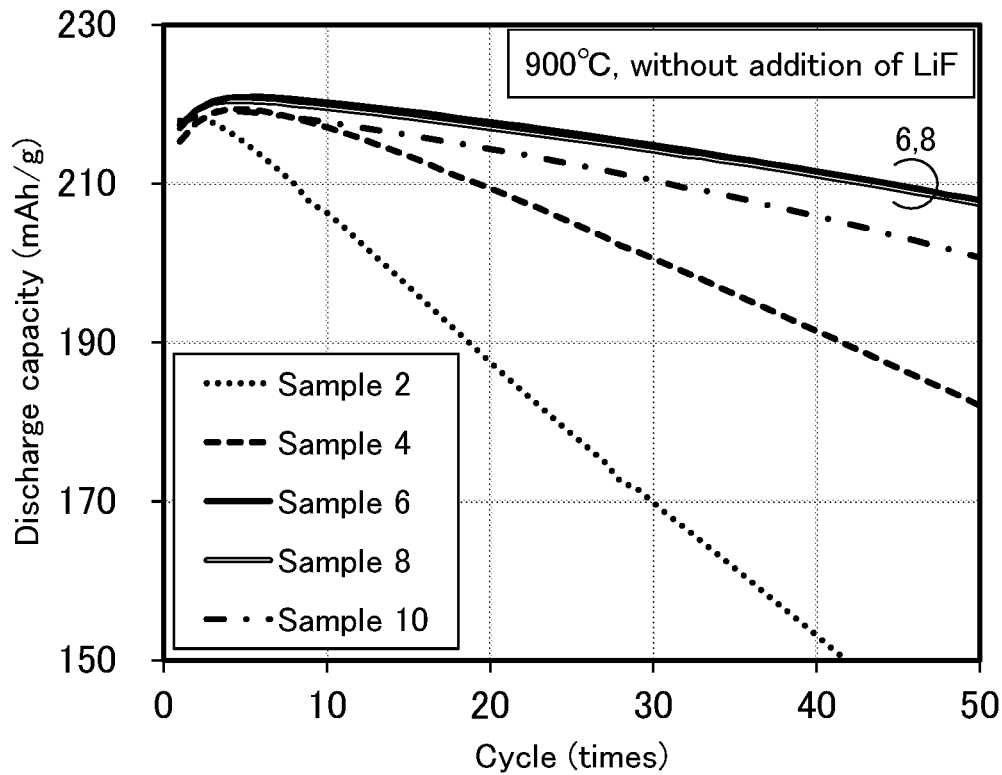
FIG. 38A and FIG. 38B are graphs showing cycle performances of positive electrode active materials formed in Example 1.
Figure 38B:
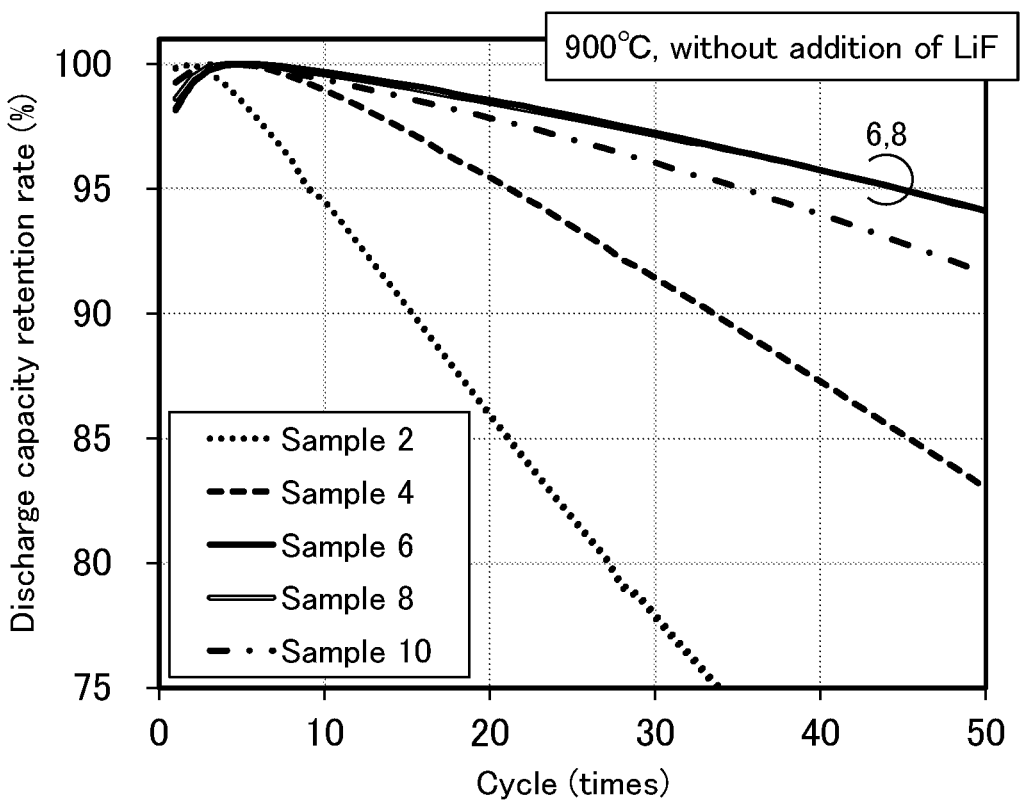

FIG. 37A and FIG. 37B show charge and discharge cycle performances of secondary batteries of Sample 1, Sample 3, Sample 5, Sample 7, and Sample 9 to which lithium fluoride is added at the same time as the adhesion preventing operation, at an annealing temperature of 900° C. FIG. 37A shows discharge capacity and FIG. 37B shows discharge capacity retention rate. FIG. 38A and FIG. 38B show charge and discharge cycle performances of secondary batteries of Sample 2, Sample 4, Sample 6, Sample 8, and Sample 10 to which lithium fluoride was not added. FIG. 38A shows discharge capacity and FIG. 38B shows discharge capacity retention rate. The measurement was performed at 45° C. CC/CV charging (1 C, 4.6 V, 0.1 C cut) and CC discharging (1 C, 2.5 V cut) were performed, and a 10-minute break was taken before the next charging. Note that 1 C was set to 200 mA/g in this example and the like.

As shown in FIG. 37A to FIG. 38B, one-time annealing as in Sample 1 and Sample 2 was not sufficient and thus favorable charge and discharge cycle performances were not obtained. The charge and discharge cycle performances of Sample 3 and Sample 4 in which the number of annealing times was two was slightly improved. Sample 5 to Sample 10 in which the number of annealing times was three to five exhibited favorable charge and discharge cycle performances. In particular, Sample 5 and Sample 6 in which the number of annealing times was three had the most favorable performances. Note that the lines of Sample 6 and Sample 8 overlap with each other in FIG. 38A and FIG. 38B.

Although the addition of lithium fluoride did not make a large difference in performance, the samples without the addition tended to have slightly better performances.

Figure 39A:
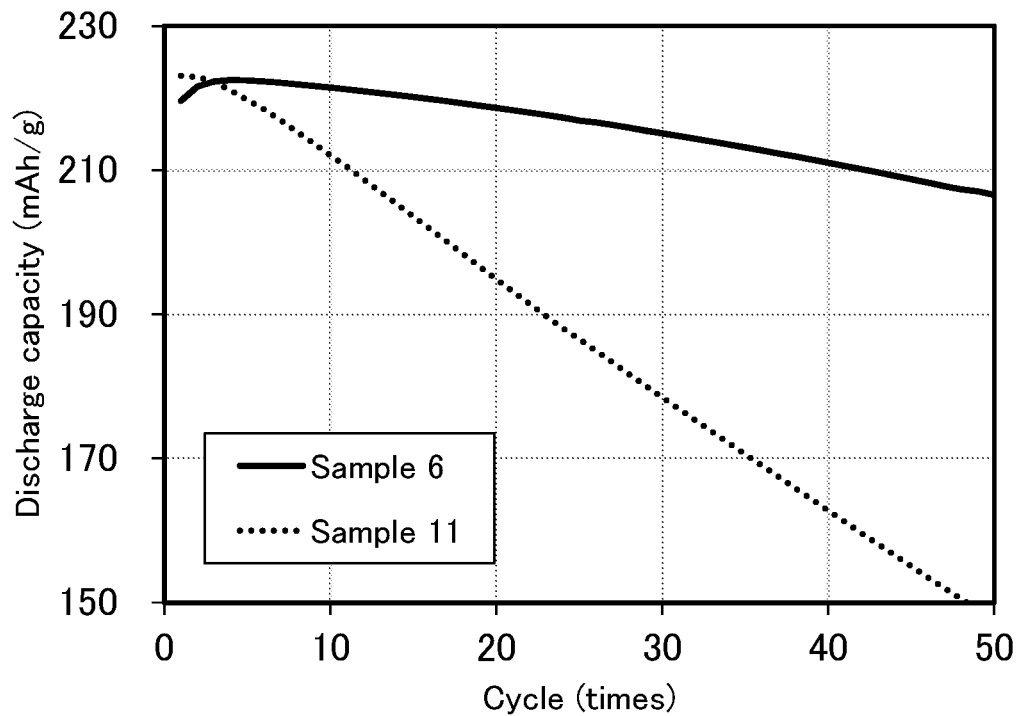
FIG. 39A and FIG. 39B are graphs showing cycle performances of positive electrode active materials formed in Example 1.
Figure 39B:
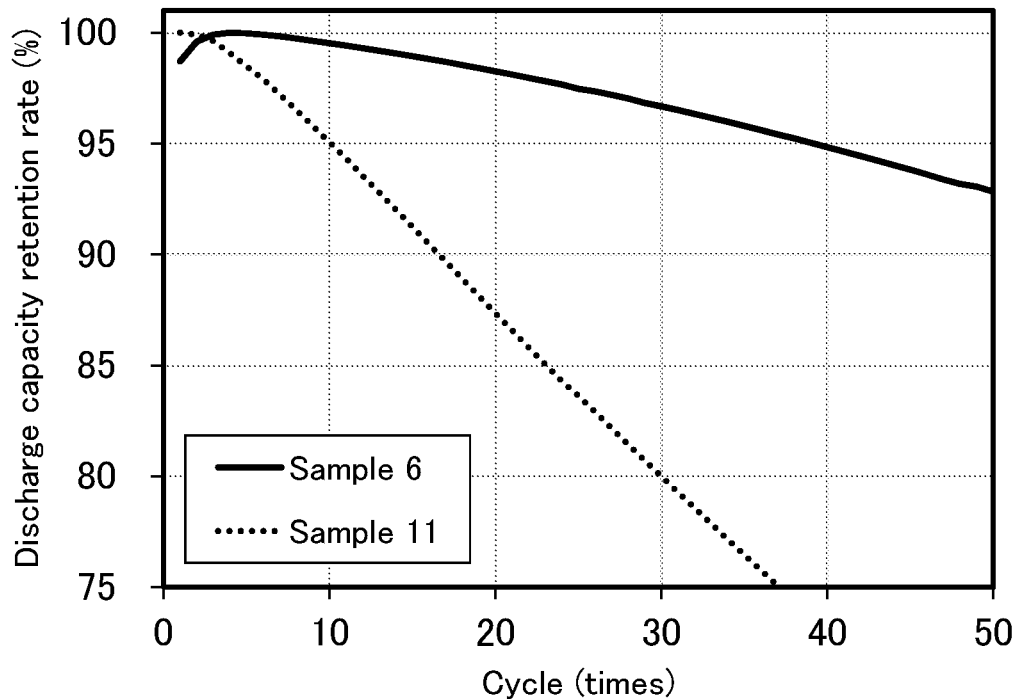

FIG. 39A and FIG. 39B show charge and discharge cycle performances of a secondary battery of Sample 6 in which 10-hour annealing at 900° C. and adhesion preventing operation were repeated three times and a secondary battery of Sample 11 in which 30-hour annealing at 900° C. was performed once. FIG. 39A shows discharge capacity and FIG. 39B shows discharge capacity retention rate. The measurement was performed at 45° C. The charge and discharge conditions were the same as those of the samples in FIG. 37 and FIG. 38 except that the charge and discharge were performed at 0.5 C.

Although the cumulative total of annealing time was the same between Sample 6 and Sample 11 as shown in FIG. 39A and FIG. 39B, Sample 6 exhibited much better charge and discharge cycle performance. This is probably because the multiple repetition of annealing and adhesion preventing operation led to favorable distribution of an additive at the surface portion of the positive electrode active material.

Figure 40A:
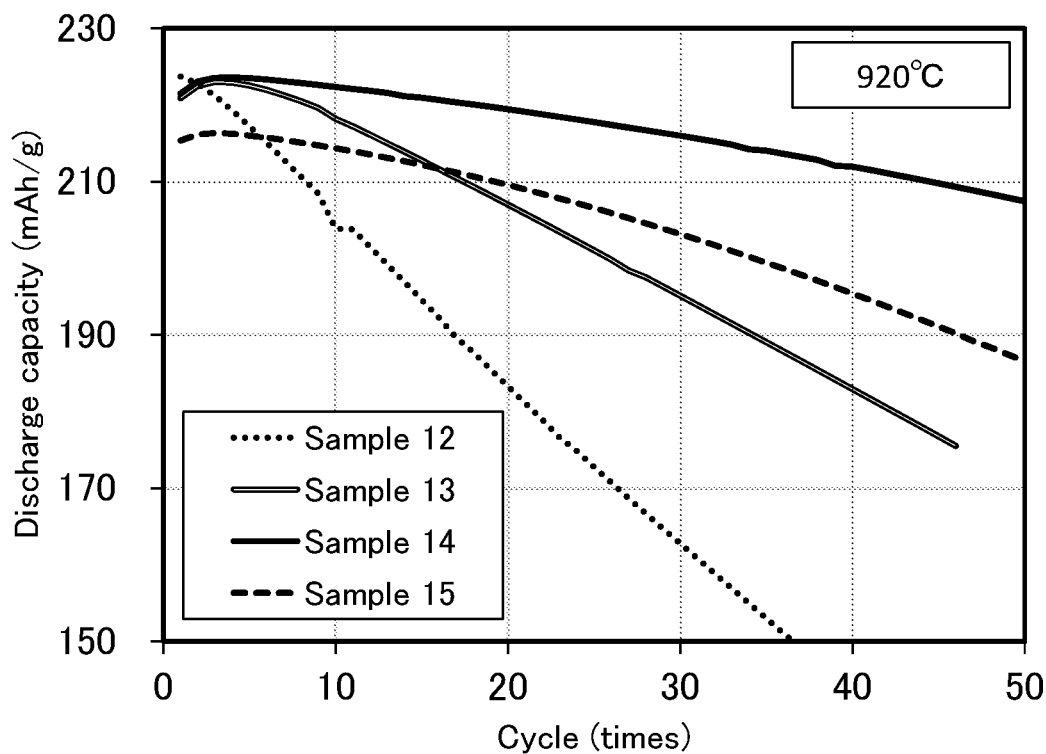
FIG. 40A and FIG. 40B are graphs showing cycle performances of positive electrode active materials formed in Example 1.
Figure 40B:
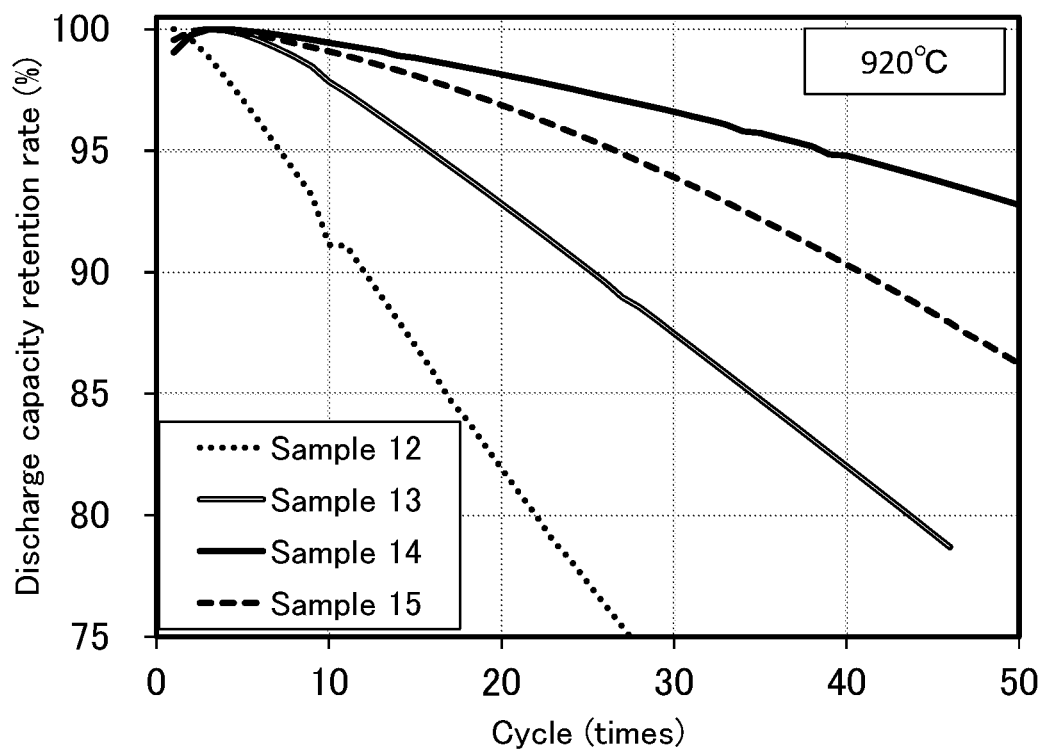

FIG. 40A and FIG. 40B show charge and discharge cycle performances of secondary batteries of Sample 12, Sample 13, Sample 14, and Sample 15 in each of which the annealing temperature was 920° C. FIG. 40A shows discharge capacity and FIG. 40B shows discharge capacity retention rate. The measurement was performed at 45° C. The charge and discharge conditions were the same as those of the samples in FIG. 37A to FIG. 38B except that the charge and discharge were performed at 0.5 C.

As shown in FIG. 40A and FIG. 40B, the tendency similar to that in FIG. 37A to FIG. 38B was observed; one-time annealing as in Sample 12 was not sufficient and thus favorable charge and discharge cycle performance was not obtained. The charge and discharge cycle performances of Sample 13 in which the number of annealing times was two was slightly improved. Sample 14 and Sample 15 in which the number of annealing times was three or four exhibited favorable charge and discharge cycle performances. In particular, Sample 14 in which the number of annealing times was three had the most favorable performance.

Figure 41A:
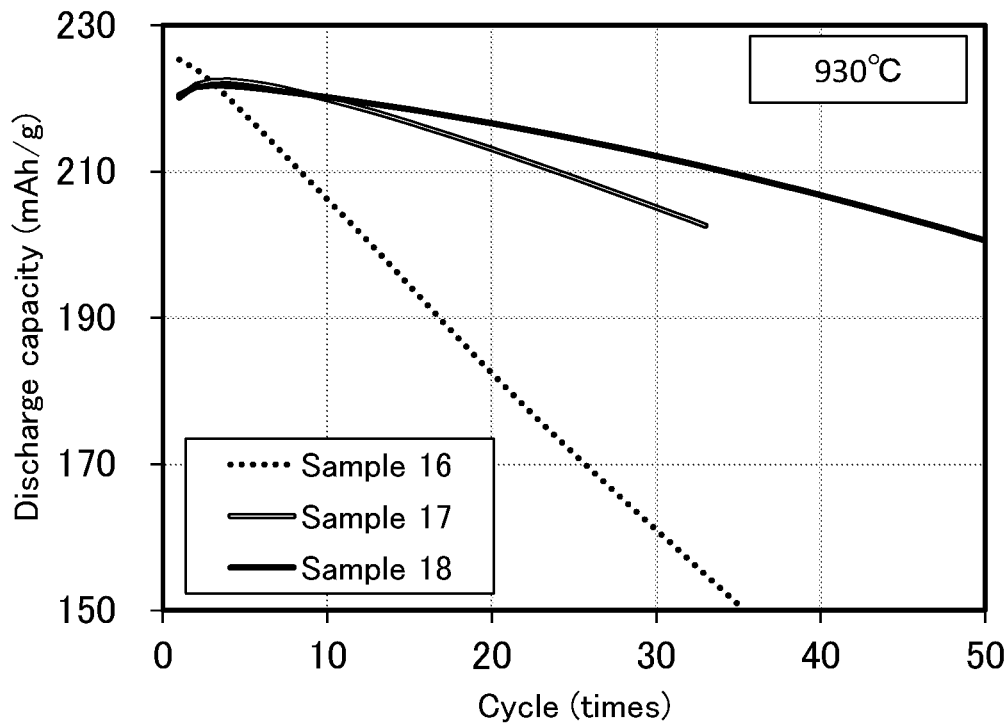
FIG. 41A and FIG. 41B are graphs showing cycle performances of positive electrode active materials formed in Example 1.
Figure 41B:
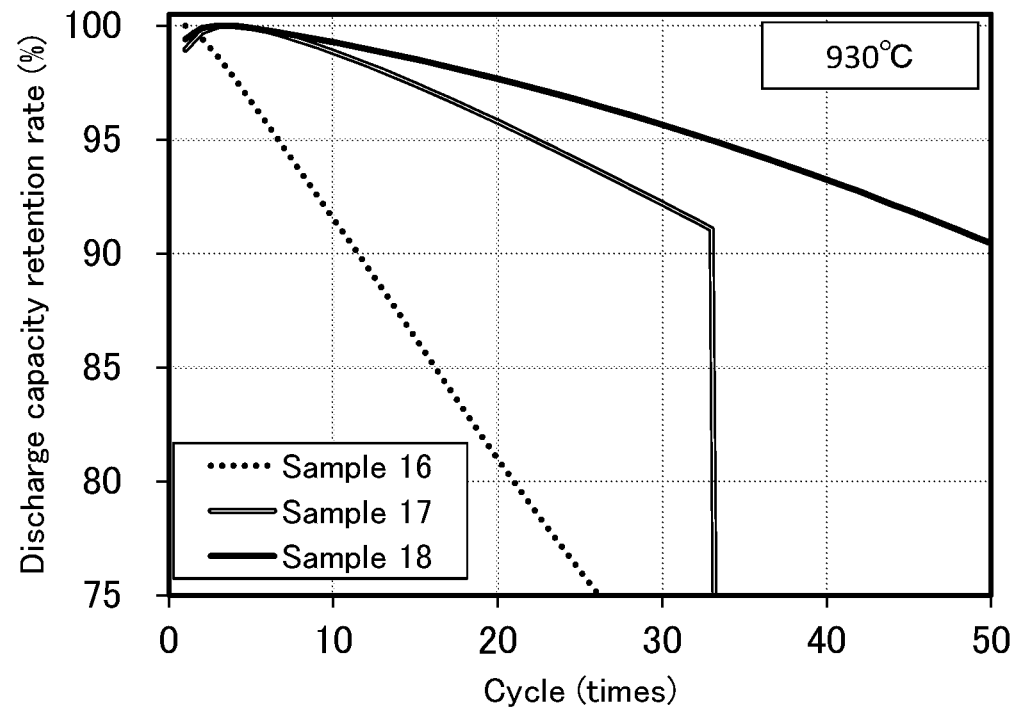

FIG. 41A and FIG. 41B show charge and discharge cycle performances of secondary batteries of Sample 16, Sample 17, and Sample 18 in each of which the annealing temperature was 930° C. FIG. 41A shows discharge capacity and FIG. 41B shows discharge capacity retention rate. The measurement was performed at 45° C. The charge and discharge conditions were the same as those of the samples in FIG. 37A to FIG. 38B except that the charge and discharge were performed at 0.5 C.

As shown in FIG. 41A and FIG. 41B, the tendency similar to that in FIG. 37A to FIG. 38B, FIG. 40A, and FIG. 40B was observed. One-time annealing as in Sample 16 was not sufficient and thus favorable charge and discharge cycle performance was not obtained. Sample 17 and Sample 18 in which the number of annealing times was two or three exhibited favorable charge and discharge cycle performances. In particular, Sample 18 in which the number of annealing times was three had the most favorable performance.

Figure 42A:
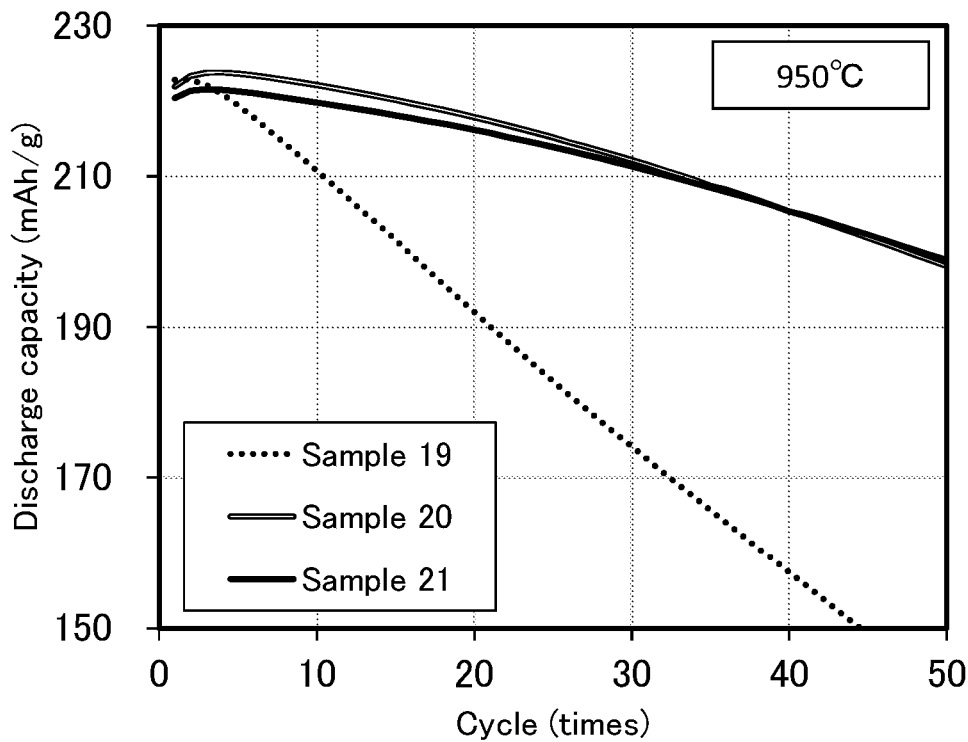
FIG. 42A and FIG. 42B are graphs showing cycle performances of positive electrode active materials formed in Example 1.
Figure 42B:
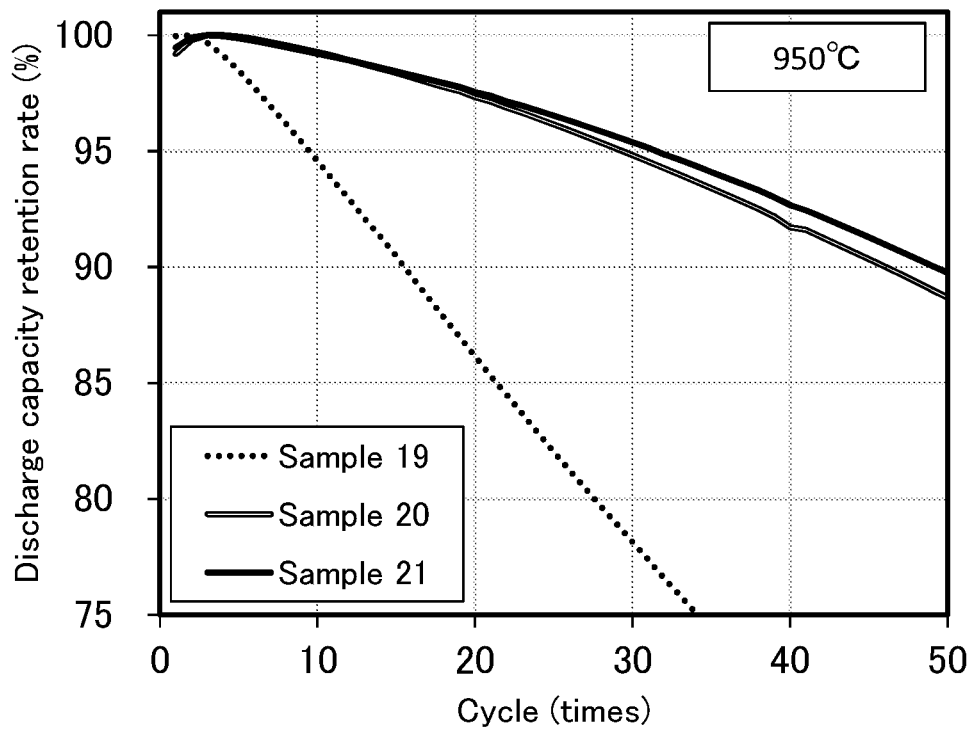

FIG. 42A and FIG. 42B show charge and discharge cycle performances of secondary batteries of Sample 19, Sample 20, and Sample 21 in each of which the annealing temperature was 950° C. FIG. 42A shows discharge capacity and FIG. 42B shows discharge capacity retention rate. The measurement was performed at 45° C. The charge and discharge conditions were the same as those of the samples in FIG. 37A to FIG. 38B except that the charge and discharge were performed at 0.5 C.

As shown in FIG. 42A and FIG. 42B, the tendency similar to that in FIG. 37A to FIG. 38B and FIG. 40A to FIG. 41B was observed. One-time annealing as in Sample 19 was not sufficient and thus favorable charge and discharge cycle performance was not obtained. Sample 20 and Sample 21 in which the number of annealing times was two or three exhibited favorable charge and discharge cycle performances.

Table 2 shows the initial discharge capacity and the discharge capacity retention rates of Sample 1 to Sample 21 after 30 cycles or 50 cycles.

TABLE 2

| Sample name | Initial discharge capacitance (mAh/g) | Discharge capacity retention rate (%) (Number of cycles) |
| --- | --- | --- |
| Sample 1 (comparative example) | 219.5 | 60.2 (50 cycles) |
| Sample 2 (comparative example) | 217.5 | 62.4 (50 cycles) |
| Sample 3 | 216.3 | 79.6 (50 cycles) |
| Sample 4 | 216.0 | 82.8 (50 cycles) |
| Sample 5 | 217.7 | 93.8 (50 cycles) |
| Sample 6 | 217.0 | 94.3 (50 cycles) |
| Sample 7 | 217.3 | 91.6 (50 cycles) |
| Sample 8 | 217.3 | 94.1 (50 cycles) |
| Sample 9 | 216.3 | 91.0 (50 cycles) |
| Sample 10 | 217.5 | 91.6 (50 cycles) |
| Sample 11 (comparative example) | 223.1 | 66.3 (50 cycles) |
| Sample 12 (comparative example) | 223.9 | 56.3 (50 cycles) |
| Sample 13 | 221.7 | 87.3 (30 cycles) |
| Sample 14 | 221.5 | 92.8 (50 cycles) |
| Sample 15 | 215.4 | 93.9 (30 cycles) |
| Sample 16 (comparative example) | 225.5 | 71.1 (30 cycles) |
| Sample 17 | 220.1 | 92.2 (30 cycles) |
| Sample 18 | 220.7 | 95.7 (30 cycles) |
| Sample 19 (comparative example) | 222.8 | 63.2 (50 cycles) |
| Sample 20 | 222.0 | 88.5 (50 cycles) |
| Sample 21 | 220.4 | 89.8 (50 cycles) |

As shown in Table 2, the cycle performance tended to become better when the annealing temperature was higher than or equal to 900° C. and lower than or equal to 930° C.

As described above, the method of forming a positive electrode active material of one embodiment of the present invention can form the positive electrode active material with favorable cycle performance even at a relatively high temperature of 45° C.

REFERENCE NUMERALS

100: positive electrode active material, 100a: surface portion, 100b: inner portion, 110: rotary kiln, 110a: rotary kiln, 110b: rotary kiln, 110c: kiln, 111: kiln main body, 111a: kiln main body, 111b: kiln main body, 112: heating unit, 112a: heating unit, 112b: heating unit, 113: source material supply unit, 113a: source material supply unit, 113b: source material supply unit, 114: exhaust port, 115: control board, 116: atmosphere control unit, 117: blade, 120: measurement device, 120a: measurement device, 120b: measurement device, 130: mill, 131a: mill, 131b: mill, 150: roller hearth kiln, 150a: roller hearth kiln, 151: kiln main body, 152: roller, 153a: heating unit, 153b: heating unit, 154: atmosphere control unit, 155: adhesion preventing unit, 155a: adhesion preventing unit, 155b: adhesion preventing unit, 155c: adhesion preventing unit, 157a: blocking board, 157b: blocking board, 157c: blocking board, 158: source material supply unit, 160: container, 160a: container, 161: object, 170: mesh belt kiln, 171: kiln main body, 172: adhesion preventing unit, 173: heating unit, 174: mesh belt, 180: muffle furnace, 181: hot plate, 182: heating unit, 183: heat insulator, 184: atmosphere control unit, 185: adhesion preventing unit, 190: container, 191: object

The invention claimed is:

1. A rotary kiln successively processing an object put thereto, comprising a kiln main body, a mill, a first heating unit, a second heating unit, a first source material supply unit, a second source material supply unit, and an atmosphere control unit,
   wherein the kiln main body has a substantially cylindrical shape and is configured to stir the object by rotating,
   wherein the kiln main body comprises an upstream portion and a downstream portion, and is configured to retain the object in the upstream portion for an hour or longer and 100 hours or shorter and is configured to retain the object in the downstream portion for an hour or longer and 100 hours or shorter,
   wherein the mill is configured to inhibit adhesion of the object,
   wherein the first heating unit is configured to heat the upstream portion of the kiln main body to a temperature higher than or equal to 800° C. and lower than or equal to 1100° C.,
   wherein the second heating unit is configured to heat the downstream portion of the kiln main body to a temperature higher than or equal to 500° C. and lower than or equal to 1130° C.,
   wherein the first source material supply unit is configured to supply the object to the upstream portion of the kiln main body,
   wherein the second source material supply unit is configured to supply an additional source material to the downstream portion of the kiln main body, and
   wherein the atmosphere control unit is an oxygen-containing gas introduction line which introduces an oxygen-containing gas to the inside of the kiln main body.

2. A kiln successively processing an object put thereto, comprising a kiln main body, a first mill, a second mill, a first heating unit, a second heating unit, and a source material supply unit,
   wherein the kiln main body has a substantially cylindrical shape and comprises a scraping blade inside,
   wherein the scraping blade is configured to stir the object,
   wherein the kiln main body comprises an upstream portion and a downstream portion, and is configured to retain the object in the upstream portion for an hour or longer and 100 hours or shorter and is configured to retain the object in the downstream portion for an hour or longer and 100 hours or shorter,
   wherein the first mill and the second mill are provided between the upstream portion and the downstream portion and is configured to inhibit adhesion of the object,
   wherein the first heating unit is configured to heat the upstream portion of the kiln main body to a temperature higher than or equal to 800° C. and lower than or equal to 1100° C.,
   wherein the second heating unit is configured to heat the downstream portion of the kiln main body to a temperature higher than or equal to 500° C. and lower than or equal to 1130° C., and
   wherein the source material supply unit is configured to supply the object to the upstream portion of the kiln main body.

* * * * *